(12) United States Patent
Shoji et al.

(10) Patent No.: US 6,190,780 B1
(45) Date of Patent: Feb. 20, 2001

(54) SURFACE TREATED METAL MATERIAL AND SURFACE TREATING AGENT

(75) Inventors: Hiromasa Shoji; Masao Sakashita; Tadashi Sakon; Kenichiro Tadokoro; Yoshihiro Kaneda, all of Kawasaki (JP)

(73) Assignee: Nippon Steel Corporation, Tokyo (JP)

( * ) Notice: Under 35 U.S.C. 154(b), the term of this patent shall be extended for 0 days.

(21) Appl. No.: 09/093,109

(22) Filed: Jun. 8, 1998

Related U.S. Application Data

(63) Continuation-in-part of application No. PCT/JP97/00272, filed on Feb. 4, 1997.

(30) Foreign Application Priority Data

| Feb. 5, 1996 | (JP) | 8-018519 |
| Feb. 5, 1996 | (JP) | 8-018520 |
| Mar. 19, 1996 | (JP) | 8-063427 |
| Mar. 19, 1996 | (JP) | 8-063428 |
| Oct. 15, 1996 | (JP) | 8-271238 |
| Oct. 25, 1996 | (JP) | 8-284237 |
| Jun. 9, 1997 | (JP) | 9-149793 |
| Aug. 18, 1997 | (JP) | 9-221531 |
| Aug. 28, 1997 | (JP) | 9-232547 |
| Aug. 28, 1997 | (JP) | 9-232548 |

(51) Int. Cl.$^7$ ................. B32B 15/04; C09K 11/81
(52) U.S. Cl. ................. 428/472; 428/472.3; 106/14.21; 106/14.44; 106/14.12
(58) Field of Search ................. 106/14.12, 14.14, 106/14.21, 14.44; 148/247, 248; 428/469, 472, 472.3

(56) References Cited

U.S. PATENT DOCUMENTS

| 4,881,975 | * | 11/1989 | Collier et al. | 106/14.05 |
| 4,992,115 | * | 2/1991 | Ikeda et al. | 148/247 |
| 5,104,577 | * | 4/1992 | Ikeda et al. | 252/247 |
| 5,192,374 | * | 3/1993 | Kindler | 148/272 |
| 5,427,632 | * | 6/1995 | Dolan | 148/259 |
| 5,449,415 | * | 9/1995 | Dolan | 148/248 |
| 5,759,244 | * | 6/1998 | Tomlinson | 106/14.14 |
| 5,885,373 | * | 3/1999 | Sienkowski | 148/247 |

FOREIGN PATENT DOCUMENTS

| 50-93241 | 7/1975 | (JP) . |
| 50-116338 | 9/1975 | (JP) . |
| 51-23448 | 2/1976 | (JP) . |
| 51-71588 | 6/1976 | (JP) . |
| 52-63832 | 5/1977 | (JP) . |
| 52-66838 | 6/1977 | (JP) . |
| 2-25579 | 1/1990 | (JP) . |
| 2-502655 | 8/1990 | (JP) . |
| 3-64485 | 3/1991 | (JP) . |
| 3-277790 | 12/1991 | (JP) . |
| 4-300864 | 10/1992 | (JP) . |
| 5-195247 | 8/1993 | (JP) . |
| 5-230666 | 9/1993 | (JP) . |
| 5-331658 | 12/1993 | (JP) . |

* cited by examiner

Primary Examiner—Deborah Jones
Assistant Examiner—Stephen Stein
(74) Attorney, Agent, or Firm—Kenyon & Kenyon

(57) ABSTRACT

Surface treated metal materials with corrosion-resistant coating layers composed mainly of oxyacid compounds of rare earth elements (lanthanum, cerium, etc.) or Group IVA elements (zirconium, etc.), oxyacids or mixtures thereof. The corrosion resistant coating layers may also contain resins. Also provided are corrosion resistant coating layers containing rare earth element and Group IVA element compounds in resin matrixes. The corrosion resistant coating layers, particularly inorganic layers, may be covered with resin layers.

54 Claims, 4 Drawing Sheets

SURFACE TREATED METAL MATERIAL AND SURFACE TREATING AGENT

CROSS REFERENCE TO RELATED APPLICATIONS

This application is a continuation-in-part application of PCT/JP 97/00272, filed on Feb. 4, 1997.

TECHNICAL FIELD

The present invention relates to a surface treated metal material having a coating layer with working-follow-up properties and excellent corrosion resistance and containing absolutely no hexavalent chromium, as well as to a surface treatment agent therefor.

BACKGROUND ART

Coating of chromate films on surfaces as a corrosion resistance treatment for cold-rolled steel sheets, zinc-plated steel sheets and zinc-based alloy plated steel sheets, aluminum-plated steel sheets, etc. conventionally used for automobiles, household electrical appliances, construction materials and the like, is a common technique. In addition to steel sheets, chromate films are also widely used for petroleum transport pipes and other steel pipes, and for wires and other wiring materials. Aluminum and its alloy surfaces are covered with natural oxides which protect the materials from many types of corrosive environments, but anodic oxidation and chromate treatment are carried out on structural materials for aircraft and the like which require more excellent corrosion resistance and coating adhesion.

Chromate treatment often used for such metal materials includes electrolytic chromate and application-type chromate. Electrolytic chromate treatment has been carried out by cathodic electrolytic treatment of metal sheets using baths containing, for example, chromic acid as the main component, in addition to sulfuric acid, phosphoric acid, boric acid, halogens and various other anions. Application-type chromate treatment, which has been associated with the problem of elution of chromium from the chromate treated metal sheets, has been carried out by first adding an inorganic colloid or inorganic anion to a solution wherein a portion of the hexavalent chromium has been reduced to trivalent, or a solution with a specified hexavalent chromium and trivalent chromium ratio, to prepare the treatment solution, and then dipping the metal sheet therein or spraying the metal sheet with the treatment solution.

Among chromate films, those coating layers formed by electrolysis cannot be said to have sufficient corrosion resistance despite the low elution of hexavalent chromium, and their corrosion resistance is particularly low when considerable film damage occurs during working, etc. On the other hand, metal sheets coated with application-type chromate films have high corrosion resistance, and especially excellent worked portion corrosion resistance, but extensive elution of hexavalent chromium from the chromate film becomes a problem. Although elution of hexavalent chromium is controlled considerably by coating with an organic polymer, it is not sufficient. A method generally known as the resin chromate method, such as disclosed in Japanese Unexamined Patent Publication (Kokai) No. 5-230666, gives an improvement in the control of elution of hexavalent chromium, but it is still impossible to avoid elution of trace amounts.

As a coating method which forms films having the same functions as conventional chromate films but containing absolutely no chromium ions, there is known a method for obtaining a corrosion resistant coating layer of a cerium-containing hydroxide while generating hydrogen gas, by dipping an Al sheet in an acidic aqueous solution of about pH 1 to 3 containing cerium ions, which method is disclosed in Japanese Unexamined Patent Publication (Kokai) No. 2-502655, a double-salt film of cerium ions, zirconium ions, phosphate ions and fluorine ions on aluminum, which method is disclosed in Japanese Unexamined Patent Publication (Kokai) No. 2-25579, and a zinc phosphate film formed in a zinc ion, phosphate ion and lanthanum compound treatment bath, which method is disclosed in Japanese Unexamined Patent Publication (Kokai) No. 5-331658; however, none of these have adequate working-follow-up properties and sufficient corrosion resistance.

It is an object of the present invention to provide a novel technique for surface treated metal materials having corrosion-resistant coating layers with working follow-up properties and excellent corrosion resistance and employing absolutely no hexavalent chromium.

DISCLOSURE OF THE INVENTION

According to a first aspect of the invention, as a result of much diligent research aimed at designing general use films which have been subjected to conversion treatment instead of the existing chromate treatment, in systems containing absolutely no hexavalent chromium, the present inventors have successfully obtained novel and revolutionary inorganic-based chemically treated films which exhibit the unique functions of the individual components, by converting a rare earth element and/or a group IVA element to an oxyacid compound (which term includes hydrogen oxyacid compounds) in the form of a paste to give the working-follow-up properties, to thus suppress corrosion by its barrier effect, inhibit cathodic reaction by the rare earth element ion and/or group IVA element ion, and induce oxyacid salt-type film passivation and oxide film-type passivation by creating an excess of the oxyacid, to inhibit anodic reaction.

According to a second aspect of the invention there is provided a surface treated metal material with an inorganic/organic composite film having an enhanced working-follow-up property and corrosion resistance, by addition of a resin to the aforementioned inorganic-based chemical treatment film.

According to a third aspect of the invention there is provided a surface treated metal material with an organic-based corrosion resistant film with an excellent working-follow-up property, by using as a corrosion resistant coating layer a film containing in a resin matrix the above-mentioned oxyacid compound, hydrogen oxyacid compound or other compound of a rare earth element and/or Group IVA element which is effective as an anticorrosion agent.

According to a fourth aspect of the invention there is provided a surface treated metal material with improved corrosion resistance, as well as increased functionality and aesthetic quality if desired, by further formation of a film composed mainly of a resin on the corrosion resistant coating layer of any of the aforementioned different surface treated metal materials.

The elements of the gist of the present invention are as follows.

(1) A surface treated metal material characterized by having a corrosion resistant coating layer composed mainly of an oxyacid compound or hydrogen oxyacid compound of a rare earth element and/or group IVA element, or a mixture thereof, on the surface of a metal material.

(2) A surface treated metal material according to (1) above, wherein the rare earth element is yttrium, lanthanum and/or cerium.

(3) A surface treated metal material according to (1) above, wherein the group IVA element is zirconium.

(4) A surface treated metal material according to (1), (2) or (3) above, wherein the anion species of the oxyacid compound and the hydrogen oxyacid compound is a polyvalent oxyacid anion.

(5) A surface treated metal material according to any of (1) to (4) above, wherein the anion species is phosphate ion, tungstate ion, molybdate ion and/or vanadate ion.

(6) A surface treated metal material according to (1) above, wherein the corrosion resistant coating layer is composed mainly of a phosphate compound or hydrogen phosphate compound of yttrium, lanthanum and/or cerium, or a mixture thereof.

(7) A surface treated metal material according to (6) above, wherein the phosphate compound or hydrogen phosphate compound is an ortho-(hydrogen)phosphate compound, meta-phosphate compound or poly-(hydrogen) phosphate compound, or a mixture thereof.

(8) A surface treated metal material according to any of (1) to (7) above, wherein the corrosion resistant coating layer further contains as an added component one or more compounds selected from among oxides, hydroxides, halides and organic acid compounds of rare earth elements.

(9) A surface treated metal material according to (8) above, wherein the rare earth element of the added component is cerium.

(10) A surface treated metal material according to (9) above, wherein the rare earth element of the added component is tetravalent cerium.

(11) A surface treated metal material according to any of (1) to (10) above, wherein the corrosion resistant coating further contains as an added component an organic-based corrosion inhibitor.

(12) A surface treated metal material according to (11) above, wherein the organic-based corrosion inhibitor is one or more compounds selected from the group consisting of formylated derivatives of N-phenyl-dimethylpyrrole, thioglycolic acid esters represented by HS—$CH_2COOC_nCH_{2n+1}$ (n is an integer of 1–25) and their derivatives, α-mercaptocarboxylic acids represented by $C_nH_{2n}(SH)COOH$ (n is an integer of 1–25) and their derivatives, quinoline and its derivatives, triazinedithiol and its derivatives, gallic acid esters and their derivatives, nicotinic acid and its derivatives, catechol and its derivatives and/or conductive polymers.

(13) A surface treated metal material according to any of (1) to (12) above, wherein the corrosion resistant coating layer further contains one or more compounds selected from the group consisting of $SiO_2$, $Cr_2O_3$, $Cr(OH)_3$, $Al_2O_3$, calcium hydroxide, calcium carbonate, calcium oxide, zinc phosphate, zinc hydrogen phosphate, potassium phosphate, potassium hydrogen phosphate, calcium phosphate, calcium hydrogen phosphate, calcium silicate, zirconium silicate, aluminum phosphate, aluminum hydrogen phosphate, titanium oxide, zirconium phosphate, zirconium hydrogen phosphate, sulfuric acid, sodium sulfate, sodium hydrogen sulfate, phosphoric acid, sodium phosphate and sodium hydrogen phosphate.

(14) A surface treated metal material characterized by having a corrosion resistant coating layer composed mainly of an oxyacid compound or hydrogen oxyacid compound of a rare earth element and/or group IVA element or a mixture thereof, and a resin, on the surface of a metal material.

(15) A surface treated metal material according to (14) above, wherein the rare earth element and/or group IV element is yttrium, lanthanum, cerium and/or zirconium.

(16) A surface treated metal material according to (14) or (15) above, wherein the anion species of the oxyacid compound and the hydrogen oxyacid compound is a polyvalent oxyacid anion.

(17) A surface treated metal material according to (14) or (15) above, wherein the anion species of the oxyacid compound is phosphate ion, tungstate ion, molybdate ion and/or vanadate ion.

(18) A surface treated metal material according to (14) above, wherein the oxyacid compound or hydrogen oxyacid compound is an ortho-(hydrogen)phosphate compound, meta-phosphate compound or poly-(hydrogen)phosphate compound, or a mixture thereof.

(19) A surface treated metal material according to any of (14) to (18) above, wherein the corrosion resistant coating layer contains as an added component one or more compounds selected from among oxides, hydroxides, halides and organic acid compounds of rare earth elements.

(20) A surface treated metal material according to (19) above, wherein the rare earth element of the added component is cerium.

(21) A surface treated metal material according to any of (14) to (20) above, wherein the corrosion resistant coating layer contains an organic-based inhibitor as an added component.

(22) A surface treated metal material according to any of (14) to (21) above, wherein the organic-based inhibitor is one or more compounds selected from among formylated derivatives of N-phenyl-dimethylpyrrole, thioglycolic acid esters represented by HS—$CH_2COOC_nCH_{2n+1}$ (n is an integer of 1–25) and their derivatives, α-mercaptocarboxylic acids represented by $C_nH_{2n}(SH)COOH$ (n is an integer of 1–25) and their derivatives, quinoline and its derivatives, triazinedithiol and its derivatives, gallic acid esters and their derivatives, nicotinic acid and its derivatives, catechol and its derivatives and/or conductive polymers.

(23) A surface treated metal material characterized by having a film comprising a compound of a rare earth metal element and/or a group IVA element or a mixture thereof in a resin matrix, on the surface of a metal material.

(24) A surface treated metal material according to (23) above, wherein the compound is an oxyacid compound or hydrogen oxyacid compound, or a mixture thereof.

(25) A surface treated metal material according to (23) above, wherein the rare earth element and/or group IV element is yttrium, lanthanum, cerium and/or zirconium.

(26) A surface treated metal material according to (23) above, wherein the anion species of the oxyacid compound and the hydrogen oxyacid compound is a polyvalent oxyacid anion.

(27) A surface treated metal material according to any of (23) to (26) above, wherein the anion species of the oxyacid compound is phosphate ion, tungstate ion, molybdate ion and/or vanadate ion.

(28) A surface treated metal material according to any of (23) to (27) above, wherein the oxyacid compound or hydrogen oxyacid compound is an ortho-(hydrogen) phosphate compound, meta-phosphate compound or poly-(hydrogen)phosphate compound, or a mixture thereof.

(29) A surface treated metal material according to any of (23) to (28) above, wherein the corrosion resistant coating layer contains as an added component one or more compounds selected from among oxides, hydroxides, halides and organic acid compounds of rare earth elements.

(30) A surface treated metal material characterized by having a film composed mainly of a rare earth metal element and/or group IVA element compound or a mixture thereof coating the surface of a metal sheet as a first layer, the surface of which is in turn coated with a film composed mainly of a resin as a second layer.

(31) A surface treated metal material according to (30) above, characterized in that the rare earth metal element and/or group IVA element compound or mixture thereof is an oxyacid compound or hydrogen oxyacid compound of a rare earth metal element and/or group IVA element, or a mixture thereof.

(32) A surface treated metal material according to (30) or (31) above, characterized in that the rare earth metal element and/or group IV element is lanthanum, cerium, yttrium and/or zirconium.

(33) A surface treated metal material according to any of (30) to (32) above, wherein the film as the first layer further contains a resin.

(34) A surface treated metal material characterized by having a film containing a rare earth metal element and/or group IVA element compound or a mixture thereof dispersed in a resin matrix coating the surface of a metal material as a first layer, and having a film composed mainly of a resin coating the first layer as a second layer.

(35) A surface treatment agent for forming a corrosion resistant coating layer on the surface of a metal material, characterized by being composed mainly of an oxyacid compound or hydrogen oxyacid compound of a rare earth element and/or group IVA element, or a mixture thereof.

(36) A surface treatment agent according to (35) above, wherein the rare earth element and/or group IVA element is yttrium, lanthanum, cerium and/or zirconium.

(37) A surface treatment agent according to (35) or (36) above, wherein the anion species of the oxyacid compound and the hydrogen oxyacid compound is a polyvalent oxyacid anion.

(38) A surface treatment agent according to (37) above, wherein the anion species is phosphate ion, tungstate ion, molybdate ion and/or vanadate ion.

(39) A surface treatment agent according to (37) above, wherein the corrosion resistant coating layer is composed mainly of a phosphate compound or hydrogen phosphate compound of yttrium, lanthanum and/or cerium, or a mixture thereof.

(40) A surface treatment agent according to (39) above, wherein the phosphate compound or hydrogen phosphate compound is an ortho-(hydrogen)phosphate compound, meta-phosphate compound or poly-(hydrogen)phosphate compound, or a mixture thereof.

(41) A surface treatment agent according to any of (37) to (40) above, wherein the corrosion resistant coating layer further contains as an added component one or more compounds selected from among oxides, hydroxides, halides and organic acid compounds of rare earth elements.

(42) A surface treatment agent according to (41) above, wherein the rare earth element of the added component is cerium.

(43) A surface treatment agent according to (42) above, wherein the rare earth element of the added component is tetravalent cerium.

(44) A surface treatment agent according to any of (35) to (43) above, wherein the corrosion resistant coating further contains as an added component an organic-based corrosion inhibitor.

(45) A surface treatment agent according to (44) above, wherein the organic-based corrosion inhibitor is one or more compounds selected from the group consisting of formylated derivatives of N-phenyl-dimethylpyrrole, thioglycolic acid esters represented by $HS-CH_2COOC_nCH_{2n+1}$ (n is an integer of 1–25) and their derivatives, α-mercaptocarboxylic acids represented by $C_nH_{2n}(SH)COOH$ (n is an integer of 1–25) and their derivatives, quinoline and its derivatives, triazinedithiol and its derivatives, gallic acid esters and their derivatives, nicotinic acid and its derivatives, catechol and its derivatives and/or conductive polymers.

(46) A surface treatment agent according to any of (35) to (45) above, wherein the corrosion resistant coating layer further contains one or more compounds selected from the group consisting of $SiO_2$, $Cr_2O_3$, $Cr(OH)_3$, $Al_2O_3$, calcium hydroxide, calcium carbonate, calcium oxide, zinc phosphate, zinc hydrogen phosphate, potassium phosphate, potassium hydrogen phosphate, calcium phosphate, calcium hydrogen phosphate, calcium silicate, zirconium silicate, aluminum phosphate, aluminum hydrogen phosphate, titanium oxide, zirconium phosphate, zirconium hydrogen phosphate, sulfuric acid, sodium sulfate, sodium hydrogen sulfate, phosphoric acid, sodium phosphate and sodium hydrogen phosphate.

(47) A surface treatment agent which contains 0.05–4 mol/kg of a rare earth compound in terms of the rare earth element, and 0.5–100 moles of a phosphate compound and/or hydrogen phosphate compound in terms of $H_3PO_4$ to one mole of the rare earth element.

(48) A surface treatment agent according to (47) above, wherein the rare earth element compound is a phosphate compound, hydrogen phosphate compound, oxide or hydroxide of lanthanum or cerium, or a mixture thereof.

(49) A surface treatment agent according to (47) or (48) above, wherein the phosphate is an ortho-phosphate, meta-phosphate or poly-phosphate, or a mixture thereof.

(50) A surface treatment agent according to any of (47) to (49) above, which contains water or a mixture of water and a water-soluble organic solvent as a diluting agent.

(51) A surface treatment agent according to any of (47) to (50) above, wherein the rare earth element compound is a lanthanum compound, and which further contains a cerium compound in a molar ratio of 1.0–0.001 in terms of cerium to lanthanum and/or an organic-based corrosion inhibitor in a molar ratio of 2–0.001 to lanthanum.

(52) A surface treatment agent according to any of (47) to (50) above, wherein the rare earth element compound is a cerium compound, and which further contains a lanthanum compound in a molar ratio of 1.0–0.001 in terms of lanthanum to cerium and/or an organic-based corrosion inhibitor in a molar ratio of 2–0.001 to lanthanum.

(53) A surface treatment agent according to any of (35) to (52) above, wherein the surface treatment agent further contains a resin component.

BEST MODE FOR CARRYING OUT THE INVENTION

Figure 1:
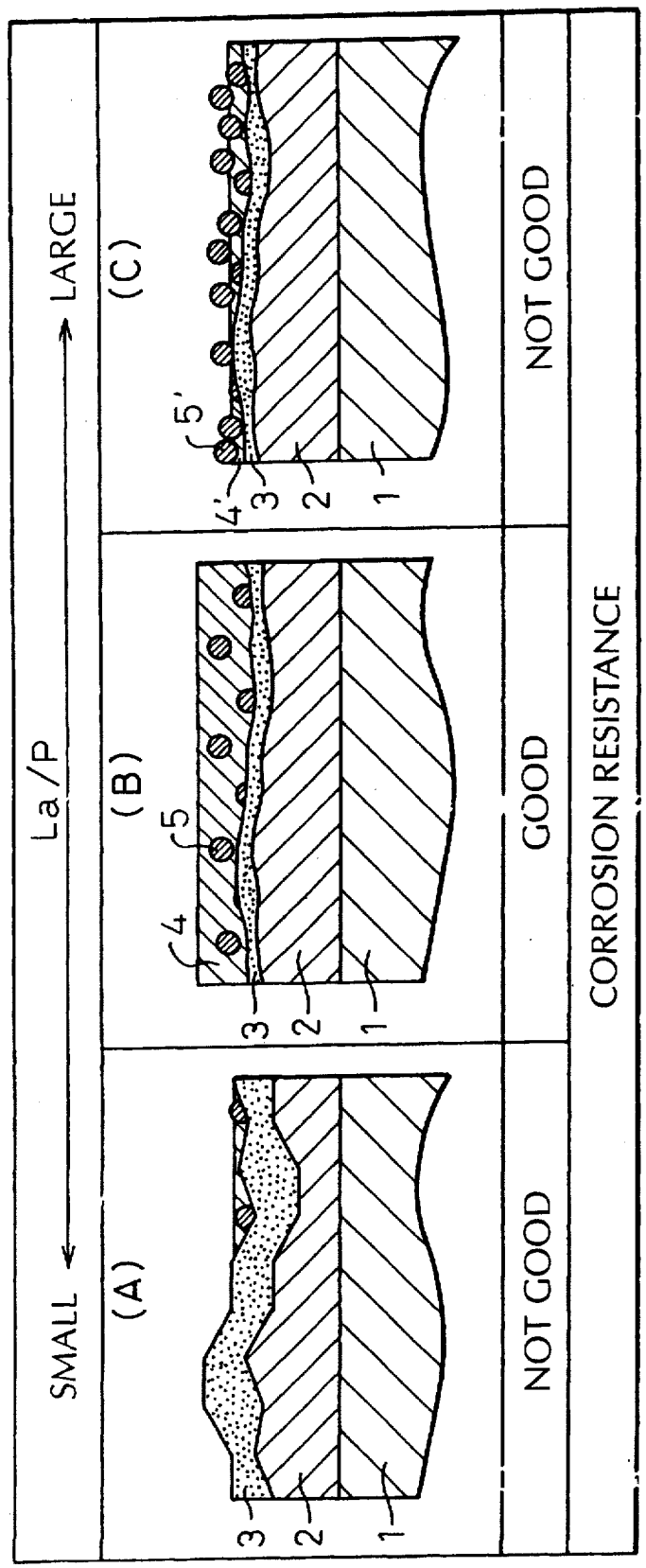
FIG. 1 is a schematic drawing showing the relationship between the lanthanum/phosphoric acid mixing ratio and the structure of the corrosion resistant coating.

The present invention will now be explained in more detail.

The metal material which is the object of the invention is not particularly restricted, and application may be made to surface treated steel sheets and cold-rolled steel sheets, for example fused zinc-plated steel sheets, fused zinc-iron alloy-plated steel sheets, fused zinc-aluminum-magnesium alloy-plated steel sheets, fused aluminum-silicon alloy-plated steel sheets, fused tin-zinc plated steel sheets, fused lead-tin alloy-plated steel sheets and other fused plated steel sheets, zinc electroplated steel sheets, zinc-nickel alloy electroplated steel sheets, zinc-iron alloy electroplated steel sheets, zinc-chromium alloy electroplated steel sheets and other electroplated steel sheets, as well as zinc, aluminum and other metal sheets. Further applications include other forms of materials in addition to metal sheets, such as metal wire, metal pipes and the like.

The film according to the first aspect of the invention is designed to contain rare earth elements and/or group IVA elements of the Periodic Table as oxyacid compounds (including hydrogen oxyacid compounds, same hereunder) to form a paste for sufficient working-follow-up properties (shape conformity when the substrate is worked), in order to suppress corrosion by its barrier effect, inhibit cathodic reaction due to the rare earth element ions and or group IVA element ions, and induce oxyacid salt-type film passivation and oxide film-type passivation by creating an excess of the phosphoric acid, to inhibit anodic reaction. For stronger suppression of the cathodic reaction, another rare earth element compound, especially a cerium compound, may also be added.

Oxyacid compounds of rare earth elements and/or group IVA elements include compounds of rare earth elements and/or group IVA elements with oxyacid anions such as phosphate anion, tungstate anion, molybdate anion and vanadate anion, and hydrogen oxyacid compounds include those compounds in which hydrogen is present in a part of the cations. Also, the rare earth elements are the 17 elements Sc, Y, La, Ce, Pr, Nd, Pm, Sm, Eu, Gd, Tb, Dg, Ho, Er, Tm, Yb and Lu. The group IVA elements are Ti, Zr and Hf.

For example, $LaPO_4$ is the lanthanum phosphate compound, and the corresponding lanthanum hydrogen phosphate compounds are $La(H_2PO_4)_3$ and $La_2(HPO_4)_3$.

The oxyacid compound and/or hydrogen oxyacid compound of the rare earth element and/or group IVA element, which is the main component of the corrosion resistant coating of the invention, is theoretically not restricted, but it is believed that since it is in paste form and is probably an amorphous (non-crystalline) inorganic polymer, a working-follow-up property (shape conformity when the substrate is worked) will be exhibited even when the film is formed to greater than a prescribed thickness. Such inorganic coating layers which have working-follow-up properties can be used as anti-corrosion barriers. Even though inorganic polymers are formed, the same effect is obtained even if crystalline or amorphous particles are dispersed and present therein.

The rare earth metal element and/or group IVA element compound used for the invention is preferably one with poor water solubility (i.e., hardly water soluble) in order to impart long-term corrosion resistance, and the solubility of the rare earth metal element and/or group IVA element compound in water is preferably no greater than 0.01 mol/l at pH 6–7 in terms of the metal element. More preferably, the solubility is no greater than 0.01 mol/l at pH 5–8 in terms of the metal element, in order to ensure long-term corrosion resistance. If the solubility in water at pH 6–7 exceeds 0.01 mol/l, the rare earth metal element and/or group IVA element compound will easily elute out from the film in moist environments such as rain and dew, thus lowering the long-term corrosion resistance in such moist environments.

Also, in order to impart corrosion resistance at worked parts and wounded (flaw) parts, rare earth metal elements and/or group IVA element compounds which are rendered water-soluble under acidic conditions are preferred. Specifically, it is preferred for the solubility of the rare earth metal element and/or group IVA element compound at pH 3 or less to be at least 0.1 mol/l in terms of the metal element. At 0.1 mol/l or greater, the rare earth metal element and/or group IVA element compound will dissolve in response to lower pH at the sites of corrosion, thus providing a function whereby the accelerated corrosion sections such as worked parts and wounded parts can be selectively repaired. At less than 0.1 mol/l, supply of the rare earth metal element and/or group IVA element compound to the sites of corrosion will be insufficient when the film undergoes damage by intense working or is exposed to severely corroding environments, so that the corrosion resistance will be reduced.

FIG. 1 shows schematic views of preferred embodiments of coating layers obtained by coating lanthanum/phosphate mixtures on zinc-plated 2 steel sheets 1 with different mixing ratios (La/P). When La/P is small, a crystalline, hard coating 3 is formed substantially like a zinc phosphate coating, and although the working-follow-up property is low (FIG. 1/A), a high La/P ratio gives a matrix 4 coating composed mainly of $La(H_2PO_4)_3$ and $La_2(HPO_4)_3$ (FIG. 1/B) which is an inorganic polymer and has working-follow-up properties. However, even if the La/P ratio is too high, many crystalline $LaPO_4$ particles 5' are deposited, reducing the matrix portion 4' and lowering the film formability and working-follow-up property (FIG. 1/C).

However, FIG. 1 shows only schematics of cases according to one method (production method), and the relationship between the specific mixing ratios and coating properties is not universal, being dependent on the type of (hydrogen) oxyacid compound of the rare earth element and/or group IVA element compound and their production method.

The molar ratio of the rare earth element ion and the oxyacid ion (in terms of the oxyacid ion in the case of a hydrogen oxyacid compound or a mixture containing one) in the film of an oxyacid compound or hydrogen oxyacid compound of a rare earth element and/or group IVA element compound, or a mixture thereof (oxyacid ion to rare earth/group IVA element ion), is generally 0.5–100, preferably 2–50 and more preferably 5–10. At less than 0.5, the working follow-up property is inadequate, and at greater than 100 the film formability is reduced. The source of the rare earth element and/or group IVA element is not particularly restricted, and rare earth element compounds such as oxides, acetates, carbonates, chlorides and fluorides may be mentioned, with oxides being preferred.

Also, the working-follow-up property and corrosion resistance are not especially affected even if other rare earth element compounds are included as impurities, such as in misch metal and its precursors. A precursor here refers to a substance which is present from a monazite (phosphate) used as the starting material for lanthanum or cerium until a compound is obtained during smelting and purification thereof. The amount of the rare earth element and/or group IVA element present in the film may be 1 $mg/m^2$ or greater. At less than 1 $mg/m^2$ the corrosion resistance is inadequate.

Even at greater than 10 g/m² there is no notable improvement in the corrosion resistance, and therefore 10 g/m² is sufficient from an economical standpoint. On the other hand, the film thickness is preferably at least 0.01 μm, and more preferably at least 0.1 μm. At less than 0.01 μm the corrosion resistance will be inadequate. However, since there is little improvement in the corrosion resistance even if the film thickness exceeds 5 μm, it is sufficient at 5 μm from an economical standpoint.

Particularly preferred oxyacid compounds are phosphate compounds and/or hydrogen phosphate compounds, with ortho-phosphate, meta-phosphate or poly-phosphate as the phosphate species. Poly-phosphate based hydrogen phosphate compounds are also suitable.

One or a mixture of two or more compounds may be used as rare earth elements and/or group IVA elements, with lanthanum, cerium, yttrium and zirconium, especially lanthanum, being preferred. Cerium is effective for inhibiting cathodic reaction. For example, phosphate compounds and hydrogen phosphate compounds of lanthanum, which are the most preferred compounds, can be easily obtained by chemical reaction between lanthanum compounds including water-soluble inorganic salts such as lanthanum chloride and lanthanum nitrate or oxides such as lanthanum oxide or lanthanum hydroxide, and ortho-phosphoric acid, poly-phosphoric acid or phosphate salts such as sodium hydrogen phosphate. Here, it is preferred for the starting material to be a lanthanum compound of a water-soluble and volatile acid such as a chloride or nitrate, to facilitate heat removal of the anions other than the phosphate ion, but lanthanum compounds comprising anti-corrosive anions which are insoluble in water and non-volatile, such as molybdate salts and tungstate salts, may also be reacted with phosphoric acid.

More preferably, a lanthanum phosphate compound or hydrogen phosphate compound is obtained by reaction between an oxide or hydroxide and phosphoric acid. Alternatively, a surface layer obtained by reaction of particles of lanthanum oxide or lanthanum hydroxide with phosphoric acid under relatively mild conditions may be used alone as the phosphate compound mixture. Here, when the lanthanum compound and phosphoric acid coexist, the lanthanum phosphate $LaPO_4$ may exist alone as a stable phosphate compound, but since oxides and hydroxides of lanthanum cannot exist alone, particle surfaces of oxides and hydroxides must be in admixture with phosphate compounds or hydrogen phosphate compounds. They may also be natural phosphate compounds produced as minerals.

The corrosion resistant coating layer of the invention may also contain, as added components, oxides, hydroxides, halides, carbonates, sulfates, nitrates and organic acid compounds of rare earth elements, particularly cerium. These compounds, especially tetravalent cerium ions and cerium compounds, are said to have an effect of reinforcing the inhibiting effect on the cathodic reaction. The amount of such an added component is no more than 50-fold, preferably no more than 10-fold, and more preferably no more than 5-fold, in terms of the molar ratio of the added rare earth element with respect to the number of moles of the rare earth element of the oxyacid compound and/or hydrogen oxyacid compound. If the amount of the added component is too great, the film formability is lowered and a film with sufficient working follow-up properties cannot be obtained. Even when the cerium compound is an oxyacid compound or hydrogen oxyacid compound, its addition to the matrix of an oxyacid compound or hydrogen oxyacid compound of the other rare earth element has the effect of reinforcing the cathodic reaction-inhibiting effect, and therefore it may be added in a molar ratio of 50-fold or less with respect to the other rare earth element. The amount of cerium contained in the film may be 1 mg/m² or greater. At less than 1 mg/m² the corrosion resistance will be insufficient. Since there is not much improvement in the corrosion resistance even if the amount is greater than 10 g/m², an amount of 10 g/m² is adequate from an economical standpoint.

The organic-based corrosion inhibitor adheres to the metal surface, forming a complex during elution of the metal ion and trapping it, thus having the effect of inhibiting further progress of ionization. Organic-based corrosion inhibitors which may be used include compounds possessing, in the molecular structure, with a functional group (=O, —$NH_2$, =NH, =N—, =S, —OH, etc.) required to form metal complex bonds and a functional group (—OH, =NH, —SH, —CHO, —COOH, etc.) which can form a covalent bond with the metal surface. Incidentally, the organic-based corrosion inhibitor included in the film is preferably a compound which is poorly water-soluble. The reason is that the corrosion inhibiting effect is exhibited when the organic-based corrosion inhibitor dissolves in trace amounts by water passing through the film, and therefore if it is highly water soluble it will easily elute out when water passes through the film, causing the effect to not be exhibited, or resulting in inadequate duration of the effect.

Specific examples of poorly water-soluble organic-based corrosion inhibitors possessing both of the aforementioned functional groups include formylated derivatives of N-phenyl-dimethylpyrrole, thioglycolic acid esters represented by HS—$CH_2COOC_nCH_{2n+1}$ (n is an integer of 1–25) and their derivatives, α-mercaptocarboxylic acids represented by $C_nH_{2n}(SH)COOH$ (n is an integer of 1–25) and their derivatives, quinoline and its derivatives, triazinedithiol and its derivatives, gallic acid esters and their derivatives, nicotinic acid and its derivatives, and catechol and its derivatives.

An electroconductive polymer can also be used as an organic-based corrosion inhibitor with a different anti-corrosion mechanism. This is a molecule of a same repeating units with π-electron conjugated bonds spread throughout the entire molecule, of which polyacetylene, polyaniline, polythiophene and polypyrrole are known. By adding a dopant such as barium sulfate, it is possible to confer electric conductivity thereto. The anti-corrosion effects of electroconductive polymers are not understood in detail, but they are assumed to exhibit corrosion resistant current rectification effects and oxygen reduction inhibiting effects at interfaces due to their electroconductivity, and act as cathode corrosion inhibitors.

These organic-based corrosion inhibitors may be used alone or in mixtures of 2 or more, and the amount thereof added is 0.001–2, preferably 0.01–1 and more preferably 0.02–0.5 in terms of the molar ratio of the organic-based corrosion inhibitor to the rare earth element ion (organic-based corrosion inhibitor/rare earth element ion). If the molar ratio is less than 0.001 the effect of addition will be insufficient, and if it is greater than 2 the adhesion will be inadequate.

Also, the form of these organic-based corrosion inhibitors in the film is not particularly restricted, and they may be included in the film by a method whereby they are added and mixed directly into the treatment solution. Alternatively, they may be predissolved in the phosphate and then added to the treatment solution, or they may be completely dissolved in an alcohol such as ethanol or isopropyl alcohol after which deionizing water is added dropwise to form a fine colloid which is added to the treatment solution.

In addition to a rare earth element compound such as a cerium compound, etc., an effect of reinforcing the barrier effect of the corrosion resistant coating layer or suppressing elution of the added components can be obtained, or the cathode anticorrosion or anode anticorrosion can be reinforced, by further adding $SiO_2$, $Cr_2O_3$, $Cr(OH)_3$, $Al_2O_3$, calcium hydroxide, calcium carbonate, calcium oxide, zinc phosphate, zinc hydrogen phosphate, potassium phosphate, potassium hydrogen phosphate, calcium phosphate, calcium hydrogen phosphate, calcium silicate, zirconium silicate, aluminum phosphate, aluminum hydrogen phosphate, titanium oxide, zirconium phosphate, zirconium hydrogen phosphate, sulfuric acid, sodium sulfate, sodium hydrogen sulfate, phosphoric acid, polyphosphoric acid, sodium phosphate, sodium hydrogen phosphate, etc.

A typical process for producing a surface treated metal material film according to the first aspect of the invention involves thoroughly mixing the rare earth element compound and the oxyacid, heat treating the mixture (100–200° C., 0.5–24 hours) and if necessary adding an organic-based corrosion inhibitor to the resulting paste product and thoroughly mixing. Added components such as cerium compounds and a sufficient amount of water are also added if necessary. Addition of added components and water can increase the corrosion resistance and film formability. The treatment solution is applied to the metal material, dried and heat treated (for example, at a metal material temperature of 100–200° C. for 30 seconds to 1 hour) to obtain the desired surface treated metal material.

According to a second aspect of the invention, a resin may be added to the oxyacid compound (or hydrogen oxyacid compound) of the rare earth element and/or group IVA element to improve the working-follow-up property.

The resin component used for the invention is not particularly restricted so long as it does not notably impair the dispersion stability of the oxyacid compound and/or hydrogen oxyacid compound of the rare earth element and/or group IVA element in the treatment solution, and it may be a material which when added in a large amount physically holds the oxyacid compound and/or hydrogen oxyacid compound of the rare earth element and/or group IVA element and provides adhesion with the metal material. As common examples there may be mentioned acrylic-based, epoxy-based and olefin-based organic resins, and their form may be appropriately selected from among aqueous solutions, water-dispersed emulsion resins, latexes and the like.

The weight ratio of the oxyacid compound or hydrogen oxyacid compound of the rare earth element and/or group IVA element or mixture thereof which is the main component of the coating layer with respect to the resin (oxyacid compound or hydrogen oxyacid compound of the rare earth element and/or group IVA element or mixture/resin) is 0.001–1000, preferably 0.01–100, and more preferably 0.1–10. At lower than 0.001 the inorganic components will be insufficient, leading to inadequate corrosion resistance, and at higher than 1000 the resin component will be insufficient, resulting in no improvement in the working-follow-up property.

The process for producing a surface treated metal material according to the second aspect of the invention may be one in which the treatment solution is coated and dried onto the metal material surface, and it is not particularly restricted. For example, currently used chromate treatment application equipment and paint coating equipment may be used without modifications, so that no special equipment is required. A brush coater or bar coater may also be used for formation of the film by manual coating and drying. The drying conditions cannot be specified for all cases, but the drying is generally carried out so that at least the solvent in the treatment solution is dried and in a temperature range in which the included resin matrix component does not decompose. For example, the surface of the metal material will preferably reach a temperature in the range of 50° C.–200° C. The film thickness cannot be specified as it will vary depending on the use, but it is preferred to be at least 0.01 μm. It is more preferably at least 0.1 μm. At less than 0.01 μm the corrosion resistance will be insufficient. However, since the effect of improved corrosion resistance becomes saturated even with a film thickness of over 10 μm, a thickness of 10 μm is sufficient from an economical standpoint.

The other details may be basically identical to those of the first aspect.

According to a third aspect of the invention, a film containing the rare earth element and/or group IVA element compound in a resin matrix is provided as the corrosion resistant coating layer.

The rare earth element and/or group IVA element compound is suitably one of the aforementioned oxyacid compounds, hydrogen oxyacid compounds or mixtures thereof, but it may also be an oxide, hydroxide, chloride or other salt. The mechanism of rare earth metal elements and group IV elements is not fully understood, but since they have an anti-corrosion function their particle forms are used as corrosion inhibitors, and by forming films in which they are dispersed in resins it is possible to obtain chromium-free corrosion resistant coating layers. In particular, since it is difficult to form satisfactory films with compounds other than oxyacid compounds and hydrogen oxyacid compounds, their films can be effectively formed by their inclusion in resin matrixes.

The rare earth metal compound used according to the invention is preferably one which is poorly water soluble in order to impart long-term corrosion resistance, and the solubility of the rare earth metal compound in water at pH 6–7 is preferably 0.01 mol/l or less in terms of the rare earth metal element. More preferably, the solubility at pH 5–8 is 0.01 mol/l or less in terms of the rare earth metal element to ensure further long-term corrosion resistance. If the solubility in water at pH 6–7 is greater than 0.01 mol/l, the rare earth metal element compound will easily elute out from the film in moist environments such as rain and dew, thus lowering the long-term corrosion resistance in such moist environments.

Also, in order to impart corrosion resistance at worked parts and wounded parts, rare earth metal element compounds which are rendered water-soluble under acidic conditions are preferred. Specifically, it is preferred for the solubility of the rare earth metal element compound at pH 3 or lower to be at least 0.1 mol/l in terms of the rare earth metal element. At 0.1 mol/l or greater, the rare earth metal element compound will dissolve in response to lower pH at the sites of corrosion, thus providing a function whereby the accelerated corrosion sections such as worked parts and injured parts can be selectively repaired. At less than 0.1 mol/l, supply of the rare earth metal element compound to the sites of corrosion will be insufficient when the film undergoes damage by intense working or is exposed to severely corroding environments, so that the corrosion resistance will be reduced.

The rare earth metal element compound used according to the invention may be added alone as the only type in the same film, but a plurality of rare earth metal compounds with different rare earth metal elements or oxyacids may also be added. Addition of a plurality of oxyacid compounds of rare earth metal elements can provide suitability for a wider variety of different corroding environments, but since there is a practical limit to the film thickness depending on production costs and film properties such as weldability, the absolute amount of the rare earth metal element compound added per unit area of the film will be limited, so that the amounts and types must be optimized.

The amount of the rare earth element compound present in a given film on a metal sheet cannot be specified because the necessary amount will vary depending on the desired corrosion resistance, but usually 1 $mg/m^2$ or greater in terms of the rare earth metal is satisfactory. At less than 1 $mg/m^2$ the effect of addition is inadequate and improved corrosion resistance will not be achieved for the film. Since the effect of improved corrosion resistance is saturated with addition of greater than 10 $mg/m^2$, an amount of 10 $mg/m^2$ is sufficient from an economical standpoint.

The resin matrix component used for the invention is not particularly restricted so long as it does not notably impair the dispersion stability of the rare earth metal element in the treatment solution, and it may be a material which physically holds the rare earth metal element and provides adhesion with the metal sheet. As common examples there may be mentioned acrylic-based, epoxy-based and olefin-based organic resins, and their form may be appropriately selected from among aqueous solutions, water-dispersed emulsion resins, latexes and the like.

For enhanced performance, the film of the invention may also be used in combination with passivation film forming aids, surfactants such as dispersing agents and anti-foaming agents, and other additives, as mentioned above.

The film thickness will vary depending on the use and cannot be specified for all cases, but 0.01 μm or greater is preferred. A thickness of 0.1 μm or greater is more preferred. At less than 0.01 μm, the corrosion resistance will be insufficient. However, since the effect of improved corrosion resistance becomes saturated with a film thickness of over 10 μm, a thickness of 10 μm is sufficient from an economical standpoint.

According to a fourth aspect of the invention, a film composed mainly of a rare earth element and/or group IVA element compound is used as a first layer which is in turn coated with a film composed mainly of a resin as a second layer.

The first layer primarily comprises the inorganic corrosion resistant coating layer, and by coating an organic film thereon the first layer is stabilized to improve the corrosion resistance. Controlling elution of the first layer can also improve the corrosion resistance. However, coating with the second layer according to this aspect is also effective when the first layer is a corrosion resistant coating layer such as explained above for the second and third aspects of the invention.

Because the oxyacid compound and/or hydrogen oxyacid compound of the rare earth element or group IVA element is in paste form and will probably form an amorphous (non-crystalline) inorganic polymer, it exhibits a working-follow-up property even as a film and the barrier effect inhibits corrosion while excess oxyacid forms an oxyacid salt-type passivation film, and since an oxide-type passivation film can be formed it is possible to obtain an inorganic-based corrosion resistant chemical treatment film with higher anti-corrosion performance. Suitable oxyacid compounds include phosphate compounds and/or hydrogen phosphate compounds, and phosphate types such as ortho-phosphates, meta-phosphates and polyphosphates. Hydrogen polyphosphate compounds are particularly preferred.

The rare earth metal element and/or group IVA element compound used for the invention is preferably one with poor water solubility in order to impart long-term corrosion resistance, and the solubility of the rare earth metal element and/or group IVA element compound in water is preferably no greater than 0.01 mol/l at pH 6–7 in terms of the metal element. More preferably, the solubility is no greater than 0.01 mol/l at pH 5–8 in terms of the metal element, in order to ensure long-term corrosion resistance. If the solubility in water at pH 6–7 exceeds 0.01 mol/l, the rare earth metal element and/or group IVA element compound will easily elute out from the film in moist environments such as rain and dew, thus lowering the long-term corrosion resistance in such moist environments.

Also, in order to impart corrosion resistance at worked parts and wounded parts, rare earth metal elements and/or group IVA element compounds which are rendered water-soluble under acidic conditions are preferred. Specifically, it is preferred for the solubility of the rare earth metal element and/or group IVA element compound at pH 3 or lower to be at least 0.1 mol/l in terms of the metal element. At 0.1 mol/l or greater, the rare earth metal element and/or group IVA element compound will dissolve in response to lower pH at the sites of corrosion, thus providing a function whereby the accelerated corrosion sections such as worked parts and wounded parts can be selectively repaired. At less than 0.1 mol/l, supply of the rare earth metal element and/or group IVA element compound to the sites of corrosion will be insufficient when the film undergoes damage by intense working or is exposed to severely corroding environments, so that the corrosion resistance will be reduced.

The rare earth metal element and/or group IV element compound used may be added alone as the only type in the same film, but a plurality of rare earth metal element and/or group IVA element compounds with different rare earth metal elements and/or group IVA elements or oxyacids may also be added. Addition of a plurality of oxyacid compounds of rare earth metal elements and/or group IVA elements can provide suitability for a wider variety of different corroding environments, but since there is a practical limit to the film thickness depending on production costs and film properties such as weldability, the absolute amount of the rare earth metal element and/or group IVA element compound added per unit area of the film will be limited, so that the amounts and types must be optimized.

The amount of the rare earth element and/or group IVA element compound present in a given film on a metal sheet cannot be specified because the necessary amount will vary depending on the desired corrosion resistance, but usually 1 $mg/m^2$ or greater in terms of the metal is satisfactory. At less than 1 $mg/m^2$ the effect of addition is inadequate and no improved corrosion resistance will be achieved for the film. Since the effect of improved corrosion resistance is saturated even with addition at greater than 10 $g/m^2$, an amount of 10 $g/m^2$ is sufficient from an economical standpoint.

The resin component applied as the second layer is not particularly restricted so long as it has adhesion for the first layer of the rare earth metal element and/or group IVA element compound. As common examples there may be mentioned acrylic-based, epoxy-based and olefin-based organic resins, and their form may be appropriately selected from among aqueous solutions, water-dispersed emulsion resins, latexes and the like.

For enhanced performance, the first layer and second layer films may be used in combination with organic corrosion inhibitors, passivation film forming aids, surfactants such as dispersing agents and anti-foaming agents, and other additives. As passivation film forming aids there may be added phosphoric acid or polyphosphoric acid, or other additives including calcium hydroxide, calcium carbonate, calcium oxide, zinc phosphate, potassium phosphate, calcium phosphate, calcium silicate, zirconium silicate, aluminum phosphate, zirconium phosphate, $TiO_2$, $SiO_2$, $Al_2O_3$, etc.

The process for producing a surface treated metal sheet according to this aspect of the invention may be one in which a treatment solution composed mainly of the rare earth metal element and/or group IVA element compound is applied and dried onto the metal sheet surface, after which a chemical solution composed mainly of the resin is applied and dried thereon, and there are no particular restrictions on the specific conditions and means therefor. For example, currently used chromate treatment application equipment and paint coating equipment may be used without modifications, so that no special equipment is required. A brush coater or bar coater may also be used for formation of the film by manual coating and drying.

The film thickness cannot be specified as it will vary depending on the use, but it is preferred for the thickness of the first layer to be at least 0.05 µm. It is more preferably at least 0.1 µm. Also, the thickness of the second layer is preferably at least 0.1 µm, and more preferably at least 0.4 µm. The total thickness of the first and second layers is preferably at least 0.2 µm, and more preferably at least 0.5 µm. At less than 0.2 µm a corrosion-inhibiting effect will be achieved, but it will be inadequate. However, since the effect of improved corrosion resistance becomes saturated with a film thickness of over 10 µm, a thickness of 10 µm is sufficient from an economical standpoint.

Figure 4:
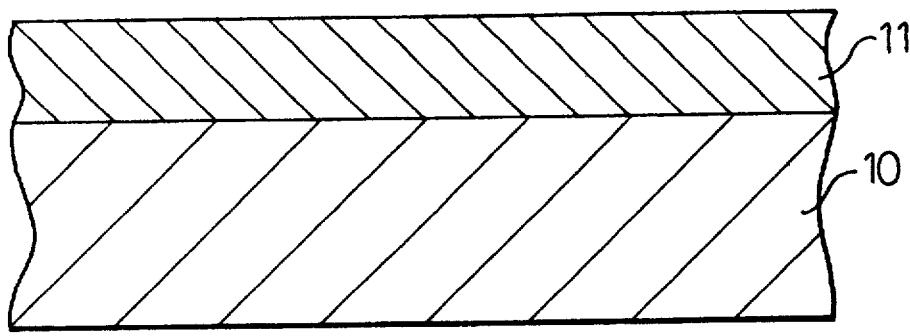
FIGS. 4 and 5 are cross-sectional views of an embodiment of a surface treated metal material according to the invention.
Figure 5:
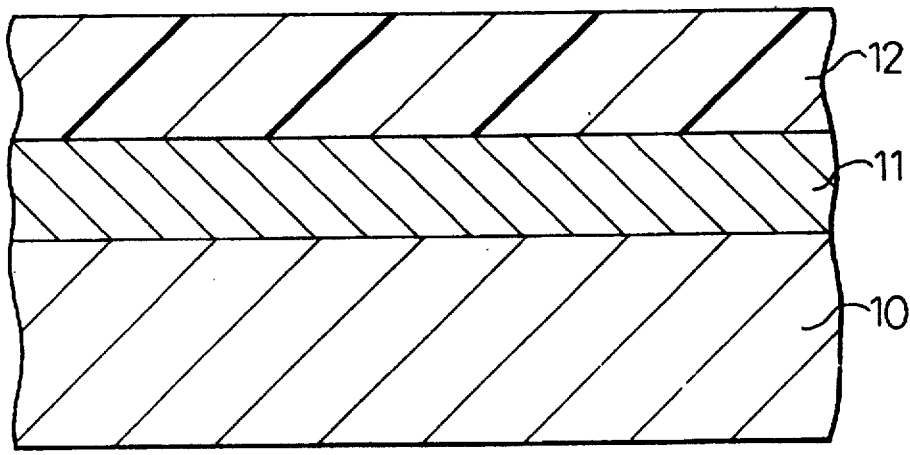

FIG. 4 shows a surface treated metal material according to any of the first to third aspects of the invention, wherein 11 indicates a zinc steel sheet or other metal material, and 10 indicates a corrosion resistant coating layer thereon. FIG. 5 shows a surface treated metal material according to the fourth aspect of the invention, wherein 11 indicates a zinc steel sheet or other metal material, 12 indicates a corrosion resistant coating layer as the first layer and 13 indicates a resin layer as the second layer.

According to another aspect of the present invention there is provided a surface treatment agent which comprises 0.05–4 mol/kg of a rare earth and/or group IVA element compound in terms of the rare earth element and/or group IVA element such as lanthanum or cerium, and 0.5–100 moles of a phosphate compound and/or hydrogen phosphate compound in terms of $H_3PO_4$ to one mole of the rare earth element and/or group IVA element. A resin component may also be added if necessary.

A corrosion resistant coating layer containing no hexavalent chromium and a process for its production are disclosed in International Patent Application Disclosure (Kohyo) WO88/06639, whereby trivalent cerium ion dissolved in a treatment solution is deposited as a hydroxide on the surface of a metal material by cathode reaction, and then hydrogen peroxide is used for oxidation to tetravalency to obtain a $CeO_2$ layer with an excellent anti-corrosion property. The coating layer obtained by this process has poor adhesion to metal materials, and it lacks long-lasting corrosion resistance.

In addition, this $CeO_2$ film can be expected to have absolutely no working-follow-up properties, and this limits its use considerably. Japanese Unexamined Patent Publication (Kokai) No. 5-331658 discloses a surface treatment solution composed mainly of zinc ion, phosphate ion, a lanthanum compound and a film conversion accelerator, as well as a zinc phosphate treatment process, as a surface treatment process whereby an electrodeposition coating is applied to a metal surface to form a zinc phosphate film with excellent coating adhesion and corrosion resistance; however, the main gist of the disclosure is zinc phosphate treatment by application, and since the disclosed lanthanum metal concentration contained in the solution is 0.001–3 g/liter, i.e. in terms of the molar concentration, which is a low value of $7 \times 10^{-6}$ to 0.22 moles/liter, despite the inclusion of the lanthanum compound in the zinc phosphate treatment film it has not been possible to achieve the high anti-corrosion function with the film alone, as with conventional chromate films.

The surface treatment agent and treatment bath for aluminum or its alloy disclosed in Japanese Unexamined Patent Publication No. 2-25579 contains cerium ion, zirconium ion, phosphate ion and fluoride ion, and aluminum is etched by the fluoride ion and forms a highly corrosion resistant film with the cerium, zirconium, phosphate and fluoride ion present in the solution; however, the solution composition involves the etching which is limited to the materials of aluminum and its alloys, while the effect is achieved in the low concentration ranges of 10–1000 ppm for cerium ion and 10–500 ppm for phosphate ion.

Jour. Electrochemical Soc. 1991, Vol.138, p.390 describes inhibition of soft steel anode dissolution by addition of trivalent cerium ion to a corrosion resistant solution, while Corrosion Sci. 1993, Vol.34, p.1774 discloses notably inhibited reduction of solution-dissolved oxygen using stainless steel which has been subjected to ion implantation with cerium ion under vacuum, although this is not industrially practical. As exemplified by these prior art techniques, cerium is well-known to be effective for improving the corrosion resistance of metal materials, but there is a need for a surface treatment agent which can be applied to metal materials in general and which is suitable for industrial mass production.

In order to solve this problem, the present inventors have diligently studied surface treatment agents which form corrosion resistant coating layers containing no hexavalent chromium and, as a result, have discovered the surface treatment agent described above, which is composed mainly of a rare earth element such as lanthanum or cerium, and phosphoric acid.

For convenience in explanation, lanthanum will be referred to as the rare earth element and/or group IVA element; the surface treatment agent is a surface treatment agent for metal materials which is characterized by being composed mainly of a lanthanum compound and phosphoric acid and a diluting agent, with the lanthanum compound present as a phosphate compound, hydrogen phosphate compound, oxide, hydroxide or a mixture thereof, and by further containing additives such as another rare earth element compound, particularly a cerium compound, and an organic-based corrosion inhibitor. The concentration of the lanthanum compound in the surface treatment agent is the number of moles of lanthanum contained in 1 kg of the surface treatment agent. The number of moles of lanthanum per 1 liter of surface treatment agent is not used because of the high amount of lanthanum compound and phosphoric acid in the treatment agent and the wide range of relative density of the treatment agent, which makes it difficult to express it in terms of volume concentration. The phosphoric acid in the treatment agent refers to phosphate ion and hydrogen phosphate ion which forms ortho-phosphoric acid, meta-phosphoric acid, poly-phosphoric acid and phosphate compounds, and its concentration will be expressed in terms of the molar ratio of $H_3PO_4$ with respect to lanthanum.

The phosphate compound or hydrogen phosphate compound of lanthanum which is one of the main components of the treatment agent can be easily obtained by chemical reaction between a lanthanum compound, for example an inorganic salt such as lanthanum chloride or lanthanum nitrate or an oxide such as lanthanum oxide or lanthanum hydroxide, and an ortho-phosphoric acid, poly-phosphoric acid or meta-phosphoric acid or a phosphate salt such as sodium hydrogen phosphate. Here, it is preferred for the starting material to be a lanthanum compound of a volatile acid such as a chloride or nitrate, to facilitate heat removal of the anions, but lanthanum compounds comprising anti-corrosive anions which are non-volatile, such as molybdate salts and tungstate salts, may also be reacted with phosphoric acid. More preferably, a lanthanum phosphate compound or hydrogen phosphate compound is obtained by reaction between an oxide or hydroxide and phosphoric acid. Alternatively, a surface layer alone of the phosphate compound mixture obtained by reaction of particles of lanthanum oxide or lanthanum hydroxide with a phosphoric acid under relatively mild conditions may be used. They may also be natural phosphate compounds produced as minerals.

The surface treatment agent is composed mainly of a lanthanum compound and phosphoric acid, and more specifically it is composed mainly of a phosphate compound, hydrogen phosphate compound, oxide or hydroxide of lanthanum or a mixture thereof and phosphoric acid, in combination with water or a mixture of water and a water-soluble organic solvent as a diluting agent. The organic solvent selected is usually methanol or ethanol for the purpose of reducing the viscosity of the surface treatment agent and increasing the accelerated drying effect. The lanthanum compound used as the starting material for the surface treatment agent may also include many other rare earth element compounds, for example, yttrium, neodymium and cerium, derived from rare earth ores during production and purification and their presence is not a hindrance. The phosphoric acid used is ortho-phosphoric acid, meta-phosphoric acid, poly-phosphoric acid or a mixture thereof. Here, poly-phosphoric acid with the average molecular formula $H_6P_4O_{13}$ is a tetramer of $H_3PO_4$, i.e. 4 moles of $H_3PO_4$ in one mole of the poly-phosphoric acid.

The concentration of the lanthanum compound contained in the surface treatment agent is characterized by being 0.05–4 mol/kg in terms of lanthanum. The lower limit of 0.05 mol/kg for the concentration of the lanthanum compound is the minimum concentration required to coat a metal material with a lanthanum compound/phosphoric acid-based film having the same excellent corrosion resistance as a chromate film, and it is more preferably 0.1 mol/kg or greater. The upper concentration limit of 4 mol/kg is the upper limit which can give a relatively hard paste-form treatment agent comprising a lanthanum compound, phosphoric acid and a slight amount of diluting agent, to form a uniform coating layer on a metal material surface, and the lanthanum compound concentration is more preferably no greater than 2 mol/kg.

Also, the major components of the surface treatment agent are the lanthanum compound and phosphoric acid, and it is characterized by containing 0.5–100 moles of phosphoric acid in terms of $H_3PO_4$ to one mole of the lanthanum compound in terms of lanthanum. The lower limit for the molar ratio of lanthanum to phosphoric acid is the minimum phosphoric acid necessary to coat a metal material surface with the lanthanum compound. Further lowering of the proportion of phosphoric acid will result in a lack of phosphate ions to contribute to adhesion with the metal material surface, due to consumption of phosphate ions as they react with the particle surfaces of the lanthanum oxide or hydroxide compound, thus producing lower corrosion resistance, and in particular, the working follow-up property of the film will become notably inadequate resulting in lower worked portion corrosion resistance. In order to obtain a film with excellent corrosion resistance, the molar ratio of lanthanum to phosphoric acid should be at least 0.5, and especially for obtaining films with excellent worked portion corrosion resistance, it is preferably at least 2, and more preferably at least 5. Such an excess of phosphoric acid is effective for forming the lanthanum hydrogen phosphate compound, while the metal element in the metal material surface also reacts with zinc, for example, to form a zinc phosphate compound, thus increasing the adhesion of the coating layer and having the effect of improving the corrosion resistance of the coating layer composed mainly of the lanthanum compound and phosphoric acid.

The surface treatment agent for metal materials according to the invention may also contain another rare earth compound, such as a cerium compound, and an organic-based corrosion inhibitor for a still greater rust-prevention effect of the resulting coating layer. The cerium compound added may be one or more compounds selected from among phosphate, hydrogen phosphate, oxide, hydroxide, halide, carbonate, sulfate, nitrate, organic acid compounds and the like, and the valency of the selected cerium may be 3, 4 or a combination thereof. The amount of the added cerium compound is from a molar ratio of 1 to 0.001 in terms of cerium to lanthanum. If the molar ratio of cerium to lanthanum is high, for example 1–0.1, it becomes a major constituent component of the coating layer together with the lanthanum compound and phosphoric acid, and therefore a cerium compound with low solubility, such as a phosphate, hydrogen phosphate, oxide, hydroxide or mixture thereof, is preferably selected. At a molar ratio of 0.1–0.001, compounds with low solubility, as well as soluble cerium compounds such as the aforementioned halides, may also be preferably selected.

The organic-based corrosion inhibitor may be one of the compounds mentioned previously.

The amount of the organic-based corrosion inhibitor to be added is at a molar ratio of 2–0.001 to the lanthanum, and the molar ratio for addition is selected not only for reinforcement of the corrosion inhibiting effect but also depending on the composition of the surface treatment agent and the method of forming the coating layer. For example, in the case of an organic-based corrosion inhibitor which strongly binds to the metal ion which corrodes out of the metal material, such as a combination with a quinoline derivative, an effect can be achieved at a low concentration with a molar ratio to lanthanum of 0.01–0.001.

In the case of a type of corrosion inhibitor which adheres to the metal material surface to inhibit anodic reaction, such as a formylated derivative of N-phenyl-dimethylpyrrole, a high proportion at a molar ratio of 0.01 or greater is advantageous if the purpose of addition is especially that of suppressing metal dissolution and generation of hydrogen during the process of forming the coating layer. Also, a molar ratio to lanthanum of 0.1 or greater may be used if the purpose of addition is for the organic-based corrosion inhibitor to also constitute one of the main components of the coating layer, and for example by adding the electroconductive polymer polyaniline, it is possible to confer electroconductivity to the coating layer while also giving it a corrosion resistant function. If the molar ratio is less than 0.001, the effect of adding the organic-based corrosion inhibitor will be inadequate, and at greater than 2 the adhesion with the coating layer will be insufficient and the working follow-up property will be impaired.

The molar ratio of the organic-based corrosion inhibitor with respect to the lanthanum is also selected based on the desired thickness of the film layer, and for example when forming a thick coating layer for strongly corrosive environments, a sufficient effect can be achieved since the absolute amount of the organic-based corrosion inhibitor in the coating layer is high even if its molar ratio to lanthanum is low on the order of 0.01. On the other hand, when using a diluted treatment agent with a low lanthanum concentration for the purpose of forming a thin coating layer for weakly corrosive environments, the organic-based corrosion inhibitor is preferably present at a high molar ratio of 0.1–2 with respect to lanthanum.

The above explanation has been made with lanthanum selected as the rare earth element and/or group IVA element, but the same effect of the treatment agent of the invention is achieved even if lanthanum is replaced with another rare earth element and/or group IVA element, such as cerium. When lanthanum is replaced with cerium, a lanthanum compound is preferred as the other rare earth compound used in combination therewith.

This surface treatment agent is a surface treatment agent for metal materials characterized by being composed mainly of a rare earth element compound and phosphoric acid, with water or a mixture of water and a water-soluble organic solvent as a diluting medium. Diluting mediums include the water included in the starting material used in the process for producing the surface treatment agent, the water or organic solvent used for dissolution of the starting material, and the water or organic solvent for dilution of the original treatment agent. Depending on the relative amount of the diluting agent with respect to the rare earth element compound, the phosphoric acid, the other rare earth element compound and the organic-based corrosion inhibitor, the surface treatment agent will exhibit a hard paste form, a soft paste form, a colloid form or a solution form with low solid dispersion, and the range of the dilution may be determined based on the degree of corrosion resistance desired for the film and the method of coating the metal material surface with the film.

For example, surface treatment agents with a low molar ratio of phosphoric acid to the rare earth element and/or group IVA element and a high rare earth element and/or group IVA element concentration are effective for forming highly corrosion resistant films of 1–10 μm thickness by coating methods. If the degree of dilution is increased by addition of water or a water-soluble organic solvent, surfaces can be coated with films of 0.1–1 μm by spray methods. The degree of dilution may also be increased for coating of films of 0.1 μm and less by dipping methods.

This treatment agent exhibits strong acidity, but the hydrogen ion concentration (pH) may optionally be adjusted depending on the purpose or the type of metal material to be surface treated.

An added component such as $SiO_2$ or $Al_2O_3$ mentioned above may also be dispersed in the treatment agent for the purpose of supplementing the rust-preventing effect of a coating layer which has the rare earth element and/or group IVA element compound and phosphoric acid as the main components and further contains another rare earth element compound and an organic-based corrosion inhibitor.

The form of the oxyacid compound and/or hydrogen oxyacid compound, or other compound, of the rare earth element and/or group IVA element in the treatment agent will depend on the solvent used and on the pH, temperature and concentration, but a solution state or a colloid state finely dispersed in the treatment solution is preferred. With other forms there is a possibility that the dispersion state of the oxyacid compound and/or hydrogen oxyacid compound of the rare earth element and/or group IVA element may lose its uniformity when formed into a film, or that the anticorrosion performance may be lower in areas where the oxyacid compound and/or hydrogen oxyacid compound of the rare earth element and/or group IVA element is present in smaller amounts.

When the oxyacid compound and/or hydrogen oxyacid compound of the rare earth element and/or group IVA element is in the form of a colloidal fine dispersion, its average particle size is preferably no greater than 3 μm, more preferably no greater than 1 μm, and especially no greater than 0.2 μm. When the particle size is 3 μm or larger, problems may result such as loss of uniformity of the dispersion of the oxyacid compound and/or hydrogen oxyacid compound of the rare earth element and/or group IVA element in the treatment solution or film, as well as limitations to the thickness of the film.

A treatment solution for formation of a film containing a resin basically consists of a rare earth metal element compound, a matrix component and a solvent, and there are no particular restrictions on the concentration or pH of such a treatment solution. The solvent may be selected from among aqueous and volatile organic compounds. However, an aqueous solvent is preferred from the standpoint of the working environment.

The method for applying the present invention to these metal materials is not particularly restricted, and any conventional publicly known method may be used including dipping, spraying and painting, while the method of drying may be appropriately selected within a temperature range of from room temperature to a high temperature of about 300° C., depending on the performance demanded for the coating layer, the treatment agent composition and the method of forming the coating layer.

EXAMPLES

Examples 1–6
(Preparation method for treatment solution)

Example 1

[1] After thoroughly mixing 32.6 g of lanthanum oxide with 69.2 g, 115.3 g and 173.0 g of phosphoric acid (85%), the mixtures were heated at 100–200° C. for 0.5 to 24 hours, and the resulting paste-like products were used as treatment solutions (Samples No.1 to 3 in Table 1).

To treatment solution No.2 there were added lanthanum hydroxide, cerium oxide, cerium hydroxide, cerium chloride and cerium acetate each with a molar ratio of 1:10 for cerium to lanthanum, and these were mixed to make treatment solutions (No.4 to 8 in Table 1).

[2] In [1] above, the phosphoric acid was replaced with 261.0 g of an aqueous ammonium tungstate solution (4%) as $5(NH_4)_2O \cdot 12WO_3 \cdot 5H_2O$, 176.6 g of an ammonium molybdate solution (28%) as $(NH_4)_6 \cdot Mo_7O_{24} \cdot 4H_2O$ and 117.0 g of an aqueous ammonium vanadate solution (5%) as $NH_4.VO_3$ which were added and mixed therewith to give paste-like products (Samples No.9, 15 and 21 in Table 1), and then lanthanum hydroxide, cerium oxide, cerium hydroxide, cerium chloride and cerium acetate were combined therewith in the same manner as in [1] above (Samples No.10–14, 16–20 and 22–26 in Tables 1 and 2).

Example 2

Treatment solutions (Samples No.27–52 in Table 2) were prepared in the same manner as Example 1, except that 23.5 g of cerium phosphate was used instead of lanthanum oxide.

Example 3

Treatment solutions (Samples No.53–78 in Table 3) were prepared in the same manner as Example 1, except that 30.3 g of yttrium chloride hexahydrate was used instead of lanthanum oxide.

Example 4

Treatment solutions (Samples No.79–104 in Table 4) were prepared in the same manner as Example 1, except that 39.6 g of neodymium chloride hexahydrate was used instead of lanthanum oxide.

All of the reagents used in Examples 1–4 were commercially available products.

TABLE 1

| Sample No. | Rare earth element | Oxyacid | | lanthanum hydroxide | cerium oxide | cerium hydroxide | cerium chloride | cerium acetate |
|---|---|---|---|---|---|---|---|---|
| | | | | | | Additive | | |
| 1 | lanthanum oxide 32.6 g | phosphoric acid | 62.9 g | — | — | — | — | — |
| 2 | lanthanum oxide 32.6 g | phosphoric acid | 115.3 g | — | — | — | — | — |
| 3 | lanthanum oxide 32.6 g | phosphoric acid | 173.0 g | — | — | — | — | — |
| 4 | lanthanum oxide 32.6 g | phosphoric acid | 115.3 g | 3.8 g | — | — | — | — |
| 5 | lanthanum oxide 32.6 g | phosphoric acid | 115.3 g | — | 3.4 g | — | — | — |
| 6 | lanthanum oxide 32.6 g | phosphoric acid | 115.3 g | — | — | 4.2 g | — | — |
| 7 | lanthanum oxide 32.6 g | phosphoric acid | 115.3 g | — | — | — | 7.5 g | — |
| 8 | lanthanum oxide 32.6 g | phosphoric acid | 115.3 g | — | — | — | — | 6.7 g |
| 9 | lanthanum oxide 32.6 g | aqueous ammonium tungstate | 261.0 g | — | — | — | — | — |
| 10 | lanthanum oxide 32.6 g | aqueous ammonium tungstate | 261.0 g | 3.8 g | — | — | — | — |
| 11 | lanthanum oxide 32.6 g | aqueous ammonium tungstate | 261.0 g | — | 3.4 g | — | — | — |
| 12 | lanthanum oxide 32.6 g | aqueous ammonium tungstate | 261.0 g | — | — | 4.2 g | — | — |
| 13 | lanthanum oxide 32.6 g | aqueous ammonium tungstate | 261.0 g | — | — | — | 7.5 g | — |
| 14 | lanthanum oxide 32.6 g | aqueous ammonium tungstate | 261.0 g | — | — | — | — | 6.7 g |
| 15 | lanthanum oxide 32.6 g | aqueous ammonium molybdate | 176.6 g | — | — | — | — | — |
| 16 | lanthanum oxide 32.6 g | aqueous ammonium molybdate | 176.6 g | 3.8 g | — | — | — | — |
| 17 | lanthanum oxide 32.6 g | aqueous ammonium molybdate | 176.6 g | — | 3.4 g | — | — | — |
| 18 | lanthanum oxide 32.6 g | aqueous ammonium molybdate | 176.6 g | — | — | 4.2 g | — | — |
| 19 | lanthanum oxide 32.6 g | aqueous ammonium molybdate | 176.6 g | — | — | — | 7.5 g | — |
| 20 | lanthanum oxide 32.6 g | aqueous ammonium molybdate | 176.6 g | — | — | — | — | 6.7 |
| 21 | lanthanum oxide 32.6 g | aqueous ammonium vanadate | 117.0 g | — | — | — | — | — |
| 22 | lanthanum oxide 32.6 g | aqueous ammonium vanadate | 117.0 g | 3.8 g | — | — | — | — |
| 23 | lanthanum oxide 32.6 g | aqueous ammonium vanadate | 117.0 g | — | 3.4 g | — | — | — |
| 24 | lanthanum oxide 32.6 g | aqueous ammonium vanadate | 117.0 g | — | — | 4.2 g | — | — |
| 25 | lanthanum oxide 32.6 g | aqueous ammonium vanadate | 117.0 g | — | — | — | 7.5 g | — |
| 26 | lanthanum oxide 32.6 g | aqueous ammonium vanadate | 117.0 g | — | — | — | — | 6.7 g |

TABLE 2

| Sample No. | Rare earth element | Oxyacid | | lanthanum hydroxide | cerium oxide | cerium hydroxide | cerium chloride | cerium acetate |
|---|---|---|---|---|---|---|---|---|
| | | | | | | Additive | | |
| 27 | cerium phosphate 23.5 g | phosphoric acid | 57.7 g | — | — | — | — | — |
| 28 | cerium phosphate 23.5 g | phosphoric acid | 115.3 g | — | — | — | — | — |
| 29 | cerium phosphate 23.5 g | phosphoric acid | 230.6 g | — | — | — | — | — |
| 30 | cerium phosphate 23.5 g | phosphoric acid | 115.3 g | 3.8 g | — | — | — | — |
| 31 | cerium phosphate 23.5 g | phosphoric acid | 115.3 g | — | 3.4 g | — | — | — |
| 32 | cerium phosphate 23.5 g | phosphoric acid | 115.3 g | — | — | 4.2 g | — | — |
| 33 | cerium phosphate 23.5 g | phosphoric acid | 115.3 g | — | — | — | 7.5 g | — |
| 34 | cerium phosphate 23.5 g | phosphoric acid | 115.3 g | — | — | — | — | 6.7 g |
| 35 | cerium phosphate 23.5 g | aqueous ammonium tungstate | 261.0 g | — | — | — | — | — |
| 36 | cerium phosphate 23.5 g | aqueous ammonium tungstate | 261.0 g | 3.8 g | — | — | — | — |
| 37 | cerium phosphate 23.5 g | aqueous ammonium tungstate | 261.0 g | — | 3.4 g | — | — | — |
| 38 | cerium phosphate 23.5 g | aqueous ammonium tungstate | 261.0 g | — | — | 4.2 g | — | — |
| 39 | cerium phosphate 23.5 g | aqueous ammonium tungstate | 261.0 g | — | — | — | 7.5 g | — |
| 40 | cerium phosphate 23.5 g | aqueous ammonium tungstate | 261.0 g | — | — | — | — | 6.7 g |
| 41 | cerium phosphate 23.5 g | aqueous ammonium molybdate | 176.6 g | — | — | — | — | — |
| 42 | cerium phosphate 23.5 g | aqueous ammonium molybdate | 176.6 g | 3.8 g | — | — | — | — |
| 43 | cerium phosphate 23.5 g | aqueous ammonium molybdate | 176.6 g | — | 3.4 g | — | — | — |
| 44 | cerium phosphate 23.5 g | aqueous ammonium molybdate | 176.6 g | — | — | 4.2 g | — | — |

TABLE 2-continued

| Sample No. | Rare earth element | Oxyacid | | lanthanum hydroxide | cerium oxide | cerium hydroxide | cerium chloride | cerium acetate |
|---|---|---|---|---|---|---|---|---|
| 45 | cerium phosphate 23.5 g | aqueous ammonium molybdate | 176.6 g | — | — | — | 7.5 g | — |
| 46 | cerium phosphate 23.5 g | aqueous ammonium molybdate | 176.6 g | — | — | — | — | 6.7 g |
| 47 | cerium phosphate 23.5 g | aqueous ammonium vanadate | 117.0 g | — | — | — | — | — |
| 48 | cerium phosphate 23.5 g | aqueous ammonium vanadate | 117.0 g | 3.8 g | — | — | — | — |
| 49 | cerium phosphate 23.5 g | aqueous ammonium vanadate | 117.0 g | — | 3.4 g | — | — | — |
| 50 | cerium phosphate 23.5 g | aqueous ammonium vanadate | 117.0 g | — | — | 4.2 g | — | — |
| 51 | cerium phosphate 23.5 g | aqueous ammonium vanadate | 117.0 g | — | — | — | 7.5 g | — |
| 52 | cerium phosphate 23.5 g | aqueous ammonium vanadate | 117.0 g | — | — | — | — | 6.7 g |

TABLE 3

| Sample No. | Rare earth element | Oxyacid | | lanthanum hydroxide | cerium oxide | cerium hydroxide | cerium chloride | cerium acetate |
|---|---|---|---|---|---|---|---|---|
| 53 | yttrium chloride.6H$_2$O 30.3 g | phosphoric acid | 57.7 g | — | — | — | — | — |
| 54 | yttrium chloride.6H$_2$O 30.3 g | phosphoric acid | 115.3 g | — | — | — | — | — |
| 55 | yttrium chloride.6H$_2$O 30.3 g | phosphoric acid | 230.6 g | — | — | — | — | — |
| 56 | yttrium chloride.6H$_2$O 30.3 g | phosphoric acid | 115.3 g | 3.8 g | — | — | — | — |
| 57 | yttrium chloride.6H$_2$O 30.3 g | phosphoric acid | 115.3 g | — | 3.4 g | — | — | — |
| 58 | yttrium chloride.6H$_2$O 30.3 g | phosphoric acid | 115.3 g | — | — | 4.2 g | — | — |
| 59 | yttrium chloride.6H$_2$O 30.3 g | phosphoric acid | 115.3 g | — | — | — | 7.5 g | — |
| 60 | yttrium chloride.6H$_2$O 30.3 g | phosphoric acid | 115.3 g | — | — | — | — | 6.7 g |
| 61 | yttrium chloride.6H$_2$O 30.3 g | aqueous ammonium tungstate | 261.0 g | — | — | — | — | — |
| 62 | yttrium chloride.6H$_2$O 30.3 g | aqueous ammonium tungstate | 261.0 g | 3.8 g | — | — | — | — |
| 63 | yttrium chloride.6H$_2$O 30.3 g | aqueous ammonium tungstate | 261.0 g | — | 3.4 g | — | — | — |
| 64 | yttrium chloride.6H$_2$O 30.3 g | aqueous ammonium tungstate | 261.0 g | — | — | 4.2 g | — | — |
| 65 | yttrium chloride.6H$_2$O 30.3 g | aqueous ammonium tungstate | 261.0 g | — | — | — | 7.5 g | — |
| 66 | yttrium chloride.6H$_2$O 30.3 g | aqueous ammonium tungstate | 261.0 g | — | — | — | — | 6.7 g |
| 67 | yttrium chloride.6H$_2$O 30.3 g | aqueous ammonium molybdate | 176.6 g | — | — | — | — | — |
| 68 | yttrium chloride.6H$_2$O 30.3 g | aqueous ammonium molybdate | 176.6 g | 3.8 g | — | — | — | — |
| 69 | yttrium chloride.6H$_2$O 30.3 g | aqueous ammonium molybdate | 176.6 g | — | 3.4 g | — | — | — |
| 70 | yttrium chloride.6H$_2$O 30.3 g | aqueous ammonium molybdate | 176.6 g | — | — | 4.2 g | — | — |
| 71 | yttrium chloride.6H$_2$O 30.3 g | aqueous ammonium molybdate | 176.6 g | — | — | — | 7.5 g | — |
| 72 | yttrium chloride.6H$_2$O 30.3 g | aqueous ammonium molybdate | 176.6 g | — | — | — | — | 6.7 g |
| 73 | yttrium chloride.6H$_2$O 30.3 g | aqueous ammonium vanadate | 117.0 g | — | — | — | — | — |
| 74 | yttrium chloride.6H$_2$O 30.3 g | aqueous ammonium vanadate | 117.0 g | 3.8 g | — | — | — | — |
| 75 | yttrium chloride.6H$_2$O 30.3 g | aqueous ammonium vanadate | 117.0 g | — | 3.4 g | — | — | — |
| 76 | yttrium chloride.6H$_2$O 30.3 g | aqueous ammonium vanadate | 117.0 g | — | — | 4.2 g | — | — |
| 77 | yttrium chloride.6H$_2$O 30.3 g | aqueous ammonium vanadate | 117.0 g | — | — | — | 7.5 g | — |
| 78 | yttrium chloride.6H$_2$O 30.3 g | aqueous ammonium vanadate | 117.0 g | — | — | — | — | 6.7 g |

TABLE 4

| Sample No. | Rare earth element | Oxyacid | | lanthanum hydroxide | cerium oxide | cerium hydroxide | cerium chloride | cerium acetate |
|---|---|---|---|---|---|---|---|---|
| 79 | neodymium chloride.6H$_2$O 39.6 g | phosphoric acid | 57.7 g | — | — | — | — | — |
| 80 | neodymium chloride.6H$_2$O 39.6 g | phosphoric acid | 115.3 g | — | — | — | — | — |
| 81 | neodymium chloride.6H$_2$O 39.6 g | phosphoric acid | 230.6 g | — | — | — | — | — |
| 82 | neodymium chloride.6H$_2$O 39.6 g | phosphoric acid | 115.3 g | 3.8 g | — | — | — | — |
| 83 | neodymium chloride.6H$_2$O 39.6 g | phosphoric acid | 115.3 g | — | 3.4 g | — | — | — |
| 84 | neodymium chloride.6H$_2$O 39.6 g | phosphoric acid | 115.3 g | — | — | 4.2 g | — | — |
| 85 | neodymium chloride.6H$_2$O 39.6 g | phosphoric acid | 115.3 g | — | — | — | 7.5 g | — |
| 86 | neodymium chloride.6H$_2$O 39.6 g | phosphoric acid | 115.3 g | — | — | — | — | 6.7 g |
| 87 | neodymium chloride.6H$_2$O 39.6 g | aqueous ammonium tungstate | 261.0 g | — | — | — | — | — |
| 88 | neodymium chloride.6H$_2$O 39.6 g | aqueous ammonium tungstate | 261.0 g | 3.8 g | — | — | — | — |
| 89 | neodymium chloride.6H$_2$O 39.6 g | aqueous ammonium tungstate | 261.0 g | — | 3.4 g | — | — | — |
| 90 | neodymium chloride.6H$_2$O 39.6 g | aqueous ammonium tungstate | 261.0 g | — | — | 4.2 g | — | — |
| 91 | neodymium chloride.6H$_2$O 39.6 g | aqueous ammonium tungstate | 261.0 g | — | — | — | 7.5 g | — |

TABLE 4-continued

| Sample No. | Rare earth element | Oxyacid | | Additive | | | | |
|---|---|---|---|---|---|---|---|---|
| | | | | lanthanum hydroxide | cerium oxide | cerium hydroxide | cerium chloride | cerium acetate |
| 92 | neodymium chloride.6H₂O 39.6 g | aqueous ammonium tungstate | 261.0 g | — | — | — | — | 6.7 g |
| 93 | neodymium chloride.6H₂O 39.6 g | aqueous ammonium molybdate | 176.6 g | — | — | — | — | — |
| 94 | neodymium chloride.6H₂O 39.6 g | aqueous ammonium molybdate | 176.6 g | 3.8 g | — | — | — | — |
| 95 | neodymium chloride.6H₂O 39.6 g | aqueous amnionium molybdate | 176.6 g | — | 3.4 g | — | — | — |
| 96 | neodymium chloride.6H₂O 39.6 g | aqueous ammonium molybdate | 176.6 g | — | — | 4.2 g | — | — |
| 97 | neodymium chloride.6H₂O 39.6 g | aqueous ammonium molybdate | 176.6 g | — | — | — | 7.5 g | — |
| 98 | neodymium chloride.6H₂O 39.6 g | aqueous ammonium molybdate | 176.6 g | — | — | — | — | 6.7 g |
| 99 | neodymium chloride.6H₂O 39.6 g | aqueous ammonium vanadate | 117.0 g | — | — | — | — | — |
| 100 | neodymium chloride.6H₂O 39.6 g | aqueous ammonium vanadate | 117.0 g | 3.8 g | — | — | — | — |
| 101 | neodymium chloride.6H₂O 39.6 g | aqueous ammonium vanadate | 117.0 g | — | 3.4 g | — | — | — |
| 102 | neodymium chloride.6H₂O 39.6 g | aqueous ammonium vanadate | 117.0 g | — | — | 4.2 g | — | — |
| 103 | neodymium chloride.6H₂O 39.6 g | aqueous ammonium vanadate | 117.0 g | — | — | — | 7.5 g | — |
| 104 | neodymium chloride.6H₂O 39.6 g | aqueous ammonium vanadate | 117.0 g | — | — | — | — | 6.7 g |

Example 5

After thoroughly mixing 32.6 g of lanthanum oxide and 115.3 g of phosphoric acid (85%) as shown in Table 13, the mixture was heated at 150° C. for 12 hours and 1 g of each organic-based corrosion inhibitor was added to the resulting paste-like products to make treatment solutions (No.151–165 in Table 13).

Also, adjuvants were added to treatment solution No.161 to a molar ratio of 1:10 for cerium to lanthanum, and mixed to make treatment solutions (No.166–173 in Table 14).

In Examples 5 and 6, the α-mercaptolauric acid and N-phenyl-3-formyl-2,5-dimethylpyrrole were synthesized, and all the other components were commercially available reagents.

Example 6

After thoroughly mixing 23.5 g of cerium phosphate and 115.3 g of phosphoric acid (85%) as shown in Table 15, the mixture was heated at 150° C. for 12 hours. One gram of each organic-based inhibitor was added to the resulting paste-like products to make treatment solutions (No.174–188 in Table 15).

Also, adjuvants were added to treatment solution No.184 to a molar ratio of 1:10 for the cerium contained therein to the cerium compound, and mixed to make treatment solutions (No.189–195 in Table 16).

(Film-forming method)

Each treatment solution was applied to a metal sheet to a dry film thickness of 1 μm using a bar coater, and then heat treated at a sheet temperature of 100–200° C. for 30 seconds to one hour. The metal sheet used was GI (fused zinc-plated steel sheet, plating coverage: 90 g/m²), EG (zinc-electroplated steel sheet, plating coverage: 20 g/m²) or AL (fused aluminum-silicon alloy-plated steel sheet, plating coverage: 120 g/m², Al/Si=90/10).

Incidentally, as a chromate-treatment solution for comparison with chromate-treated steel sheets, a treatment bath was prepared containing 30 g/l of partially starch-reduced chromic acid in terms of $CrO_3$, 40 g/l of $SiO_2$ and 20 g/l of phosphoric acid, and films were formed by application, drying and hardening onto the steel sheets. (The amount of Cr in the films was 100 mg/m² in terms of Cr metal).

(Evaluation of film performance)

(a) Working-follow-up Property Test

After subjecting the sample to 7 mm Erichsen working, it was observed by SEM to evaluate the working follow-up property.

| Evaluation scale: | ○: no cracking |
|---|---|
| | ⊙: slight cracking |
| | Δ: slight peeling |
| | x: large cracking, large area peeling |

(b) Flat Sheet Corrosion Resistance Test

The corrosion resistance was evaluated based on the rusted area after spraying the sample with 5%, 35° C. saline. The spraying period was 10 days for GI, EG and SZ and 15 days for AL, and the white rust incidence was measured in all cases. Cold-rolled steel sheets were sprayed with saline for 2 hours and the red rust incidence was measured, while aluminum sheets were dipped for 30 minutes in 100° C. boiling water and the black rust incidence was measured.

| Evaluation scale: | ○: 0% rust incidence |
|---|---|
| | ⊙: less than 5% rust incidence |
| | Δ: from 5% to less than 20% rust incidence |
| | x: 20% or greater rust incidence |

(c) Worked Corrosion Resistance Test

After 7 mm Erichsen working of the sample, the worked corrosion resistance was evaluated based on the rusted area after spraying with 5%, 35° C. saline. The spraying period was 10 days for GI, EG and SZ and 15 days for AL, and the white rust incidence was measured for all cases.

| Evaluation scale: | ○: 0% rust incidence |
|---|---|
| | ⊙: less than 5% rust incidence |
| | Δ: from 5% to less than 20% rust incidence |
| | x: 20% or greater rust incidence |

Results

The results of evaluation for Examples 1–6 are listed in Tables 5–16.

As shown in these tables, the surface treated metal sheets of the present invention had excellent working follow-up properties and exhibited the same flat sheet and worked part corrosion resistances as chromate-treated sheets. Consequently, they exhibit their effect as corrosion resistant films containing absolutely no hexavalent chromium and exhibiting excellent environmental suitability as conversion treatment films.

TABLE 5

| No. | Metal sheet | Working-follow-up property | Flat sheet corrosion resistance | Worked part corrosion resistance |
|---|---|---|---|---|
| 1 | EG | ○ | ○ | ○ |
|  | GI | ○ |  |  |
|  | AL | ○ |  |  |
| 2 | EG | ○ |  |  |
|  | GI | ○ |  |  |
|  | AL | ○ |  |  |
| 3 | EG |  |  |  |
|  | GI |  |  |  |
|  | AL |  |  |  |
| 4 | EG | ○ | ○ | ○ |
|  | GI | ○ |  |  |
|  | AL | ○ | ○ | ○ |
| 5 | EG | ○ | ○ | ○ |
|  | GI |  |  |  |
|  | AL |  |  |  |
| 6 | EG | ○ | ○ | ○ |
|  | GI | ○ |  |  |
|  | AL | ○ | ○ |  |
| 7 | EG |  |  |  |
|  | GI |  |  |  |
|  | AL |  |  |  |
| 8 | EG | ○ | ○ |  |
|  | GI |  |  |  |
|  | AL | ○ |  |  |
| 9 | EG |  |  |  |
|  | GI |  |  |  |
|  | AL |  |  |  |
| 10 | EG | ○ | ○ | ○ |
|  | GI | ○ |  |  |
|  | AL | ○ | ○ | ○ |
| 11 | EG | ○ | ○ |  |
|  | GI |  |  |  |
|  | AL | ○ |  |  |
| 12 | EG | ○ | ○ |  |
|  | GI |  |  |  |
|  | AL | ○ |  |  |
| 13 | EG | ○ | ○ | ○ |
|  | GI | ○ | ○ | ○ |
|  | AL | ○ | ○ | ○ |
| 14 | EG | ○ | ○ | ○ |
|  | GI |  |  |  |
|  | AL | ○ |  |  |
| Comp. Ex. | EG |  | Δ | Δ |
|  | GI | Δ | Δ | x |
|  | AL |  | Δ | Δ |

TABLE 6

| No. | Metal sheet | Working-follow-up property | Flat sheet corrosion resistance | Worked part corrosion resistance |
|---|---|---|---|---|
| 15 | EG |  |  |  |
|  | GI |  |  |  |
|  | AL |  |  |  |
| 16 | EG | ○ | ○ | ○ |
|  | GI | ○ |  |  |
|  | AL | ○ | ○ | ○ |
| 17 | EG | ○ | ○ |  |
|  | GI |  |  |  |
|  | AL | ○ |  |  |
| 18 | EG | ○ | ○ |  |
|  | GI |  |  |  |
|  | AL | ○ |  |  |

TABLE 6-continued

| No. | Metal sheet | Working-follow-up property | Flat sheet corrosion resistance | Worked part corrosion resistance |
|---|---|---|---|---|
| 19 | EG | ○ | ○ | ○ |
|  | GI | ○ | ○ | ○ |
|  | AL | ○ | ○ | ○ |
| 20 | EG | ○ | ○ | ○ |
|  | GI |  |  |  |
|  | AL | ○ |  |  |
| 21 | EG |  | ○ |  |
|  | GI |  |  |  |
|  | AL |  |  |  |
| 22 | EG | ○ | ○ | ○ |
|  | GI | ○ |  |  |
|  | AL | ○ | ○ | ○ |
| 23 | EG | ○ | ○ |  |
|  | GI |  |  |  |
|  | AL | ○ |  |  |
| 24 | EG | ○ | ○ |  |
|  | GI |  |  |  |
|  | AL | ○ |  |  |
| 25 | EG | ○ | ○ | ○ |
|  | GI | ○ | ○ | ○ |
|  | AL | ○ | ○ | ○ |
| 26 | EG | ○ | ○ | ○ |
|  | GI |  |  |  |
|  | AL | ○ |  |  |

TABLE 7

| No. | Metal sheet | Working-follow-up property | Flat sheet corrosion resistance | Worked part corrosion resistance |
|---|---|---|---|---|
| 27 | EG | ○ | ○ | ○ |
|  | GI | ○ |  |  |
|  | AL | ○ |  |  |
| 28 | EG | ○ |  |  |
|  | GI | ○ |  |  |
|  | AL | ○ |  |  |
| 29 | EG |  |  |  |
|  | GI |  |  |  |
|  | AL |  |  |  |
| 30 | EG | ○ | ○ | ○ |
|  | GI | ○ |  |  |
|  | AL | ○ | ○ | ○ |
| 31 | EG | ○ | ○ | ○ |
|  | GI |  |  | ○ |
|  | AL |  |  |  |
| 32 | EG | ○ | ○ | ○ |
|  | GI | ○ |  |  |
|  | AL | ○ | ○ |  |
| 33 | EG |  |  |  |
|  | GI |  |  |  |
|  | AL |  |  |  |
| 34 | EG | ○ | ○ |  |
|  | GI |  |  |  |
|  | AL | ○ |  |  |
| 35 | EG |  |  |  |
|  | GI |  |  |  |
|  | AL |  |  |  |
| 36 | EG | ○ | ○ | ○ |
|  | GI | ○ |  |  |
|  | AL | ○ | ○ | ○ |
| 37 | EG | ○ | ○ |  |
|  | GI |  |  |  |
|  | AL | ○ |  |  |
| 38 | EG | ○ | ○ |  |
|  | GI |  |  |  |
|  | AL | ○ |  |  |
| 39 | EG | ○ | ○ | ○ |
|  | GI | ○ | ○ | ○ |
|  | AL | ○ | ○ | ○ |

TABLE 7-continued

| No. | Metal sheet | Working-follow-up property | Flat sheet corrosion resistance | Worked part corrosion resistance |
|---|---|---|---|---|
| 40 | EG | ○ | ○ | |
|  | GI |  |  |  |
|  | AL | ○ |  |  |

TABLE 8

| No. | Metal sheet | Working-follow-up property | Flat sheet corrosion resistance | Worked part corrosion resistance |
|---|---|---|---|---|
| 41 | EG |  |  |  |
|  | GI |  |  |  |
|  | AL |  |  |  |
| 42 | EG | ○ | ○ | ○ |
|  | GI | ○ |  |  |
|  | AL | ○ | ○ | ○ |
| 43 | EG | ○ | ○ |  |
|  | GI |  |  |  |
|  | AL | ○ |  |  |
| 44 | EG | ○ | ○ | ○ |
|  | GI |  |  |  |
|  | AL | ○ |  |  |
| 45 | EG | ○ | ○ | ○ |
|  | GI | ○ | ○ | ○ |
|  | AL | ○ | ○ | ○ |
| 46 | EG | ○ | ○ | ○ |
|  | GI |  |  |  |
|  | AL | ○ |  |  |
| 47 | EG |  | ○ |  |
|  | GI |  |  |  |
|  | AL |  |  |  |
| 48 | EG | ○ | ○ | ○ |
|  | GI | ○ | ○ | ○ |
|  | AL | ○ | ○ | ○ |
| 49 | EG | ○ | ○ |  |
|  | GI |  |  |  |
|  | AL | ○ |  |  |
| 50 | EG | ○ | ○ |  |
|  | GI |  |  |  |
|  | AL | ○ |  |  |
| 51 | EG | ○ | ○ | ○ |
|  | GI | ○ | ○ | ○ |
|  | AL | ○ | ○ | ○ |
| 52 | EG | ○ |  |  |
|  | GI |  |  |  |
|  | AL | ○ |  |  |

TABLE 9

| No. | Metal sheet | Working-follow-up property | Flat sheet corrosion resistance | Worked part corrosion resistance |
|---|---|---|---|---|
| 53 | EG | ○ | ○ | ○ |
|  | GI | ○ |  |  |
|  | AL | ○ |  |  |
| 54 | EG | ○ |  |  |
|  | GI | ○ |  |  |
|  | AL | ○ |  |  |
| 55 | EG |  |  |  |
|  | GI |  |  |  |
|  | AL |  |  |  |
| 56 | EG | ○ | ○ | ○ |
|  | GI | ○ |  |  |
|  | AL | ○ | ○ | ○ |
| 57 | EG | ○ | ○ | ○ |
|  | GI |  |  |  |
|  | AL |  |  |  |

TABLE 9-continued

| No. | Metal sheet | Working-follow-up property | Flat sheet corrosion resistance | Worked part corrosion resistance |
|---|---|---|---|---|
| 58 | EG | ○ | ○ | ○ |
|  | GI | ○ |  |  |
|  | AL | ○ | ○ |  |
| 59 | EG |  |  |  |
|  | GI |  |  |  |
|  | AL |  |  |  |
| 60 | EG | ○ | ○ |  |
|  | GI |  |  |  |
|  | AL | ○ |  |  |
| 61 | EG |  |  |  |
|  | GI |  |  |  |
|  | AL |  |  |  |
| 62 | EG | ○ | ○ | ○ |
|  | GI | ○ |  |  |
|  | AL | ○ | ○ | ○ |
| 63 | EG | ○ | ○ |  |
|  | GI |  |  |  |
|  | AL | ○ |  |  |
| 64 | EG | ○ | ○ |  |
|  | GI |  |  |  |
|  | AL | ○ |  |  |
| 65 | EG | ○ | ○ | ○ |
|  | GI | ○ | ○ | ○ |
|  | AL | ○ | ○ | ○ |
| 66 | EG | ○ | ○ | ○ |
|  | GI |  |  |  |
|  | AL | ○ |  |  |

TABLE 10

| No. | Metal sheet | Working-follow-up property | Flat sheet corrosion resistance | Worked part corrosion resistance |
|---|---|---|---|---|
| 67 | EG |  |  |  |
|  | GI |  |  |  |
|  | AL |  |  |  |
| 68 | EG | ○ | ○ | ○ |
|  | GI | ○ |  |  |
|  | AL | ○ | ○ | ○ |
| 69 | EG | ○ | ○ |  |
|  | GI |  |  |  |
|  | AL | ○ |  |  |
| 70 | EG | ○ | ○ |  |
|  | GI |  |  |  |
|  | AL |  |  |  |
| 71 | EG | ○ | ○ | ○ |
|  | GI | ○ | ○ | ○ |
|  | AL | ○ | ○ | ○ |
| 72 | EG | ○ | ○ | ○ |
|  | GI |  |  |  |
|  | AL | ○ |  |  |
| 73 | EG |  | ○ |  |
|  | GI |  |  |  |
|  | AL |  |  |  |
| 74 | EG | ○ | ○ | ○ |
|  | GI | ○ |  |  |
|  | AL | ○ | ○ | ○ |
| 75 | EG | ○ | ○ |  |
|  | GI |  |  |  |
|  | AL | ○ |  |  |
| 76 | EG | ○ | ○ | ○ |
|  | GI |  |  |  |
|  | AL | ○ |  |  |
| 77 | EG | ○ | ○ | ○ |
|  | GI | ○ | ○ | ○ |
|  | AL | ○ | ○ | ○ |
| 78 | EG | ○ | ○ | ○ |
|  | GI |  |  |  |
|  | AL | ○ |  |  |

TABLE 11

| No. | Metal sheet | Working-follow-up property | Flat sheet corrosion resistance | Worked part corrosion resistance |
|---|---|---|---|---|
| 79 | EG | ○ | ○ | ○ |
|  | GI | ○ | ○ | ○ |
|  | AL | ○ | ○ | ○ |
| 80 | EG | ○ | ○ | ○ |
|  | GI | ○ | ○ | ○ |
|  | AL | ○ | ○ | ○ |
| 81 | EG | ○ | ○ | ○ |
|  | GI | ○ | ○ | ○ |
|  | AL | ○ | ○ | ○ |
| 82 | EG | ○ | ○ | ○ |
|  | GI | ○ | ○ | ○ |
|  | AL | ○ | ○ | ○ |
| 83 | EG | ○ | ○ | ○ |
|  | GI | ○ | ○ | ○ |
|  | AL | ○ | ○ | ○ |
| 84 | EG | ○ | ○ | ○ |
|  | GI | ○ | ○ | ○ |
|  | AL | ○ | ○ | ○ |
| 85 | EG | ○ | ○ | ○ |
|  | GI | ○ | ○ | ○ |
|  | AL | ○ | ○ | ○ |
| 86 | EG | ○ | ○ | ○ |
|  | GI | ○ | ○ | ○ |
|  | AL | ○ | ○ | ○ |
| 87 | EG | ○ | ○ | ○ |
|  | GI | ○ | ○ | ○ |
|  | AL | ○ | ○ | ○ |
| 88 | EG | ○ | ○ | ○ |
|  | GI | ○ | ○ | ○ |
|  | AL | ○ | ○ | ○ |
| 89 | EG | ○ | ○ | ○ |
|  | GI | ○ | ○ | ○ |
|  | AL | ○ | ○ | ○ |
| 90 | EG | ○ | ○ | ○ |
|  | GI | ○ | ○ | ○ |
|  | AL | ○ | ○ | ○ |
| 91 | EG | ○ | ○ | ○ |
|  | GI | ○ | ○ | ○ |
|  | AL | ○ | ○ | ○ |
| 92 | EG | ○ | ○ | ○ |
|  | GI | ○ | ○ | ○ |
|  | AL | ○ | ○ | ○ |

TABLE 12

| No. | Metal sheet | Working-follow-up property | Flat sheet corrosion resistance | Worked part corrosion resistance |
|---|---|---|---|---|
| 93 | EG |  |  |  |
|  | GI |  |  |  |
|  | AL |  |  |  |
| 94 | EG | ○ | ○ | ○ |
|  | GI | ○ |  |  |
|  | AL | ○ | ○ | ○ |
| 95 | EG | ○ | ○ |  |
|  | GI |  |  |  |
|  | AL | ○ |  |  |
| 96 | EG | ○ | ○ |  |
|  | GI |  |  |  |
|  | AL | ○ |  |  |
| 97 | EG | ○ | ○ | ○ |
|  | GI | ○ | ○ | ○ |
|  | AL | ○ | ○ | ○ |
| 98 | EG | ○ | ○ | ○ |
|  | GI |  |  |  |
|  | AL | ○ |  |  |
| 99 | EG |  | ○ |  |
|  | GI |  |  |  |
|  | AL |  |  |  |
| 100 | EG | ○ | ○ | ○ |
|  | GI | ○ |  |  |
|  | AL | ○ | ○ | ○ |
| 101 | EG | ○ | ○ |  |
|  | GI |  |  |  |
|  | AL | ○ |  |  |
| 102 | EG | ○ | ○ |  |
|  | GI |  |  |  |
|  | AL | ○ |  |  |
| 103 | EG | ○ | ○ | ○ |
|  | GI | ○ | ○ | ○ |
|  | AL | ○ | ○ | ○ |
| 104 | EG | ○ | ○ | ○ |
|  | GI |  |  |  |
|  | AL | ○ |  |  |

TABLE 13

| No. | Lanthanum oxide (g) | 85% phosphoric acid (g) | Organic-based corrosion inhibitor | Metal sheet | Working-follow-up property | Flat sheet corrosion resistance | Worked part corrosion resistance |
|---|---|---|---|---|---|---|---|
| 151 | 32.6 | 115.3 | butyl thio-glycolate 1.0 g | EG |  |  |  |
|  |  |  |  | GI |  |  |  |
|  |  |  |  | AL |  |  |  |
| 152 | 32.6 | 115.3 | octyl thio-glycolate 1.0 g | EG | ○ | ○ | ○ |
|  |  |  |  | GI | ○ |  |  |
|  |  |  |  | AL | ○ |  |  |
| 153 | 32.6 | 115.3 | stearyl glycolate 1.0 g | EG | ○ | ○ | ○ |
|  |  |  |  | GI | ○ |  |  |
|  |  |  |  | AL | ○ |  |  |

TABLE 13-continued

| No. | Lanthanum oxide (g) | 85% phosphoric acid (g) | Organic-based corrosion inhibitor | Metal sheet | Working-follow-up property | Flat sheet corrosion resistance | Worked part corrosion resistance |
|---|---|---|---|---|---|---|---|
| 154 | 32.6 | 115.3 | α-mercapto-caproic acid 1.0 g | EG GI AL | ◎ ◎ ◎ | ◎ | |
| 155 | 32.6 | 115.3 | 8-mercapto-quinoline 1.0 g | EG GI AL | ○ | ○ | |
| 156 | 32.6 | 115.3 | 8-hydroxy quinoline 1.0 g | EG GI AL | ◎ ◎ ◎ | ◎ ◎ ◎ | ○ ○ |
| 157 | 32.6 | 115.3 | 6-(N,N'-dibutylamino-1,3,5-triazine-2,4-dithiol 1.0 g | EG GI AL | | | |
| 158 | 32.6 | 115.3 | lauryl gallate 1.0 g | EG GI AL | ○ ○ | ○ ○ | ○ |
| 159 | 32.6 | 115.3 | 1 wt % aqueous polyaniline solution (dopant: barium sulfate) 1.0 g | EG GI AL | | | |
| 160 | 32.6 | 115.3 | N-phenyl-3-formyl-2,5-dimethyl-pyrrole 1.0 g | EG GI AL | ◎ ◎ ◎ | ○ ○ ○ | ○ ○ ○ |
| 161 | 32.6 | 115.3 | α-mercapto-lauric acid 1.0 g | EG GI AL | ○ ○ | ◎ | ○ |
| 162 | 32.6 | 115.3 | α-mercapto-lauric acid 0.1 g | EG GI AL | ○ ○ ○ | | |
| 163 | 32.6 | 115.3 | α-mercapto-lauric acid 10.0 g | EG GI AL | ◎ ◎ ◎ | ○ ○ | ◎ |
| 164 | 32.6 | 115.3 | nicotinic acid 1.0 g | EG GI AL | ◎ ◎ ◎ | ◎ ◎ ◎ | ◎ ◎ ◎ |
| 165 | 32.6 | 115.3 | catechol 1.0 g | EG GI AL | ○ ○ ◎ | ◎ ◎ ◎ | ○ ○ ○ |

TABLE 14

| No. | Lanthanum oxide (g) | 85% phosphoric acid (g) | α-mercapto-lauric acid (g) | Added aid | Metal sheet | Working-follow-up property | Flat sheet corrosion resistance | Worked part corrosion resistance |
|---|---|---|---|---|---|---|---|---|
| 166 | 32.6 | 115.3 | 1.0 | cerium oxide 3.4 g | EG GI AL | ◎ ◎ | ○ ○ | ○ ○ |
| 167 | 32.6 | 115.3 | 1.0 | cerium hydroxide 4.2 g | EG GI AL | | | |
| 168 | 32.6 | 115.3 | 1.0 | cerium chloride·7H₂O 7.5 g | EG GI AL | ○ ◎ | ◎ ◎ ○ | ◎ ◎ ○ |

TABLE 14-continued

| No. | Lanthanum oxide (g) | 85% phosphoric acid (g) | α-mercapto-lauric acid (g) | Added aid | Metal sheet | Working-follow-up property | Flat sheet corrosion resistance | Worked part corrosion resistance |
|---|---|---|---|---|---|---|---|---|
| 169 | 32.6 | 115.3 | 1.0 | cerium chloride. 8H$_2$O 6.0 g | EG GI AL | ○ | ○ ○ | ○ ○ |
| 170 | 32.6 | 115.3 | 1.0 | cerium sulfate. 6H$_2$O 14.3 g | EG GI AL | ○ | ○ ○ | ○ ○ |
| 171 | 32.6 | 115.3 | 1.0 | cerium nitrate. 6H$_2$O 8.7 g | EG GI AL | ○ | ○ | ○ |
| 172 | 32.6 | 115.3 | 1.0 | cerium acetate. H$_2$O | EG GI AL | ○ | ○ | ○ |
| 173 | 32.6 | 115.3 | 1.0 | cerium phosphate 4.7 g | EG GI AL | ○ | ○ | ○ |
| Comp. Ex. | | Application chromate film | | | EG GI AL | Δ | Δ Δ Δ | Δ Δ Δ |

TABLE 15

| | Film composition | | | | Performance evaluation | | |
|---|---|---|---|---|---|---|---|
| No. | Cerium phosphate (g) | 85% phosphoric acid (g) | Organic-based corrosion inhibitor | Metal sheet | Working-follow-up property | Flat sheet corrosion resistance | Worked part corrosion resistance |
| 174 | 23.5 | 115.3 | butyl thio-glycolate 1.0 g | EG GI AL | ○ ○ ○ | ○ | ○ |
| 175 | 23.5 | 115.3 | octyl thio-glcyolate 1.0 g | EG GI AL | ○ ○ ○ | ○ | ○ |
| 176 | 23.5 | 115.3 | stearyl thioglycolate 1.0 g | EG GI AL | | | |
| 177 | 23.5 | 115.3 | α-mercapto-caproic acid 1.0 g | EG AL | ○ ○ | ⊙ | ○ |
| 178 | 32.5 | 115.3 | β-mercapto-quinolie 1.0 g | EG GI AL | ○ | ○ | ○ |
| 179 | 23.5 | 115.3 | α-hydroxy quionoline 1.0 g | EG GI AL | ○ ○ ○ | ○ ○ | ○ |
| 180 | 23.5 | 115.3 | 6-(N,N'-dibutylamino-1,3,5-triazine-2,4-dithiol 1.0 g | EG GI AL | | | |
| 181 | 23.5 | 115.3 | lauryl gallate 1.0 g | EG GI AL | ○ ○ | ○ | |
| 182 | 23.5 | 115.3 | 1 wt % aqueous polyaniline solutoin (dopant: barium sulfate) 1.0 g | EG GI AL | | | |

TABLE 15-continued

| | Film composition | | | Performance evaluation | | |
|---|---|---|---|---|---|---|
| No. | Cerium phosphate (g) | 85% phosphoric acid (g) | Organic-based corrosion inhibitor | Metal sheet | Working-follow-up property | Flat sheet corrosion resistance | Worked part corrosion resistance |
| 183 | 23.5 | 115.3 | N-phenyl-3-formyl-2,5-dimethyl-pyrrole 1.0 g | EG GI AL | ○ ○ | ○ | |
| 184 | 23.5 | 115.3 | α-mercapto-lauric acid 1.0 g | EG GI AL | ○ ○ | ○ | |
| 185 | 23.5 | 115.3 | α-mercapto-lauric acid 0.1 g | EG GI AL | ○ ○ ○ | ○ ○ ○ | ○ ○ ○ |
| 186 | 23.5 | 115.3 | α-mercapto-lauric acid 10.0 g | EG GI AL | ○ ○ | ○ | ○ |
| 187 | 23.5 | 115.3 | nicotinic acid 1.0 g | EG GI AL | ○ ○ ○ | ○ ○ ○ | ○ ○ ○ |
| 188 | 23.5 | 115.3 | catechol 1.0 g | EG GI AL | ○ ○ ○ | ○ ○ ○ | ○ ○ ○ |

TABLE 16

| | Film composition | | | | | Performance evaluation | | |
|---|---|---|---|---|---|---|---|---|
| No. | Cerium phosphate (g) | 85% phosphoric acid (g) | α-mercapto-lauric acid (g) | Added agent or aid | Metal sheet | Working-follow-up property | Flat sheet corrosion resistance | Worked part corrosion resistance |
| 189 | 23.5 | 115.3 | 1.0 | cerium oxide 3.4 g | EG GI AL | ○ ○ | ○ | ○ |
| 190 | 23.5 | 115.3 | 1.0 | cerium hydroxide 4.2 g | EG GI AL | ○ ○ | ○ | ○ |
| 191 | 23.5 | 115.3 | 1.0 | cerium chloride. 7H$_2$O 7.5 g | EG GI AL | ○ ○ | ○ ○ | ○ ○ |
| 192 | 23.5 | 115.3 | 1.0 | cerium chloride. 8H$_2$O 6.0 g | EG GI AL | ○ ○ | ○ | ○ |
| 193 | 23.5 | 115.3 | 1.0 | cerium sulfate. 6H$_2$O 14.3 g | EG GI AL | ○ ○ | ○ | ○ ○ |
| 194 | 23.5 | 115.3 | 1.0 | cerium nitrate. 6H$_2$O 8.7 g | EG GI AL | ○ ○ | ○ ○ | ○ ○ |
| 195 | 23.5 | 115.3 | 1.0 | cerium acetate. H$_2$O 6.7 g | EG GI AL | ○ ○ | ○ | ○ ○ |
| Comp. Ex. | Application chromate film | | | | EG GI AL | Δ | Δ Δ Δ | Δ × Δ |

Example 7

Figure 2:
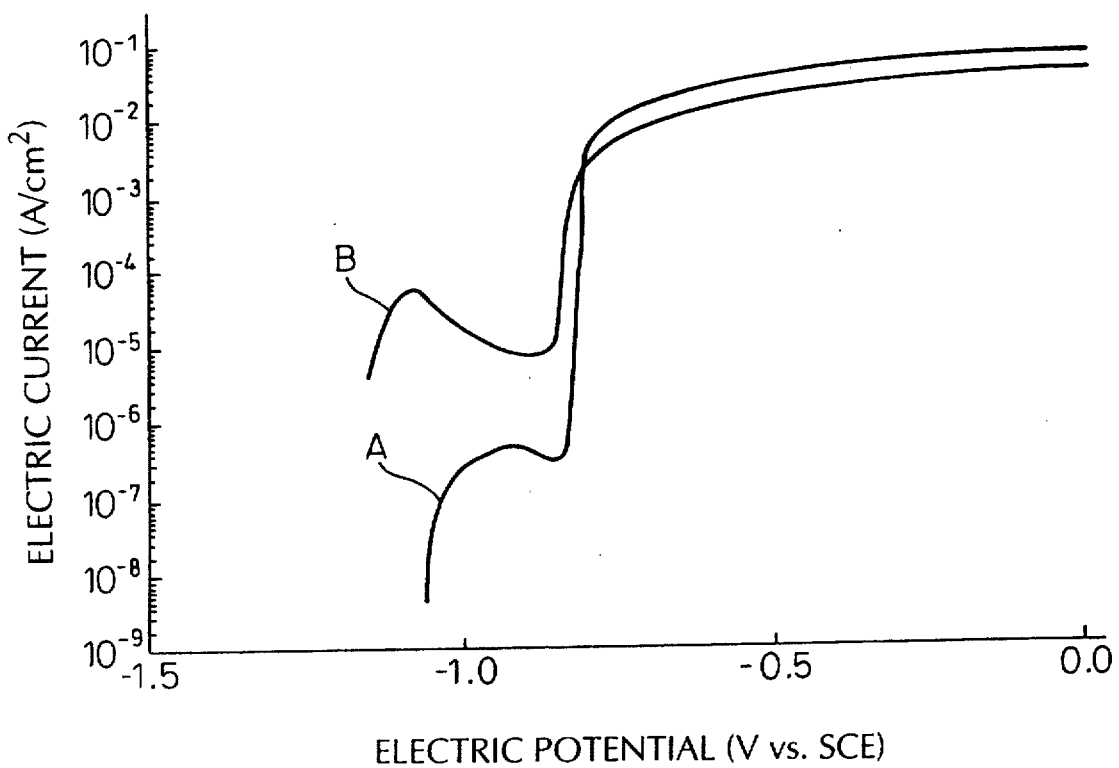
FIGS. 2 and 3 are graphs showing anode current/potential curves for zinc metal in 0.1 mol/liter NaCl solutions adjusted to pH 8.4.

The basic effect of the surface treatment agent of the invention will now be illustrated concretely with simplified examples. A surface treatment agent containing as a lanthanum compound lanthanum phosphate obtained by reaction between lanthanum oxide and ortho-phosphoric acid, with 5 moles of ortho-phosphoric acid in terms of $H_3PO_4$ as the molar ratio with respect to the lanthanum, and with a lanthanum concentration of 0.64 mol/kg, with water as the diluting agent, was used to coat high purity zinc to obtain a coating layer with a thickness of about 5 μm. FIG. 2 shows an anode current-current curve for coated zinc and zinc with no coating layer in a 0.1 mol/liter NaCl solution adjusted to pH 8.4 with boric acid and sodium borate. The anode current for the zinc with the coating layer was notably smaller compared to the zinc with no coating layer, thus confirming an effect of suppressing anode elution of zinc in the coating layer and of inhibiting diffusion of chloride ion, a corrosion-accelerating substance, into the zinc surface.

Example 8

Figure 3:
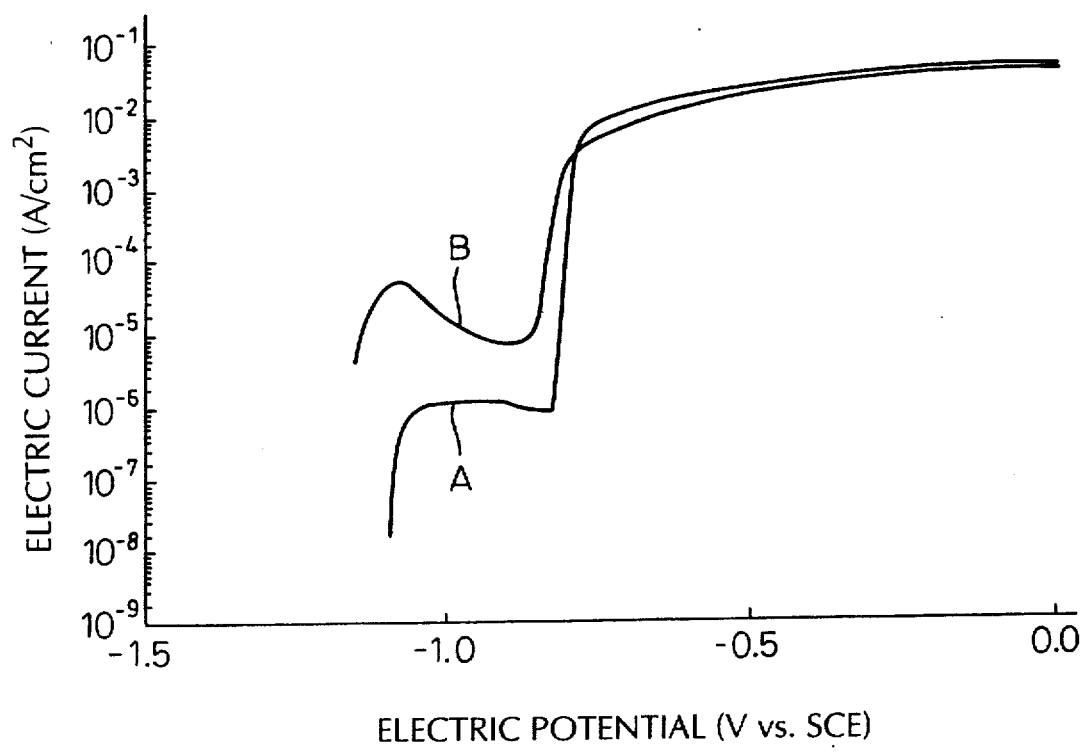

FIG. 3 shows an anode current-current curve obtained by exactly the same treatment as in Example 7, except that trivalent cerium oxide was used instead of lanthanum oxide as the lanthanum compound. The same results were obtained as in Example 7.

Examples 9–10
(Preparation of surface treatment agents)

Example 9

Surface treatment agents composed mainly of phosphoric acid and lanthanum phosphate, hydrogen phosphate, oxide, hydroxide or a mixture thereof.

A starting material lanthanum compound such as lanthanum oxide (a), lanthanum hydroxide (b), lanthanum chloride (c), etc. was reacted with ortho-phosphoric acid (d) or poly-phosphoric acid (e) to obtain the lanthanum compound for the surface treatment agent. Also, a phosphoric acid such as ortho-phosphoric acid, poly-phosphoric acid or meta-phosphoric acid (f) or a mixture thereof, and/or a phosphate salt such as ammonium phosphate (g) were further added to adjust the molar ratio of $H_3PO_4$ to lanthanum to the prescribed value. Water or a mixture of water and methanol (h) was added as a diluting agent to the resulting composition of the lanthanum compound and phosphoric acid, to obtain a surface treatment agent with the prescribed lanthanum concentration. Table 17 lists the surface treatment agents of samples No.201–217 in the order of their phosphoric acid to lanthanum molar ratios, and the method of preparation is indicated as (a) to (h). For samples No.201 and No.210 only, a mixture of water and methanol was used as the diluting agent, in a weight proportion of 2:1 for both cases.

When a cerium compound and/or an organic-based corrosion inhibitor are added, they are added during addition of the phosphate after adjustment of the lanthanum compound, or simultaneously with the diluting agent. Of samples No.281–224 listed in Table 18, samples No.218–221 were specified as treatment agents with the same lanthanum compound and phosphoric acid composition as sample No.7, i.e. treatment agents with a lanthanum compound concentration of 0.3 mol/kg and ortho-phosphoric acid in a molar ratio of 5 with respect to lanthanum, and a cerium compound and/or an organic-based corrosion inhibitor were added. Also, samples No.222–224 were specified as treatment agents with the same lanthanum compound and phosphoric acid composition as sample No.210, i.e. treatment agents with a lanthanum compound concentration of 0.5 mol/kg and poly-phosphoric acid in a molar ratio of 10 in terms of $H_3PO_4$ with respect to lanthanum, and cerium nitrate as a cerium compound and/or an organic inhibitor were added.

Example 10

Surface treatment agents composed mainly of phosphoric acid and cerium phosphate, hydrogen phosphate, oxide, hydroxide or a mixture thereof.

The starting material cerium compounds such as trivalent cerium oxide $Ce_2O_3$ (i), tetravalent cerium oxide $CeO_2$ (j), trivalent cerium hydroxide (k), trivalent cerium chloride (l) and cerium sulfate (m) were reacted with ortho-phosphoric acid (n) or poly-phosphoric acid (o) to obtain cerium compounds for the surface treatment agents. Also, a phosphoric acid such as ortho-phosphoric acid, poly-phosphoric acid or meta-phosphoric acid (p) or a mixture thereof, and/or a phosphate salt such as ammonium phosphate (g) were further added to adjust the molar ratio of $H_3PO_4$ to cerium to the prescribed value. Water or a mixture of water and methanol (r) was added as a diluting agent to the resulting composition of the cerium compound and phosphoric acid, to obtain a surface treatment agent with the prescribed cerium concentration. Table 19 lists the surface treatment agents of samples No.225–241 in the order of their phosphoric acid to cerium molar ratios, and the method of preparation is indicated as (i) to (r). For samples No.225 and No.234 only, a mixture of water and methanol was used as the diluting agent, in a weight proportion of 2:1 for both cases.

When a lanthanum compound and/or an organic-based corrosion inhibitor are added, they are added during addition of the phosphate after adjustment of the cerium compound, or simultaneously with the diluting agent. Of samples No.242–248 listed in Table 20 samples No.242–245 were specified as treatment agents with the same cerium compound and phosphoric acid composition as sample No.231, i.e. treatment agents with a cerium compound concentration of 0.3 mol/kg and ortho-phosphoric acid in a molar ratio of 5 with respect to cerium, and a lanthanum compound and/or an organic-based corrosion inhibitor were added. Also, samples No.246–248 were specified as treatment agents with the same cerium compound and phosphoric acid composition as sample No.234, i.e. treatment agents with a cerium compound concentration of 0.5 mol/kg and poly-phosphoric acid in a molar ratio of 10 in terms of $H_3PO_4$ with respect to cerium, and lanthanum chloride as a lanthanum compound and/or an organic-based corrosion inhibitor were added.

The organic inhibitors used in Table 2 are indicated by the following abbreviations.

PFDP: N-phenyl-3-formyl-2,5-dimethylpyrrole
TGO: octyl thioglycolate
MLA: α-mercaptolauric acid
MBA: o-mercaptobenzoic acid
MNA: o-mercaptonicotinic acid
HOQ: 8-hydroxyquinoline (Film-forming method)

The film-forming method for the treatment agents with a low degree of dilution, and hence a high viscosity, was application with a bar coater to a dry coating layer thickness of 1 μm. For the treatment agents with a high degree of dilution and hence a low viscosity, spreading was accomplished by spraying to a dry coating layer thickness of 0.2 μm. After the coating or spreading, the metal material was heat treated at 100–200° C. for 30 seconds to one hour. Formation of the coating layer by dipping was accomplished by holding the metal material in the treatment bath at 85° C. for 30 seconds, and drying in air. The metal sheet used was GI (fused zinc-plated steel sheet, plating coverage: 90 g/m$^2$), EG (zinc-electroplated steel sheet, plating coverage: 20 g/m$^2$) or AL (fused aluminum-silicon alloy-plated steel sheet, plating coverage: 120 g/m$^2$, Al/Si=90/10) plated steel sheets, cold-rolled steel sheets and aluminum sheets.

In Comparative Example 201, for comparison with zinc phosphate surface treatment agents containing lanthanum compounds, GI and EG were used as the metal materials and dipped for 2 hours at 40° C. in a treatment solution comprising 0.01 mol/kg of lanthanum nitrate in terms of lanthanum, and ortho-phosphoric acid at a molar ratio of 15 in terms of $H_3PO_4$ to lanthanum, and water washing was followed by drying at 100° C. for 10 minutes to form films.

In Comparative Example 203, for comparison with a cathode-deposited cerium compound, EG was used as the metal material and a cathode current was passed through at a current density of 100 mA/cm² in a 0.1 mol/liter trivalent cerium chloride solution to deposit trivalent cerium hydroxide on the surface, after which reaction with ortho-phosphoric acid gave a mixed film of cerium phosphate and hydroxide compounds.

In Comparative Example 202, for comparison with chromate treatment, a treatment bath was prepared containing 30 g/l of partially starch-reduced chromic acid in terms of $CrO_3$, 40 g/l of $SiO_2$ and 20 g/l of phosphoric acid, and films were formed by application, drying and hardening onto steel sheets. (The amount of Cr in the films was 120 mg/m² in terms of Cr metal).

In Comparative Example 203, for comparison with a cathode-deposited cerium compound, EG was used as the metal material and a cathode current was passed through at a current density of 100 mA/cm² in a 0.1 mol/liter trivalent cerium chloride solution to deposit trivalent cerium hydroxide on the surface, after which reaction with ortho-phosphoric acid gave a mixed film of cerium phosphate and hydroxide compounds.

Incidentally, for the metal materials and film-forming methods listed in Tables 17–20, the plated steel sheets used as metal materials are indicated by type as GI, EG or AL, and the coating methods for forming the films are indicated by (P), (S) or (D) for painting, spraying or dipping, respectively.

(Evaluation of coating layer performance)

The method of performance evaluation was the same as for Examples 1–6.

The relationship between the surface treatment agent compositions and their evaluation results are shown in Tables 17–20. As clearly seen in Tables 17 and 19, the metal material surface treatment agents of the invention composed mainly of lanthanum compounds or cerium compounds and phosphoric acid provide coating layers with excellent working follow-up properties and corrosion resistance, as well as rust prevention with the films alone which has not been achieved with conventional zinc phosphate treatment, while also providing coating layers with flat and worked part corrosion resistance equivalent to that achieved with chromate treatment. They therefore provide a means of forming films as conversion treatment films containing absolutely no hexavalent chromium, and exhibiting excellent environmental suitability with their effect as anti-corrosion films. In addition, as clearly seen in Tables 18 and 20, the lanthanum compounds or cerium compounds and the organic-based corrosion inhibitors have the effect of complementing the corrosion resistance, especially the worked part corrosion resistance, of coating layers formed from surface treatment agents composed mainly of cerium compounds or lanthanum compounds and phosphoric acid, and therefore a means is provided for reinforcing their effect as anti-corrosion films containing no hexavalent chromium.

TABLE 17

| | Treatment agent | | Metal | Worked | Corrosion resistance | |
|---|---|---|---|---|---|---|
| Sample No. | Phosphoric acid molar ratio | Lanthanum concentration (mol/kg) | material and film forming method | part follow-up property | Flat parts | Worked parts |
| 201 | 1.0 (d) | 2.4 (a, h) | GI (P) | | | |
| 202 | 1.0 (d) | 1.5 (a) | GI (P) | | | |
| 203 | 3.0 (d) | 1.05 (a) | GI (P) | | | |
| | | | EG (P) | | ◯ | |
| | | | AL (P) | | | |
| 204 | 3.0 (d) | 0.5 (a) | GI (P) | ◯ | | |
| | | | EG (P) | ◯ | ◯ | |
| | | | AL (P) | ◯ | | |
| 205 | 4.0 (e) | 1.0 (a) | GI (P) | ◯ | ◯ | ◯ |
| | | | EG (P) | ◯ | ◯ | ◯ |
| | | | AL (P) | ◯ | ◯ | ◯ |
| 206 | 5.0 (d) | 0.64 (a) | GI (P) | ◯ | ◯ | ◯ |
| 207 | 5.0 (d) | 0.3 (a) | GI (P) | ◯ | | |
| | | | EG (P) | ◯ | ◯ | ◯ |
| | | | AL (P) | ◯ | | |
| | | | cold-rolled steel sheet (P) | — | | — |
| | | | aluminum sheet (P) | — | | — |
| 208 | 5.0 (d, f) | 0.3 (a) | GI (P) | | | |
| 209 | 5.0 (d, g) | 0.3 (a) | EG (P) | | | |
| 210 | 10 (e) | 0.5 (a) | GI (P) | ◯ | ◯ | |
| 211 | 10 (e, f) | 0.5 (b, c) | EG (P) | ◯ | ◯ | |
| 212 | 10 (e, f) | 0.5 (c) | EG (P) | ◯ | ◯ | |
| 213 | 10 (e) | 0.2 (c) | GI (S) | ◯ | | |
| 214 | 10 (e, f) | 0.2 (c, h) | GI (S) | ◯ | | |
| | | | EG (S) | ◯ | | |
| | | | AL (S) | ◯ | | |
| 215 | 10 (e, f) | 0.1 | EI (S) | ◯ | | |
| 216 | 10 (e) | 0.06 (a) | GI (D) | | | |

TABLE 17-continued

| | Treatment agent | | Metal | Worked | Corrosion resistance | |
|---|---|---|---|---|---|---|
| Sample No. | Phosphoric acid molar ratio | Lanthanum concentration (mol/kg) | material and film forming method | part follow-up property | Flat parts | Worked parts |
| 217 | 25 (d) | 0.11 (c) | GI (D) | | | Δ |
| | | | G (D) | | | Δ |
| Comp. Ex. 201 | 15 (d) | 0.01 | GI (D) | Δ | × | × |
| | | | G (D) | Δ | × | × |
| 202 | chromate treated | — | GI (P) | Δ | | Δ |
| | | | EG (P) | | | Δ |
| | | | AL (P) | | | Δ |

TABLE 18

| Sample No. | Cerium compound and molar ratio to La | Organic inhibitor and molar ratio to La | Metal material and film forming method | Worked part follow-up property | Corrosion resistance | |
|---|---|---|---|---|---|---|
| | | | | | Flat parts | Worked parts |
| 218 | CePO₄ 1.0 | none | GI (P) | ○ | ○ | |
| | CePO₄ 1.0 | PFDP 0.01 | GI (P) | ○ | ○ | ○ |
| | CePO₄ 1.0 | TGO 0.01 | GI (P) | ○ | ○ | |
| | CePO₄ 1.0 | MLA 0.01 | GI (P) | ○ | ○ | |
| | CePO₄ 1.0 | MBA 0.01 | GI (P) | ○ | ○ | ○ |
| | CePO₄ 1.0 | MNA 0.01 | GI (P) | ○ | ○ | ○ |
| | CePO₄ 1.0 | HOQ 0.01 | GI (P) | ○ | ○ | |
| 219 | none | PFDP 0.5 | GI (P) | ○ | ○ | |
| 220 | CeO₂ 0.01 | none | GI (P) | ○ | ○ | |
| 222 | Ce(NO₃)₃ 0.5 | none | GI (P) | ○ | ○ | ○ |
| | | | EG (P) | ○ | ○ | ○ |
| | | | AL (P) | ○ | ○ | ○ |
| 223 | Ce(NO₃)₃ 0.3 | PFDP 0.2 | GI (P) | ○ | ○ | ○ |
| | | | EG (P) | ○ | ○ | ○ |
| | | | AL (P) | ○ | ○ | ○ |
| 224 | Ce(NO₃)₃ 0.3 | MNA 0.2 | GI (P) | ○ | ○ | ○ |
| | | | EG (P) | ○ | ○ | ○ |
| | | | AL (P) | ○ | ○ | ○ |

TABLE 19

| | Treatment agent | | Metal | Worked | Corrosion resistance | |
|---|---|---|---|---|---|---|
| Sample No. | Phosphoric acid molar ratio | Cerium concentration (mol/kg) | material and film forming method | part follow-up property | Flat parts | Worked parts |
| 225 | 0.8(n) | 2.4(i,r) | GI(P) | Δ | ○ | Δ |
| 226 | 1.0(n) | 1.5(j) | GI(P) | ○ | ○ | ○ |
| 227 | 3.0(n) | 1.05(j) | GI(P) | ○ | ○ | ○ |
| | | | EG(P) | ○ | ○ | ○ |
| | | | AL(P) | ○ | ○ | ○ |
| 228 | 3.0(n) | 0.5(k) | GI(P) | ○ | ⊙ | ○ |
| | | | EG(P) | ○ | ⊙ | ○ |
| | | | AL(P) | ○ | ⊙ | ○ |
| 229 | 4.0(o) | 1.0(k) | GI(P) | ○ | ⊙ | ○ |
| | | | EG(P) | ○ | ⊙ | ○ |
| | | | AL(P) | ○ | ⊙ | ○ |
| 230 | 5.0(n) | 0.64(j) | GI(P) | ○ | ○ | ○ |
| 231 | 5.0(n) | 0.3(j) | GI(P) | ○ | ○ | ○ |
| | | | EG(P) | ○ | ○ | ○ |
| | | | AL(P) | ○ | ○ | ○ |
| | | | cold-rolled steel sheet (P) | — | ○ | — |
| | | | aluminum sheet (P) | — | ○ | — |
| 232 | 5.0(n,p) | 0.3(j) | GI(P) | ○ | ○ | ○ |
| 233 | 5.0(n,q) | 0.3(j) | EG(P) | ○ | ○ | ○ |
| 234 | 10(o) | 0.5(k) | GI(P) | ⊙ | ⊙ | ○ |
| 235 | 10(o) | 0.5(k,l) | EG(P) | ⊙ | ⊙ | ○ |
| 236 | 10(o) | 0.5(k,m) | EG(P) | ⊙ | ⊙ | ○ |
| 237 | 10(o) | 0.2(k) | GI(S) | ○ | ○ | ○ |

TABLE 19-continued

| | Treatment agent | | | | Corrosion resistance | |
|---|---|---|---|---|---|---|
| Sample No. | Phosphoric acid molar ratio | Cerium concentration (mol/kg) | Metal material and film forming method | Worked part follow-up property | Flat parts | Worked parts |
| 238 | 10(o) | 0.2(k,r) | EG(S) | ◯ | ◯ | ◯ |
| 239 | 10(o) | 0.1(j) | GI(D) | ◯ | ◯ | ◯ |
| 240 | 10(n) | 0.06(j) | GI(D) | ◯ | ◯ | Δ |
| 241 | 25(n) | 0.11(k) | EG(D) | ◯ | ◯ | Δ |
| Comp. Ex. 203 | cathode deposition | — | EG | X | Δ | X |

TABLE 20

| Sample No. | Lanthanum compound and molar ratio to Ce | Organic-based corrosion inhibitor and molar ratio to Ce | Metal material and film-forming method | Worked part follow-up property | Corrosion resistance | |
|---|---|---|---|---|---|---|
| | | | | | Flat parts | Worked parts |
| 242 | LaPO₄ 0.8 | none | GI(P) | ◯ | ◯ | ◯ |
| | LaPO₄ 0.8 | PFDP 0.01 | GI(P) | ◯ | ◯ | ◯ |
| | LaPO₄ 0.8 | TGO 0.01 | GI(P) | ◯ | ◯ | ◯ |
| | LaPO₄ 0.8 | MLA 0.01 | GI(P) | ◯ | ◯ | ◯ |
| | LaPO₄ 0.8 | MBA 0.01 | GI(P) | ◯ | ◯ | ◯ |
| | LaPO₄ 0.8 | MNA 0.01 | GI(P) | ◯ | ◯ | ◯ |
| | LaPO₄ 0.8 | HOQ 0.01 | GI(P) | ◯ | ◯ | ◯ |
| 243 | none | PFDP 0.5 | GI(P) | ◯ | ◯ | ◯ |
| 244 | L₂O₃ 0.01 | none | GI(P) | ◯ | ◯ | ◯ |
| 245 | La(OH)₃ 0.01 | none | GI(P) | ◯ | ◯ | ◯ |
| 246 | LaCl₃ 0.5 | none | GI(P) | ◯ | ◯ | ◯ |
| | | | EG(P) | ◯ | ◯ | ◯ |
| | | | AL(P) | ◯ | ◯ | ◯ |
| 247 | LaCl₃ 0.3 | PFDP 0.2 | GI(P) | ◯ | ◯ | ◯ |
| | | | EG(P) | ◯ | ◯ | ◯ |
| | | | AL(P) | ◯ | ◯ | ◯ |
| 248 | LaCl₃ 0.3 | MNA 0.2 | GI(P) | ◯ | ◯ | ◯ |
| | | | EG(P) | ◯ | ◯ | ◯ |
| | | | AL(P) | ◯ | ◯ | ◯ |

Example 11
(Inorganic components of matrix)

ZP-1: After thoroughly mixing 100 g of an aqueous zirconium oxychloride solution (16%) and 115.3 g of phosphoric acid (85%), the mixture was heated at 150° C. for 12 hours.

ZP-2: After thoroughly mixing 100 g of an aqueous zirconium oxychloride solution (32%) and 115.3 g of phosphoric acid (85%), the mixture was heated at 150 ° C. for 12 hours.

ZP-3: After thoroughly mixing 100 g of an aqueous zirconium oxychloride solution (40%) and 115.3 g of phosphoric acid (85%), the mixture was heated at 150 ° C. for 12 hours.

TP-1: After thoroughly mixing 100 g of an aqueous titanium sulfate solution (24%) and 115.3 g of phosphoric acid (85%), the mixture was heated at 150° C. for 12 hours.

ZPP: After thoroughly mixing 100 g of an aqueous zirconium oxychloride solution (32%) and 338 g of polyphosphoric acid (average molecular weight: 338), the mixture was heated at 150 ° C. for 12 hours.

ZW: After thoroughly mixing 100 g of an aqueous zirconium oxychloride solution (32%) and 261.0 g of an aqueous ammonium tungstate solution (4%), the mixture was heated at 150 ° C. for 12 hours.

ZM: After thoroughly mixing 100 g of an aqueous zirconium oxychloride solution (32%) and 176.6 g of an aqueous ammonium molybdate solution (28%), the mixture was heated at 150° C. for 12 hours.

ZV: After thoroughly mixing 100 g of an aqueous zirconium oxychloride solution (32%) and 117.0 g of an aqueous ammonium vanadate solution (5%), the mixture was heated at 150° C. for 12 hours.

The above-mentioned Group IVA element (hydrogen) oxyacids and additives were combined to prepare baths (Tables 1 and 2). The bath concentrations were consistent, with 100 g/l of the Group IVA element oxyacid compound and/or hydrogen oxyacid compound (in terms of the Group IVA element), 5 g/l of colloidal silica in terms of $SiO_2$ when added, 10 g/l of the cerium compound when added, and 10 g/l of the organic-based inhibitor when added. The α-mercaptolauric acid was synthesized, and the other components were commercially obtained reagents. (The aqueous polyaniline solution was a 1 wt % solution with barium sulfate dopant.)

(Film-forming method)

The films were formed in the same manner as Examples 1–6 using the treatment solutions listed in Tables 21 and 22.

(Evaluation of film performance)

The film performance was evaluated in the same manner as for Examples 1–6.

Results

The results for evaluation of Example 11 are listed in Tables 21 and 22.

As these evaluation results demonstrate, the surface treated metal sheets of the present invention had excellent working-follow-up properties and coating adhesion, and exhibited the same flat and worked part corrosion resistance as chromate-treated sheets. Consequently, they exhibit their effect as corrosion resistant films containing absolutely no hexavalent chromium and exhibiting excellent environmental suitability as conversion treatment films.

TABLE 21

| No. | Matrix | Cerium compound | Additive | Metal sheet | Working follow-up property | Corrosion resistance Flat | Corrosion resistance Worked part | Desc. |
|---|---|---|---|---|---|---|---|---|
| 251 | ZP-1 | — | — | GI | ○ | ○ | ○ | Example |
| 252 | ZP-2 | — | — | EG | ○ | ○ | ○ | |
| 253 | ZP-2 | — | — | AL | ○ | ○ | ○ | |
| 254 | ZP-2 | — | silica | GI | ○ | ◎ | ○ | |
| 255 | ZP-2 | cerium oxide | — | GI | ○ | ◎ | ○ | |
| 256 | ZP-2 | cerium hydroxide | — | GI | ○ | ◎ | ○ | |
| 257 | ZP-2 | cerium chloride | — | GI | ○ | ◎ | ○ | |
| 258 | ZP-2 | cerium oxalate | — | GI | ○ | ◎ | ○ | |
| 259 | ZP-3 | — | — | GI | ○ | ◎ | ○ | |
| 260 | ZPP | — | — | GI | ○ | ○ | ○ | |
| 261 | ZPP | — | — | EG | ○ | ○ | ○ | |
| 262 | ZPP | — | — | AL | ○ | ○ | ○ | |
| 263 | ZW | — | — | GI | ○ | ○ | ○ | |
| 264 | ZW | — | — | EG | ○ | ○ | ○ | |
| 265 | ZW | — | — | AL | ○ | ○ | ○ | |
| 266 | ZW | — | — | GI | ○ | ○ | ○ | |
| 267 | ZW | — | — | EG | ○ | ○ | ○ | |
| 268 | ZW | — | — | AL | ○ | ○ | ○ | |
| 269 | ZV | — | — | GI | ○ | ○ | ○ | |
| 270 | ZV | — | — | EG | ○ | ○ | ○ | |
| 271 | ZV | — | — | AL | ○ | ○ | ○ | |
| 272 | TP | — | — | GI | △ | ○ | △ | |
| 273 | TP | — | — | EG | ○ | ○ | ○ | |
| 274 | TP | — | — | AL | ○ | ○ | ○ | |
| 275 | | Chromate film | | GI | △ | ◎ | △ | Comp. Ex. |
| 276 | | | | EG | △ | ◎ | △ | |
| 277 | | | | AL | △ | ○ | △ | |

TABLE 22

| Sample No. | Matrix | Cerium compound | Organic-based inhibitor | Metal sheet | Working follow-up property | Corrosion resistance Flat | Corrosion resistance Worked part | Desc. |
|---|---|---|---|---|---|---|---|---|
| 281 | ZP-2 | cerium oxide | butyl thioglycolate | GI | △ | ○ | ◎ | Example |
| 282 | ZP-2 | — | butyl thioglycolate | GI | △ | ○ | ○ | |
| 283 | ZP-2 | cerium oxide | 8-mercaptoquinoline | GI | △ | ○ | ◎ | |
| 284 | ZP-2 | — | 8-mercaptoquinoline | GI | △ | ○ | ○ | |
| 285 | ZP-2 | cerium oxide | aqueous polyaniline solution | GI | △ | ○ | ◎ | |
| 286 | ZP-2 | — | aqueous polyaniline solution | GI | △ | ○ | ○ | |
| 287 | ZP-2 | cerium oxide | α-mercaptolauric acid | GI | △ | ○ | ◎ | |
| 288 | ZP-2 | — | α-mercaptolauric acid | GI | △ | ○ | ○ | |
| 289 | ZP-2 | cerium oxide | nicotinic acid | GI | △ | ○ | ○ | |
| 290 | ZP-2 | — | nicotinic acid | GI | △ | ○ | ○ | |
| 291 | ZP-2 | cerium oxide | catechol | GI | △ | ○ | ○ | |
| 292 | ZP-2 | — | catechol | GI | △ | ○ | ○ | |

Example 12

(Inorganic components of matrix)

LP: After thoroughly mixing 32.6 g of lanthanum oxide and 115.3 g of phosphoric acid (85%), the mixture was heated at 150° C. for 12 hours.

CP: After thoroughly mixing 23.5 g of cerium phosphate and 15.3 g of phosphoric acid (85%), the mixture was heated at 150 ° C. for 12 hours.

YP: After thoroughly mixing 30.3 g of yttrium chloride and 15.3 g of phosphoric acid (85%), the mixture was heated at 150° C. for 12 hours.

NP: After thoroughly mixing 39.6 g of neodymium chloride and 15.3 g of phosphoric acid (85%), the mixture was heated at 150° C. for 12 hours.

LPP: After thoroughly mixing 32.6 of lanthanum oxide and 338 g of polyphosphoric acid (average molecular weight: 338), the mixture was heated at 150° C. for 12 hours.

LW: After thoroughly mixing 32.6 of lanthanum oxide and 261.0 g of an aqueous ammonium tungstate solution (4%), the mixture was heated at 150° C. for 12 hours.

LM: After thoroughly mixing 32.6 of lanthanum oxide and 176.6 g of an aqueous ammonium molybdate solution (28%), the mixture was heated at 150° C. for 12 hours.

LV: After thoroughly mixing 32.6 g of lanthanum oxide and 117.0 g of an aqueous ammonium vanadate solution (5%), the mixture was heated at 150° C. for 12 hours.

ZP: After thoroughly mixing 100 g of an aqueous zirconium oxychloride solution (32%) and 115.3 g of phosphoric acid (85%), the mixture was heated at 150° C. for 12 hours.

TP: After thoroughly mixing 100 g of an aqueous titanium sulfate solution (24%) and 115.3 g of phosphoric acid (85%), the mixture was heated at 150° C. for 12 hours.

(Resin components of matrix)

Block copolymer (hereunder, AR): A poly(methacrylic acid, hydroxyethyl acrylate, hydroxyethyl methacrylate)-poly(styrene, methyl methacrylate, butyl methacrylate, butyl acrylate)-poly(methacrylic acid, hydroxyethyl acrylate, hydroxyethyl methacrylate) block copolymer (solvent: tetrahydrofuran) was produced by the living anion polymerization method.

Acrylic-based emulsion (hereunder, BR): A commercially available water-dispersable carboxyl group-containing acrylic-based emulsion resin was used (50 wt % resin solid content, product of Nihon Synthetic Rubber Co.).

SBR latex (hereunder, CR): A commercially available water-dispersed carboxyl group-containing SBR latex was used (50 wt % resin solid content, product of Nihon Synthetic Rubber Co.).

The above-mentioned rare earth and/or Group IVA element (hydrogen) oxyacid compounds, resins and other additives were combined to prepare baths (Tables 1–8). The bath concentrations were consistent, with 200 g/l of the rare earth element and/or Group IVA element oxyacid compound and/or hydrogen oxyacid compound (in terms of the rare earth or Group IVA element) and resin (solid content), 5 g/l of colloidal silica in terms of $SiO_2$ when added, 10 g/l of the cerium compound when added, and 10 g/l of the organic-based inhibitor when added. The α-mercaptolauric acid was synthesized, and the other components were commercially obtained reagents. (The aqueous polyaniline solution was a 1 wt % solution with barium sulfate dopant.)

(Film-forming method) The films were formed in the same manner as Examples 1–6 using the treatment solutions listed in Tables 13–20.

(Evaluation of film performance)

The film performance was evaluated in the same manner as for Examples 1–6.

Results

The results for evaluation of Example 11 are listed in Tables 23–30.

As these evaluation results demonstrate, the surface treated metal sheets of the present invention had excellent working-follow-up properties and coating adhesion, and exhibited the same flat and worked part corrosion resistance as chromate-treated sheets. Consequently, they exhibit their effect as corrosion resistant films containing absolutely no hexavalent chromium and exhibiting excellent environmental suitability as conversion treatment films.

TABLE 23

| | Matrix | | Ratio | | | | Working follow- | Corrosion resistance | | |
|---|---|---|---|---|---|---|---|---|---|---|
| No. | Inorg. comp. | Resin comp. | (inorg: resin) | Cerium compound | Additive | Metal sheet | up property | Flat | Worked part | Desc. |
| 301 | LP | AR | 90:10 | — | — | GI | Δ–○ | ○ | Δ–○ | Exam. |
| 302 | LP | AR | 50:50 | — | — | GI | ○ | ○ | ○ | |
| 303 | LP | AR | 50:50 | — | — | EG | ○ | ○ | ○ | |
| 304 | LP | AR | 50:50 | — | — | AL | ○ | ○ | ○ | |
| 305 | LP | AR | 50:50 | — | silica | GI | ○ | ○ | ○–⊙ | |
| 306 | LP | AR | 50:50 | cerium oxide | — | GI | ○ | ⊙ | ○–⊙ | |
| 307 | LP | AR | 50:50 | cerium hydroxide | — | GI | ○ | ○ | ○–⊙ | |
| 308 | LP | AR | 50:50 | cerium chloride | — | GI | ○ | ○ | ○–⊙ | |
| 309 | LP | AR | 50:50 | cerium oxalate | — | GI | ○ | ○ | ○–⊙ | |
| 310 | LP | AR | 10:90 | — | — | GI | ○ | Δ | Δ | |
| 311 | LP | AR | 100:0 | — | — | GI | Δ | ○ | Δ | Comp. |
| 312 | LP | AR | 0:100 | — | — | GI | ○ | X | X | Ex. |

TABLE 23-continued

| No. | Inorg. comp. | Resin comp. | Ratio (inorg:resin) | Cerium compound | Additive | Metal sheet | Working follow-up property | Corrosion resistance Flat | Corrosion resistance Worked part | Desc. |
|---|---|---|---|---|---|---|---|---|---|---|
| 313 | LP | BR | 90:10 | — | — | GI | Δ-○ | ○ | Δ-○ | Exam. |
| 314 | LP | BR | 50:50 | — | — | GI | ○ | ○ | ○ | |
| 315 | LP | BR | 50:50 | — | — | EG | ○ | ○ | ○ | |
| 316 | LP | BR | 50:50 | — | — | AL | ○ | ○ | ○ | |
| 317 | LP | BR | 50:50 | — | silica | GI | ○ | ⊙ | ○-⊙ | |
| 318 | LP | BR | 50:50 | cerium oxide | — | GI | ○ | ⊙ | ○-⊙ | |
| 319 | LP | BR | 50:50 | cerium hydroxide | — | GI | ○ | ⊙ | ○-⊙ | |
| 320 | LP | BR | 50:50 | cerium chloride | — | GI | ○ | ⊙ | ○-⊙ | |
| 321 | LP | BR | 50:50 | cerium oxalate | — | GI | ○ | ⊙ | ○-⊙ | |
| 322 | LP | BR | 10:90 | — | — | GI | ⊙ | Δ | Δ | |
| 323 | LP | BR | 100:0 | — | — | GI | Δ | ○ | Δ | Comp. |
| 324 | LP | BR | 0:100 | — | — | GI | ⊙ | X | X | Ex. |
| 325 | LP | CR | 90:10 | — | — | GI | Δ-○ | ○ | Δ-○ | Exam. |
| 326 | LP | CR | 50:50 | — | — | GI | ○ | ○ | ○ | |
| 327 | LP | CR | 50:50 | — | — | EG | ○ | ○ | ○ | |
| 328 | LP | CR | 50:50 | — | — | AL | ○ | ○ | ○ | |
| 329 | LP | CR | 50:50 | — | silica | GI | ○ | ⊙ | ○-⊙ | |
| 330 | LP | CR | 50:50 | cerium oxide | — | GI | ○ | ⊙ | ○-⊙ | |
| 331 | LP | CR | 50:50 | cerium hydroxide | — | GI | ○ | ⊙ | ○-⊙ | |
| 332 | LP | CR | 50:50 | cerium chloride | — | GI | ○ | ⊙ | ○-⊙ | |
| 333 | LP | CR | 50:50 | cerium oxalate | — | GI | ○ | ⊙ | ○-⊙ | |
| 334 | LP | CR | 10:90 | — | — | GI | ⊙ | Δ | Δ | |
| 335 | LP | CR | 100:0 | — | — | GI | Δ | ○ | Δ | Comp. |
| 336 | LP | CR | 0:100 | — | — | GI | ⊙ | X | X | Ex. |

TABLE 24

| No. | Inorg. comp. | Resin comp. | Ratio (inorg:resin) | Cerium compound | Additive | Metal sheet | Working follow-up property | Corrosion resistance Flat | Corrosion resistance Worked part | Desc. |
|---|---|---|---|---|---|---|---|---|---|---|
| 337 | CP | AR | 90:10 | — | — | GI | Δ-○ | ○ | Δ-○ | Exam. |
| 338 | CP | AR | 50:50 | — | — | GI | ○ | ○ | ○ | |
| 339 | CP | AR | 50:50 | — | — | EG | ○ | ○ | ○ | |
| 340 | CP | AR | 50:50 | — | — | AL | ○ | ○ | ○ | |
| 341 | CP | AR | 50:50 | — | silica | GI | ○ | ⊙ | ○-⊙ | |
| 342 | CP | AR | 50:50 | cerium oxide | — | GI | ○ | ⊙ | ○-⊙ | |
| 343 | CP | AR | 50:50 | cerium hydroxide | — | GI | ○ | ⊙ | ○-⊙ | |
| 344 | CP | AR | 50:50 | cerium chloride | — | GI | ○ | ⊙ | ○-⊙ | |
| 345 | CP | AR | 50:50 | cerium oxalate | — | GI | ○ | ⊙ | ○-⊙ | |
| 346 | CP | AR | 10:90 | — | — | GI | ⊙ | Δ | Δ | |
| 347 | CP | AR | 100:0 | — | — | GI | Δ | ○ | Δ | Comp. |
| 348 | CP | AR | 0:100 | — | — | GI | ⊙ | X | X | Ex. |
| 349 | CP | BR | 90:10 | — | — | GI | Δ-○ | ○ | Δ-○ | |
| 350 | CP | BR | 50:50 | — | — | GI | ○ | ○ | ○ | |
| 351 | CP | BR | 50:50 | — | — | EG | ○ | ○ | ○ | |
| 352 | CP | BR | 50:50 | — | — | AL | ○ | ○ | ○ | |
| 353 | CP | BR | 50:50 | — | silica | GI | ○ | ⊙ | ○-⊙ | |
| 354 | CP | BR | 50:50 | cerium oxide | — | GI | ○ | ⊙ | ○-⊙ | |
| 355 | CP | BR | 50:50 | cerium hydroxide | — | GI | ○ | ⊙ | ○-⊙ | |
| 356 | CP | BR | 50:50 | cerium chloride | — | GI | ○ | ⊙ | ○-⊙ | |

TABLE 24-continued

| | Matrix | | | | | Working follow-up property | Corrosion resistance | | |
|---|---|---|---|---|---|---|---|---|---|
| No. | Inorg. comp. | Resin comp. | Ratio (inorg: resin) | Cerium compound | Additive | Metal sheet | | Flat | Worked part | Desc. |
| 357 | CP | BR | 50:50 | cerium oxalate | — | GI | ○ | ◎ | ○–○ | |
| 358 | CP | BR | 10:90 | — | — | GI | ◎ | △ | △ | |
| 359 | CP | BR | 100:0 | — | — | GI | △ | ○ | △ | Comp. |
| 360 | CP | BR | 0:100 | — | — | GI | ○ | X | X | Ex. |
| 361 | CP | CR | 90:10 | — | — | GI | △–○ | ○ | △–○ | Exam. |
| 362 | CP | CR | 50:50 | — | — | GI | ○ | ○ | ○ | |
| 363 | CP | CR | 50:50 | — | — | EG | ○ | ○ | ○ | |
| 364 | CP | CR | 50:50 | — | — | AL | ○ | ○ | ○ | |
| 365 | CP | CR | 50:50 | — | silica | GI | ○ | ◎ | ○–○ | |
| 366 | CP | CR | 50:50 | cerium oxide | — | GI | ○ | ○ | ○–○ | |
| 367 | CP | CR | 50:50 | cerium hydroxide | — | GI | ○ | ○ | ○–○ | |
| 368 | CP | CR | 50:50 | cerium chloride | — | GI | ○ | ○ | ○–○ | |
| 369 | CP | CR | 50:50 | cerium oxalate | — | GI | ○ | ○ | ○–○ | |
| 370 | CP | CR | 10:90 | — | — | GI | ○ | △ | △ | |
| 371 | CP | CR | 100:0 | — | — | GI | △ | ○ | △ | Comp. |
| 372 | CP | CR | 0:100 | — | — | GI | ○ | X | X | Ex. |

TABLE 25

| | Matrix | | | | | Working follow-up property | Corrosion resistance | | |
|---|---|---|---|---|---|---|---|---|---|
| No. | Inorg. comp. | Resin comp. | Ratio (inorg: resin) | Cerium compound | Additive | Metal sheet | | Flat | Worked part | Desc. |
| 373 | YP | AR | 90:10 | — | — | GI | △–○ | ○ | △–○ | Exam. |
| 374 | YP | AR | 50:50 | — | — | GI | ○ | ○ | ○ | |
| 375 | YP | AR | 50:50 | — | — | EG | ○ | ○ | ○ | |
| 376 | YP | AR | 50:50 | — | — | AL | ○ | ○ | ○ | |
| 377 | YP | AR | 50:50 | — | silica | GI | ○ | ◎ | ○–○ | |
| 378 | YP | AR | 50:50 | cerium oxide | — | GI | ○ | ○ | ○–○ | |
| 379 | YP | AR | 50:50 | cerium hydroxide | — | GI | ○ | ◎ | ○–○ | |
| 380 | YP | AR | 50:50 | cerium chloride | — | GI | ○ | ◎ | ○–○ | |
| 381 | YP | AR | 50:50 | cerium oxalate | — | GI | ○ | ◎ | ○–○ | |
| 382 | YP | AR | 10:90 | — | — | GI | ◎ | △ | △ | |
| 383 | YP | AR | 100:0 | — | — | GI | △ | ◎ | △ | Comp. |
| 384 | YP | AR | 0:100 | — | — | GI | ◎ | X | X | Ex. |
| 385 | YP | BR | 90:10 | — | — | GI | △–○ | ○ | △–○ | |
| 386 | YP | BR | 50:50 | — | — | GI | ○ | ○ | ○ | |
| 387 | YP | BR | 50:50 | — | — | EG | ○ | ○ | ○ | |
| 388 | YP | BR | 50:50 | — | — | AL | ○ | ○ | ○ | |
| 389 | YP | BR | 50:50 | — | silica | GI | ○ | ◎ | ○–○ | |
| 390 | YP | BR | 50:50 | cerium oxide | — | GI | ○ | ○ | ○–○ | |
| 391 | YP | BR | 50:50 | cerium hydroxide | — | GI | | ○ | ○–○ | |
| 392 | YP | BR | 50:50 | cerium chloride | — | GI | ○ | ○ | ○–○ | |
| 393 | YP | BR | 50:50 | cerium oxalate | — | GI | ○ | ○ | ○–○ | |
| 394 | YF | BR | 10:90 | — | — | GI | ◎ | △ | △ | |
| 395 | YP | BR | 100:0 | — | — | GI | △ | ○ | △ | Comp. |
| 396 | YP | BR | 0:100 | — | — | GI | ○ | X | X | Ex. |
| 397 | YP | CR | 90:10 | — | — | GI | △–○ | ○ | △–○ | Exam. |
| 398 | YP | CR | 50:50 | — | — | GI | ○ | ○ | ○ | |
| 399 | YP | CR | 50:50 | — | — | EG | ○ | ○ | ○ | |
| 400 | YP | CR | 50:50 | — | — | AL | ○ | ○ | ○ | |
| 401 | YP | CR | 50:50 | — | silica | GI | ○ | ◎ | ○–○ | |
| 402 | YP | CR | 50:50 | cerium | — | GI | ○ | ◎ | ○–○ | |

TABLE 25-continued

| No. | Matrix Inorg. comp. | Resin comp. | Ratio (inorg: resin) | Cerium compound | Additive | Metal sheet | Working follow-up property | Corrosion resistance Flat | Worked part | Desc. |
|---|---|---|---|---|---|---|---|---|---|---|
| 403 | YP | CR | 50:50 | cerium oxide | — | GI | ○ | ○ | ○–⊙ | |
| 403 | YP | CR | 50:50 | cerium hydroxide | — | GI | ○ | ○ | ○–⊙ | |
| 404 | YP | CR | 50:50 | cerium chloride | — | GI | ○ | ○ | ○–⊙ | |
| 405 | YP | CR | 50:50 | cerium oxalate | — | GI | ○ | ○ | ○–⊙ | |
| 406 | YP | CR | 10:90 | — | — | GI | ⊙ | Δ | Δ | |
| 407 | YP | CR | 100:0 | — | — | GI | Δ | ○ | Δ | Comp. |
| 408 | YP | CR | 0:100 | — | — | GI | ⊙ | X | X | Ex. |

TABLE 26

| No. | Matrix Inorg. comp. | Resin comp. | Ratio (inorg: resin) | Cerium compound | Additive | Metal sheet | Working follow-up property | Corrosion resistance Flat | Worked part | Desc. |
|---|---|---|---|---|---|---|---|---|---|---|
| 409 | NP | AR | 90:10 | — | — | GI | Δ–○ | ○ | Δ–○ | Exam. |
| 410 | NP | AR | 50:50 | — | — | GI | ○ | ○ | ○ | |
| 411 | NP | AR | 50:50 | — | — | EG | ○ | ○ | ○ | |
| 412 | NP | AR | 50:50 | — | — | AL | ○ | ○ | ○ | |
| 413 | NP | AR | 50:50 | — | silica | GI | ○ | ⊙ | ○–⊙ | |
| 414 | NP | AR | 50:50 | cerium oxide | — | GI | ○ | ⊙ | ○–⊙ | |
| 415 | NP | AR | 50:50 | cerium hydroxide | — | GI | ○ | ⊙ | ○–⊙ | |
| 416 | NP | AR | 50:50 | cerium chloride | — | GI | ○ | ○ | ○–⊙ | |
| 417 | NP | AR | 50:50 | cerium oxalate | — | GI | ○ | ○ | ○–⊙ | |
| 418 | NP | AR | 10:90 | — | — | GI | ⊙ | Δ | Δ | |
| 419 | NP | AR | 100:0 | — | — | GI | Δ | ○ | Δ | Comp. |
| 420 | NP | AR | 0:100 | — | — | GI | ⊙ | X | X | Ex. |
| 421 | NP | BR | 90:10 | — | — | GI | Δ–○ | ○ | Δ–○ | |
| 422 | NP | BR | 50:50 | — | — | GI | ○ | ○ | ○ | |
| 423 | NP | BR | 50:50 | — | — | EG | ○ | ○ | ○ | |
| 424 | NP | BR | 50:50 | — | — | AL | ○ | ○ | ○ | |
| 425 | NP | BR | 50:50 | — | silica | GI | ○ | ⊙ | ○–⊙ | |
| 426 | NP | BR | 50:50 | cerium oxide | — | GI | ○ | ⊙ | ○–⊙ | |
| 427 | NP | BR | 50:50 | cerium hydroxide | — | GI | ○ | ○ | ○–⊙ | |
| 428 | NP | BR | 50:50 | cerium chloride | — | GI | ○ | ○ | ○–⊙ | |
| 429 | NP | BR | 50:50 | cerium oxalate | — | GI | ○ | ○ | ○–⊙ | |
| 430 | NP | BR | 10:90 | — | — | GI | ⊙ | Δ | Δ | |
| 431 | NP | BR | 100:0 | — | — | GI | Δ | ○ | Δ | Comp. |
| 432 | NP | BR | 0:100 | — | — | GI | ⊙ | X | X | Ex. |
| 433 | NP | CR | 90:10 | — | — | GI | Δ–○ | ○ | Δ–○ | Exam. |
| 434 | NP | CR | 50:50 | — | — | GI | ○ | ○ | ○ | |
| 435 | NP | CR | 50:50 | — | — | EG | ○ | ○ | ○ | |
| 436 | NP | CR | 50:50 | — | — | AL | ○ | ○ | ○ | |
| 437 | NP | CR | 50:50 | — | silica | GI | ○ | ⊙ | ○–⊙ | |
| 438 | NP | CR | 50:50 | cerium oxide | — | GI | ○ | ⊙ | ○–⊙ | |
| 439 | NP | CR | 50:50 | cerium hydroxide | — | GI | ○ | ○ | ○–⊙ | |
| 440 | NP | CR | 50:50 | cerium chloride | — | GI | ○ | ○ | ○–⊙ | |
| 441 | NP | CR | 50:50 | cerium oxalate | — | GI | ○ | ○ | ○–⊙ | |
| 442 | NP | CR | 10:90 | — | — | GI | ⊙ | Δ | Δ | |
| 443 | NP | CR | 100:0 | — | — | GI | Δ | ○ | Δ | Comp. |
| 444 | NP | CR | 0:100 | — | — | GI | ⊙ | X | X | Ex. |

TABLE 27

| No. | Inorg. comp. | Resin comp. | Ratio (inorg:resin) | Cerium compound | Additive | Metal sheet | Working follow-up property | Corrosion resistance Flat | Worked part | Desc. |
|---|---|---|---|---|---|---|---|---|---|---|
| 445 | ZP | AR | 90:10 | — | — | GI | Δ-○ | ○ | Δ-○ | Exam. |
| 446 | ZP | AR | 50:50 | — | — | GI | ○ | ○ | ○ | |
| 447 | ZP | AR | 50:50 | — | — | EG | ○ | ○ | ○ | |
| 448 | ZP | AR | 50:50 | — | — | AL | ○ | ○ | ○ | |
| 449 | ZP | AR | 50:50 | — | silica | GI | ○ | ⊙ | ○-⊙ | |
| 450 | ZP | AR | 50:50 | cerium oxide | — | GI | ○ | ⊙ | ○-⊙ | |
| 451 | ZP | AR | 50:50 | cerium hydroxide | — | GI | ○ | ⊙ | ○-⊙ | |
| 452 | ZP | AR | 50:50 | cerium chloride | — | GI | ○ | ⊙ | ○-⊙ | |
| 453 | ZP | AR | 50:50 | cerium oxalate | — | GI | ○ | ⊙ | ○-⊙ | |
| 454 | ZP | AR | 10:90 | — | — | GI | ⊙ | Δ | Δ | |
| 455 | ZP | AR | 100:0 | — | — | GI | Δ | ⊙ | Δ | Comp. |
| 456 | ZP | AR | 0:100 | — | — | GI | ○ | X | X | Ex. |
| 457 | ZP | BR | 90:10 | — | — | GI | Δ-○ | ○ | Δ-○ | |
| 458 | ZP | BR | 50:50 | — | — | GI | ○ | ○ | ○ | |
| 459 | ZP | BR | 50:50 | — | — | EG | ○ | ○ | ○ | |
| 460 | ZP | BR | 50:50 | — | — | AL | ○ | ○ | ○ | |
| 461 | ZP | BR | 50:50 | — | silica | GI | ○ | ⊙ | ○-⊙ | |
| 462 | ZP | BR | 50:50 | cerium oxide | — | GI | ○ | ⊙ | ○-⊙ | |
| 463 | ZP | BR | 50:50 | cerium hydroxide | — | GI | ○ | ⊙ | ○-⊙ | |
| 464 | ZP | BR | 50:50 | cerium chloride | — | GI | ○ | ⊙ | ○-⊙ | |
| 465 | ZP | BR | 50:50 | cerium oxalate | — | GI | ○ | ⊙ | ○-⊙ | |
| 466 | ZP | BR | 10:90 | — | — | GI | ⊙ | Δ | Δ | |
| 467 | ZP | BR | 100:0 | — | — | GI | Δ | ○ | Δ | Comp. |
| 468 | ZP | BR | 0:100 | — | — | GI | ⊙ | X | X | Ex. |
| 469 | ZP | CR | 90:10 | — | — | GI | Δ-○ | ○ | Δ-○ | Exam. |
| 470 | ZP | CR | 50:50 | — | — | GI | ○ | ○ | ○ | |
| 471 | ZP | CR | 50:50 | — | — | EG | ○ | ○ | ○ | |
| 472 | ZP | CR | 50:50 | — | — | AL | ○ | ○ | ○ | |
| 473 | ZP | CR | 50:50 | — | silica | GI | ○ | ⊙ | ○-⊙ | |
| 474 | ZP | CR | 50:50 | cerium oxide | — | GI | ○ | ⊙ | ○-⊙ | |
| 475 | ZP | CR | 50:50 | cerium hydroxide | — | GI | ○ | ⊙ | ○-⊙ | |
| 476 | ZP | CR | 50:50 | cerium chloride | — | GI | ○ | ⊙ | ○-⊙ | |
| 477 | ZP | CR | 50:50 | cerium oxalate | — | GI | ○ | ⊙ | ○-⊙ | |
| 478 | ZP | CR | 10:90 | — | — | GI | ⊙ | Δ | Δ | |
| 479 | ZP | CR | 100:0 | — | — | GI | Δ | ○ | Δ | Comp. |
| 480 | ZP | CR | 0:100 | — | — | GI | ⊙ | X | X | Ex. |

TABLE 28

| No. | Matrix Inorg. comp. | Matrix Resin comp. | Ratio (inorg:resin) | Cerium compound | Additive | Metal sheet | Working follow-up property | Corrosion resistance Flat | Corrosion resistance Worked part | Desc. |
|---|---|---|---|---|---|---|---|---|---|---|
| 481 | TP | AR | 90:10 | — | — | GI | Δ-○ | ○ | Δ-○ | Exam. |
| 482 | TP | AR | 50:50 | — | — | GI | ○ | ○ | ○ | |
| 483 | TP | AR | 50:50 | — | — | EG | ○ | ○ | ○ | |
| 484 | TP | AR | 50:50 | — | — | AL | ○ | ○ | ○ | |
| 485 | TP | AR | 50:50 | — | silica | GI | ○ | ◎ | ○-◎ | |
| 486 | TP | AR | 50:50 | cerium oxide | — | GI | ○ | ◎ | ○-◎ | |
| 487 | TP | AR | 50:50 | cerium hydroxide | — | GI | ○ | ○ | ○-◎ | |
| 488 | TP | AR | 50:50 | cerium chloride | — | GI | ○ | ○ | ○-○ | |
| 489 | TP | AR | 50:50 | cerium oxalate | — | GI | ○ | ○ | ○-○ | |
| 490 | TP | AR | 10:90 | — | — | GI | ○ | Δ | Δ | |
| 491 | TP | AR | 100:0 | — | — | GI | Δ | ○ | Δ | Comp. |
| 492 | TP | AR | 0:100 | — | — | GI | ○ | X | X | Ex. |
| 493 | TP | BR | 90:10 | — | — | GI | Δ-○ | ○ | Δ-○ | |
| 494 | TP | BR | 50:50 | — | — | GI | ○ | ○ | ○ | |
| 495 | TP | BR | 50:50 | — | — | EG | ○ | ○ | ○ | |
| 496 | TP | BR | 50:50 | — | — | AL | ○ | ○ | ○ | |
| 497 | TP | BR | 50:50 | — | silica | GI | ○ | ◎ | ○-◎ | |
| 498 | TP | BR | 50:50 | cerium oxide | — | GI | ○ | ◎ | ○-◎ | |
| 499 | TP | BR | 50:50 | cerium hydroxide | — | GI | ○ | ○ | ○-◎ | |
| 500 | TP | BR | 50:50 | cerium chloride | — | GI | ○ | ○ | ○-○ | |
| 501 | TP | BR | 50:50 | cerium oxalate | — | GI | ○ | ○ | ○-○ | |
| 502 | TP | BR | 10:90 | — | — | GI | ○ | Δ | Δ | |
| 503 | TP | BR | 100:0 | — | — | GI | Δ | ○ | Δ | Comp. |
| 504 | TP | BR | 0:100 | — | — | GI | ○ | X | X | Ex. |
| 505 | TP | CR | 90:10 | — | — | GI | Δ-○ | ○ | Δ-○ | Exam. |
| 506 | TP | CR | 50:50 | — | — | GI | ○ | ○ | ○ | |
| 507 | TP | CR | 50:50 | — | — | EG | ○ | ○ | ○ | |
| 508 | TP | CR | 50:50 | — | — | AL | ○ | ○ | ○ | |
| 509 | TP | CR | 50:50 | — | silica | GI | ○ | ◎ | ○-◎ | |
| 510 | TP | CR | 50:50 | cerium oxide | — | GI | ○ | ◎ | ○-◎ | |
| 511 | TP | CR | 50:50 | cerium hydroxide | — | GI | ○ | ○ | ○-◎ | |
| 512 | TP | CR | 50:50 | cerium chloride | — | GI | ○ | ○ | ○-○ | |
| 513 | TP | CR | 50:50 | cerium oxalate | — | GI | ○ | ○ | ○-○ | |
| 514 | TP | CR | 10:90 | — | — | GI | ○ | Δ | Δ | |
| 515 | TP | CR | 100:0 | — | — | GI | Δ | ○ | Δ | Comp. |
| 516 | TP | CR | 0:100 | — | — | GI | ○ | X | X | Ex. |
| 517 | | | chromate film | | | GI | Δ | ○ | Δ | |
| 8 | | | chromate film | | | EG | Δ | ○ | Δ | |
| 519 | | | chromate film | | | AL | Δ | ○ | Δ | |

TABLE 29

| No. | Matrix Inorg. | Matrix Resin | Ratio | Cerium compound | Organic inhibitor | Metal sheet | Working follow-up property | Corrosion resistance Flat | Corrosion resistance Worked part | Desc. |
|---|---|---|---|---|---|---|---|---|---|---|
| 531 | LP | AR | 50:50 | cerium oxide | butyl thioglycolate | GI | ○ | ○ | ○ | Exam. |
| 532 | LP | AR | 50:50 | — | butyl thioglycolate | GI | ○ | ○ | ○-○ | |
| 533 | LP | AR | 50:50 | cerium oxide | 8-mercaptoquinoline | GI | ○ | ○ | ○ | |
| 534 | LP | AR | 50:50 | — | 8-mercaptoquinoline | GI | ○ | ○ | ○-○ | |
| 535 | LP | AR | 50:50 | cerium oxide | aqueous polyaniline solution | GI | ○ | ○ | ○ | |

TABLE 29-continued

| No. | Matrix Inorg. | Resin | Ratio | Cerium compound | Organic inhibitor | Metal sheet | Working follow-up property | Corrosion resistance Flat | Worked part | Desc. |
|---|---|---|---|---|---|---|---|---|---|---|
| 536 | LP | AR | 50:50 | — | aqueous polyaniline solution | GI | ○ | ○ | ○-○ | |
| 537 | LP | AR | 50:50 | cerium oxide | α-mercapto-lauric acid | GI | ○ | ○ | ○ | |
| 538 | LP | AR | 50:50 | — | α-mercapto-lauric acid | GI | ○ | ○ | ○-○ | |
| 539 | LP | AR | 50:50 | cerium oxide | nicotinic acid | GI | ○ | ○ | ○ | |
| 540 | LP | AR | 50:50 | — | nicotinic acid | GI | | ○ | ○-○ | |
| 541 | LP | AR | 50:50 | cerium oxide | catechol | GI | ○ | ○ | ○ | |
| 542 | LP | AR | 50:50 | — | catechol | GI | ○ | ○ | ○-○ | |
| 543 | LPP | AR | 50:50 | cerium oxide | butyl thio-glycolate | GI ○ | ◎ | ◎ ○-○ | ○ | |
| 544 | LPP | AR | 50:50 | — | butyl thio-glycolate | GI | ○ | ○ | ○ | |
| 545 | LPP | AR | 50:50 | cerium oxide | 8-mercapto-quinoline | GI | ○ | ○ | ○ | |
| 546 | LPP | AR | 50:50 | — | 8-mercapto-quinoline | GI | ○ | ○ | ○-○ | |
| 547 | LPP | AR | 50:50 | cerium oxide | aqueous polyaniline solution | GI | ○ | ○ | ○ | |
| 548 | LPP | AR | 50:50 | — | aqueous polyaniline solution | GI | ○ | ○ | ○-○ | |
| 549 | LPP | AR | 50:50 | cerium oxide | α-mercapto-lauric acid | GI | ○ | ○ | ○ | |
| 550 | LPP | AR | 50:50 | — | α-mercapto-lauric acid | GI | ○ | ○ | ○-○ | |
| 551 | LPP | AR | 50:50 | cerium oxide | nicotinic acid | GI | ○ | ○ | ○ | |
| 552 | LPP | AR | 50:50 | — | nicotinic acid | GI | | ○ | ○-○ | |
| 553 | LPP | AR | 50:50 | cerium oxide | catechol | GI | ○ | ○ | ○ | |
| 554 | LPP | AR | 50:50 | — | catechol | GI | ○ | ○ | ○-○ | |

TABLE 30

| No. | Matrix Inorg. comp. | Resin comp. | Ratio (inorg.:resin) | Metal sheet | Working follow-up property | Corrosion resistance Flat | Worked part | Desc. |
|---|---|---|---|---|---|---|---|---|
| 561 | LW | AR | 50:50 | GI | ○ | ○ | ○ | Example |
| 562 | LW | AR | 50:50 | EG | ○ | ○ | ○ | |
| 563 | LW | AR | 50:50 | AL | ○ | ○ | ○ | |
| 564 | LM | BR | 50:50 | GI | ○ | ○ | ○ | |
| 565 | LM | BR | 50:50 | EG | ○ | ○ | ○ | |
| 566 | LM | BR | 50:50 | AL | ○ | ○ | ○ | |
| 567 | LV | CR | 50:50 | GI | ○ | ○ | ○ | |
| 568 | LV | CR | 50:50 | EG | ○ | ○ | ○ | |
| 569 | LV | CR | 50:50 | AL | ○ | ○ | ○ | |

Example 13
(Rare earth metal element compounds)
(1) $Nd_2O_3$
(2) $La_2O_3$
(3) $CeO_2$
(4) $LaPO_4$ Compounds (1) to (3) were products of Kanto Chemical Co., and compound (4) was a commercially available reagent product of Kojundo Chemical Co. which had been crushed to fine particles of 1 μm or smaller.
(5) Vanadic Acid/Lanthanum Compound (Abbreviation: V—La)

After mixing an aqueous lanthanum chloride solution and an aqueous ammonium vanadate solution in a proportion of 1/18 for the molar ratio of La/P, the mixture was heated at 200° C. for 12 hours.

(6) Phosphoric Acid/Lanthanum Compound (Abbreviation: P—La)

After thoroughly mixing an aqueous lanthanum chloride solution and ortho-phosphoric acid ($H_3PO_4$, 85 wt %) in a proportion of 1/6 for the molar ratio of La/P, the mixture was heated at 200° C. for 12 hours.

(7) Polyphosphoric Acid/Lanthanum Compound (Abbreviation: PP:La)

After thoroughly mixing an aqueous lanthanum chloride solution and polyphosphoric acid (average molecular weight approximately 338, product of Showa Chemical Co.) in a proportion of 1/6 for the molar ratio of La/P, the mixture was heated at 200° C. for 12 hours.

(8) Polyphosphoric Acid/Cerium (III) Compound (Abbreviation: PP—Ce)

After thoroughly mixing an aqueous cerium chloride solution and polyphosphoric acid (average molecular weight approximately 338, product of Showa Chemical Co.) in a proportion of 1/6 for the molar ratio of Ce/P, the mixture was heated at 200° C. for 12 hours.

(9) Polyphosphoric Acid/Cerium (IV) Compound (Abbreviation: PP—Ce)

After dissolving cerium (IV) diammonium nitrate in polyphosphoric acid (average molecular weight approximately 338, product of Showa Chemical Co.) (in a proportion of 1/6 for the molar ratio of Ce/P), the mixture was heated at 200° C. for 12 hours.

(Resin matrix)

(A) Block Copolymer

A poly(methacrylic acid, hydroxyethyl acrylate, hydroxyethyl methacrylate)-poly(styrene, methyl methacrylate, butyl methacrylate, butyl acrylate)-poly(methacrylic acid, hydroxyethyl acrylate, hydroxyethyl methacrylate) block copolymer (solvent: tetrahydrofuran) was produced by the living anion polymerization method.

(B) Acrylic-based Emulsion

A commercially available water-dispersable carboxyl group-containing acrylic-based emulsion resin was used (50 wt % resin solid content, product of Nihon Synthetic Rubber Co.).

(C) SBR Latex

A commercially available water-dispersed carboxyl group-containing SBR latex was used (50 wt % resin solid content, product of Nihon Synthetic Rubber Co.).

(Preparation of treatment solution)

The above-mentioned rare earth metal element compounds, resin matrixes and ortho-phosphoric acid or colloidal silica solutions (ST-O, product of Nissan Chemical Co.) as other additives were combined to prepare baths. For comparison, a bath was prepared with the free resin matrix alone. The bath compositions are shown in the tables. The bath concentrations were consistent, with 100 g/l of the rare earth element metal compound in terms of the rare earth metal element, 100 g/l of the resin matrix in terms of solid content, 20 g/l of ortho-phosphoric acid as $H_3PO_4$, and 5 g/l of colloidal silica in terms of $SiO_2$.

(Film forming method)

Each of the treatment baths described above was applied and dried onto a steel sheet to form a film. The films were formed in the same manner as Examples 1–6 except that the coverage on each steel sheet was to a film thickness of about 0.5 μm.

(Evaluation of film performance)

A flat corrosion resistance test and worked corrosion resistance test were conducted in the same manner as for Examples 1–6.

(d) Coating Adhesion Test

The sample was coated with melamine-alkyd paint to a thickness of about 20 μm and baked, and the peeled coat area was evaluated by a cross-cut adhesion test (in which 10×10 cuts are made in a 1 mm square grid and the tape is peeled off) after immersion for 30 minutes in boiling water.

| Evaluation scale: | ◯: no peeling |
|---|---|
| | ⊙: less than 5% peeling |
| | Δ: From 5% to less than 20% peeling |
| | x: 20% or greater peeling |

Results

The results of these performance tests are listed in Tables 31–32.

As shown in these tables, the treatment films of the present invention which were composed mainly of rare earth metal element compounds and resin matrixes exhibited performance equivalent to that of the chromate films of the comparative examples. Consequently, they exhibit excellent performance as conversion treatment films containing absolutely no hexavalent chromium.

TABLE 31

| | | Treatment solution composition and metal sheet performance | | | | | | |
|---|---|---|---|---|---|---|---|---|
| | Rare earth metal | | | | Corrosion resistance | | | |
| No. | element compound | Resin matrix component | Additive | Metal sheet | Flat | Worked part | Coating adhesion | Desc. |
| 601 | $Nd_2O_3$ | block copolymer | — | EG, GI | ◯ | Δ | ◯ | Example |
| | | | | | ◯ | Δ | ◯ | |
| | | | | | ◯ | Δ | ◯ | |
| | | | | | ◯ | Δ | ◯ | |
| 602 | $Nd_2O_3$ | acrylic emulsion | — | EG, GI | ◯ | Δ | ◯ | |
| 603 | $Nd_2O_3$ | SBR latex | — | EG, GI | ◯ | Δ | ◯ | |
| 604 | $La_2O_3$ | block copolymer | — | EG, GI | ◯ | Δ | ◯ | |
| 605 | $La_2O_3$ | acrylic emulsion | — | EG, GI | ◯ | Δ | ◯ | |

TABLE 31-continued

Treatment solution composition and metal sheet performance

| No. | Rare earth metal element compound | Resin matrix component | Additive | Metal sheet | Corrosion resistance Flat | Corrosion resistance Worked part | Coating adhesion | Desc. |
|---|---|---|---|---|---|---|---|---|
| 606 | $La_2O_3$ | acrylic emulsion | phosphoric acid | EG, GI | ○ | △–○ | ○ | |
| 607 | $La_2O_3$ | acrylic emulsion | phosphoric acid, silica | EG, GI | ○–◎ | △–○ | ◎ | |
| 608 | $La_2O_3$ | SBR latex | — | EG, GI | ○ | △ | ◎ | |
| 609 | $CeO_2$ | block copolymer | — | EG, GI | ○–◎ | △ | ◎ | |
| 610 | $CeO_2$ | acrylic emulsion | — | EG, GI | ○–◎ | △ | ◎ | |
| 611 | $CeO_2$ | acrylic emulsion | phosphoric acid | EG, GI | ○–◎ | △–○ | ◎ | |
| 612 | $CeO_2$ | acrylic emulsion | phosphoric acid, silica | EG, GI | ○–◎ | ○ | ◎ | |
| | | | | | ○–◎ | △ | ◎ | |
| | | | | | ○–◎ | ○ | ◎ | |
| | | | | | ○–◎ | △ | ◎ | |
| 613 | $CeO_2$ | SBR latex | — | EG, GI | ○–◎ | △–○ | ◎ | |
| 614 | $LaPO_4$ | block copolymer | — | EG, GI | ○–◎ | △ | ◎ | |
| 615 | $LaPO_4$ | acrylic emulsion | — | EG, GI | ○–◎ | △–○ | ◎ | |
| 616 | $LaPO_4$ | SBR latex | — | EG, GI | ○–◎ | △–○ | ◎ | |
| | | | | Z | ○–◎ | ○ | ◎ | |
| | | | | L | ○–◎ | ○ | ◎ | |
| | | | | R | ○–◎ | △ | ◎ | |
| 617 | V-La | block copolymer | — | EG, GI | ○–◎ | △ | ◎ | |
| 618 | V-La | acrylic emulsion | — | EG, GI | ○–◎ | △–○ | ◎ | |
| | | | | | ○–◎ | ○ | ◎ | |
| | | | | L | ○–◎ | ○ | ◎ | |
| | | | | R | ○–◎ | △–○ | ◎ | |
| 619 | V-La | SBR latex | — | EG, GI | ○–◎ | △–○ | ◎ | |
| 620 | V-La | SBR latex | phosphoric acid | EG, GI | ○–◎ | ○ | ◎ | |
| 621 | V-La | SBR latex | phosphoric acid, silica | EG, GI | ○–◎ | ○ | ○ | |

TABLE 32

Treatment solution composition and metal sheet performance

| No. | Rare earth metal element compound | Resin matrix component | Additive | Metal sheet | Corrosion resistance Flat | Corrosion resistance Worked part | Coating adhesion | Desc. |
|---|---|---|---|---|---|---|---|---|
| 622 | P-La | block copolymer | — | EG, GI | ○–◎ | △ | ◎ | Example |
| 623 | P-La | acrylic emulsion | — | EG, GI | ○–◎ | △–○ | ◎ | |
| 24 | P-La | acrylic emulsion | phosphoric acid | EG, GI | ◎ | ○ | ○ | |
| 625 | P-La | acrylic emulsion | phosphoric acid, silica | EG, GI | ◎ | ○ | ◎ | |
| 626 | P-La | SBR latex | — | EG, GI | ○–◎ | ○ | ◎ | |
| 627 | PP-La | block copolymer | — | EG, GI | ○–◎ | △–○ | ◎ | |
| 628 | PP-La | acrylic emulsion | — | EG, GI | ◎ | ○ | ◎ | |
| 629 | PP-La | SBR latex | — | EG, GI | ◎ | ○ | ◎ | |
| | | | | Z | ◎ | ○ | ◎ | |
| | | | | L | ◎ | ○ | ◎ | |
| | | | | R | ○–◎ | △–○ | ◎ | |
| 630 | PP-Ce | block copolymer | — | EG, GI | ○–◎ | △–○ | ◎ | |
| 631 | PP-Ce | acrylic emulsion | — | EG, GI | ◎ | ○ | ◎ | |
| 632 | PP-Ce | SBR latex | — | EG, GI | ◎ | ○ | ◎ | |
| 633 | PP-CeIV | block copolymer | — | EG, GI | ◎ | ○–◎ | ◎ | |

TABLE 32-continued

Treatment solution composition and metal sheet performance

| No. | Rare earth metal element compound | Resin matrix component | Additive | Metal sheet | Corrosion resistance Flat | Corrosion resistance Worked part | Coating adhesion | Desc. |
|---|---|---|---|---|---|---|---|---|
| 634 | PP-CeIV | acrylic emulsion | — | EG. GI | ○ | ○ | ○ | |
|     |         |                  |   | SZ | ○ | ○ | ○ | |
|     |         |                  |   | AL | ○ | ○ | ○ | |
|     |         |                  |   | CR | ○ | ○-○ | ○ | |
| 635 | PP-CeIV | acrylic emulsion | phosphoric acid | EG. GI | ○ | ○ | ○ | |
| 636 | PP-CeIV | acrylic emulsion | phosphoric acid, silica | EG. GI | ○ | ○ | ○ | |
| 637 | PP-CeIV | SBR latex | — | EG. GI | ○ | ○ | ○ | |
| 638 | PP-CeIV | SBR latex | phosphoric acid, silica | EG. GI | ○ | ○ | ○ | |
|     |         |                  |   | SZ | ○ | ○ | ○ | |
|     |         |                  |   | AL | ○ | ○ | ○ | |
|     |         |                  |   | CR | ○ | ○ | ○ | |
| 639 | — | block copolymer | — | EG. GI | X | X | ○ | Comp. Ex. |
| 640 | — | acrylic emulsion | — | EG. GI | X | X | ○ | |
| 641 | — | SBR latex | — | EG. GI | X | X | ○ | |
| 642 |   | chromate film |   | EG. GI | ○ | △ | ○ | |
|     |   |               |   | SZ | ○ | △ | ○ | |
|     |   |               |   | AL | ○ | △ | ○ | |
|     |   |               |   | CR | ○ | △ | ○ | |

Example 14
(Rare earth metal element compounds and Group IVA element compounds)
(1) $Nd_2O_3$
(2) $La_2O_3$
(3) $CeO_2$
(4) $LaPO_4$ Compounds (1) to (3) were products of Kanto Chemical Co., and compound (4) was a commercially available reagent product of Kojundo Chemical Co. which had been crushed to fine particles of 1 μm or smaller.

(5) Vanadic Acid/Lanthanum Compound (Abbreviation: V—La)

After mixing an aqueous lanthanum chloride solution and an aqueous ammonium vanadate solution in a proportion of 1/18 for the molar ratio of La/P, the mixture was heated at 200° C. for 12 hours.

(6) Phosphoric Acid/Lanthanum Compound (Abbreviation: P—La)

After thoroughly mixing an aqueous lanthanum chloride solution and ortho-phosphoric acid ($H_3PO_4$, 85 wt %) in a proportion of 1/6 for the molar ratio of La/P, the mixture was heated at 200° C. for 12 hours.

(7) Polyphosphoric Acid/Lanthanum Compound (Abbreviation: PP:La)

After thoroughly mixing an aqueous lanthanum chloride solution and polyphosphoric acid (average molecular weight approximately 338, product of Showa Chemical Co.) in a proportion of 1/6 for the molar ratio of La/P, the mixture was heated at 200° C. for 12 hours.

(8) Polyphosphoric Acid/Cerium (III) Compound (Abbreviation: PP—Ce)

After thoroughly mixing an aqueous cerium chloride solution and polyphosphoric acid (average molecular weight approximately 338, product of Showa Chemical Co.) in a proportion of 1/6 for the molar ratio of Ce/P, the mixture was heated at 200° C. for 12 hours.

(9) Polyphosphoric Acid/Cerium (IV) Compound (Abbreviation: PP—Ce)

After dissolving cerium (IV) diammonium nitrate in polyphosphoric acid (average molecular weight approximately 338, product of Showa Chemical Co.) (in a proportion of 1/6 for the molar ratio of Ce/P), the mixture was heated at 200° C. for 12 hours.

(10) Polyphosphoric Acid/Titanium Compound (Abbreviation: PP—Ti)

After thoroughly mixing an aqueous titanium sulfate solution and polyphosphoric acid (average molecular weight approximately 338, product of Showa Chemical Co.) in a proportion of 1/6 for the molar ratio of Ti/P, the mixture was heated at 200° C. for 12 hours.

(11) Polyphosphoric Acid/Zirconium Compound (Abbreviation: PP—Zr)

After thoroughly mixing an aqueous zirconium oxychloride solution and polyphosphoric acid (average molecular weight approximately 338, product of Showa Chemical Co.) in a proportion of 1/6 for the molar ratio of Zr/P, the mixture was heated at 200° C. for 12 hours.

(Resin)
(A) Block Copolymer

A poly(methacrylic acid, hydroxyethyl acrylate, hydroxyethyl methacrylate)-poly(styrene, methyl methacrylate, butyl methacrylate, butyl acrylate)-poly(methacrylic acid, hydroxyethyl acrylate, hydroxyethyl methacrylate) block copolymer (solvent: tetrahydrofuran) was produced by the living anion polymerization method.

(B) Acrylic-Based Emulsion

A commercially available water-dispersable carboxyl group-containing acrylic-based emulsion resin was used (50 wt % resin solid content, product of Nihon Synthetic Rubber Co.).

(C) SBR Latex

A commercially available water-dispersed carboxyl group-containing SBR latex was used (50 wt % resin solid content, product of Nihon Synthetic Rubber Co.).

(Preparation of treatment solution)

The above-mentioned rare earth metal element compounds or Group IVA element compounds as treatment solutions for forming the first layer and the ortho-phosphoric acid or colloidal silica solutions (ST-O, product of Nissan Chemical Co.) as additives were combined to prepare baths with the respective concentrations of 100 g/l of the rare earth element metal compound or Group IVA element compound in terms of the metal, 20 g/l of ortho-phosphoric acid as $H_3PO4$, and 5 g/l of colloidal silica in terms of $SiO_2$. Also, as the treatment solution for forming the second layer there were used water dispersions containing 100 g/l of the above-mentioned resins in terms of solid content and 5 g/l of colloidal silica solution. The bath compositions are listed in the tables.

(Film forming method)

Each of the treatment baths described above was applied and dried onto a steel sheet to form a film. The coverage on every steel sheet was to a film thickness of about 0.5 μm for the first layer and about 0.5 μm for the second layer. The steel sheets used were GI (fused zinc-plated steel sheet, plating coverage: 90 g/m²), EG (zinc-electroplated steel sheet, plating coverage: 20 g/m²), SZ (fused zinc-aluminum alloy-plated steel sheet, plating coverage: 90 g/m², Zn/Al= 95.2/4.8), AL (fused aluminum-silicon alloy-plated steel sheet, plating coverage: 120 g/m², Al/Si=90/10) or CR (cold-rolled steel sheet). For comparison with a chromate treated steel sheet, a treatment bath was prepared with a chromate treatment solution containing 30 g/l of chromic acid partially reduced with starch in terms of $CrO_3$, 40 g/l of $SiO_2$ and 20 g/l of ortho-phosphoric acid, and a film was formed by application and drying onto a steel sheet to about 50 mg/m² in terms of chromium metal. The application for both the first layer and second layer was accomplished with a bar coater, and the drying was accomplished at an atmosphere temperature of 200° C. for 30 seconds for the first layer and at an atmosphere temperature of 200° C. for 15 seconds for the second layer.

(Evaluation of film performance)

Evaluation tests were conducted in the same manner as for Examples 1–6 and Example 13.

Results

The results of these evaluation tests are listed in Tables 33 and 34.

As shown in these tables, the surface treated steel sheets of the present invention which had a combination of two layers (particularly inorganic/organic) gave performance equivalent or superior to that of the chromate film of the comparative example. Consequently, they exhibit excellent performance as conversion treatment films containing absolutely no hexavalent chromium.

TABLE 33

Treatment solution composition and metal sheet performance

| | First layer | | Second layer | | | Corrosion resistance | | Coating | |
|---|---|---|---|---|---|---|---|---|---|
| No. | Rare earth metal compound | Additive | Resin matrix component | Additive | Metal sheet | Flat | Worked part | adhesion | Desc. |
| 701 | $Nd_2O_3$ | — | block copolymer | — | EG, GI | ○ | Δ | ○ | Exam. |
| | | | | | SZ | ○ | Δ | ○ | |
| | | | | | AL | ○ | Δ | ○ | |
| | | | | | CR | ○ | Δ | ○ | |
| 702 | $Nd_2O_3$ | — | acrylic emulsion | — | EG, GI | ○ | Δ | ○ | |
| 703 | $Nd_2O_3$ | — | SBR latex | — | EG, GI | ○ | Δ | ○ | |
| 704 | $La_2O_2$ | — | block copolymer | — | EG, GI | ○ | Δ | ○ | |
| 705 | $La_2O_3$ | — | acrylic emulsion | — | EG, GI | ○ | Δ | ○ | |
| 706 | $La_2O_3$ | phosphoric acid | acrylic emulsion | — | EG, GI | ○ | Δ–○ | ○ | |
| 707 | $La_2O_3$ | phosphoric acid, silica | acrylic emulsion | — | EG, GI | ○–○ | Δ–○ | ○ | |
| 708 | $La_2O_3$ | — | SBR latex | — | EG, GI | ○ | Δ | ○ | |
| 709 | $CeO_2$ | — | block copolymer | — | EG, GI | ○–○ | Δ | ○ | |
| 710 | $CeO_2$ | — | acrylic emulsion | — | EG, GI | ○–○ | Δ | ○ | |
| 711 | $CeO_2$ | phosphoric acid | acrylic emulsion | — | EG, GI | ○–○ | Δ–○ | ○ | |
| 712 | $CeO_2$ | phosphoric acid, silica | acrylic emulsion | — | EG, GI | ○–○ | ○ | ○ | |
| | | | | | SZ | ○–○ | Δ | ○ | |
| | | | | | AL | ○–○ | ○ | ○ | |
| | | | | | CR | ○–○ | Δ | ○ | |
| 713 | $CeO_2$ | — | SBR latex | — | EG, GI | ○–○ | Δ–○ | ○ | |
| 714 | $LaPO_4$ | — | block copolymer | — | EG, GI | ○–○ | Δ | ○ | |
| 715 | $LaPO_4$ | — | acrylic emulsion | — | EG, GI | ○–○ | Δ–○ | ○ | |
| 716 | $LaPO_4$ | — | SBR latex | — | EG, GI | ○–○ | Δ–○ | ○ | |
| | | | | | SZ | ○–○ | ○ | ○ | |

TABLE 33-continued

Treatment solution composition and metal sheet performance

| | First layer | | Second layer | | | Corrosion resistance | | Coating | |
|---|---|---|---|---|---|---|---|---|---|
| No. | Rare earth metal compound | Additive | Resin matrix component | Additive | Metal sheet | Flat | Worked part | adhesion | Desc. |
| | | | | | AL | ○–◎ | ○ | ○ | |
| | | | | | CR | ○–◎ | △ | ○ | |
| 717 | V-La | — | block copolymer | — | EG, GI | ○–◎ | △ | ○ | |
| 718 | V-La | — | SBR latex | — | EG, GI | ○–◎ | △–○ | ○ | |
| | | | | | SZ | ○–◎ | ○ | ○ | |
| | | | | | AL | ○–◎ | ○ | ○ | |
| | | | | | CR | ○–◎ | △–○ | ○ | |
| 719 | V-La | — | acrylic emulsion | silica | EG, GI | ◎ | ○ | ◎ | |
| 720 | V-La | — | SBR latex | — | EG, GI | ○–◎ | △–○ | ◎ | |
| 721 | V-La | phosphoric acid | SBR latex | — | EG, GI | ○–◎ | ○ | ○ | |
| 722 | V-La | phosphoric acid, silica | SBR latex | — | EG, GI | ○–◎ | ○ | ○ | |
| 723 | P-La | — | block copolymer | — | EG, GI | ○–◎ | △ | ○ | |
| 724 | P-La | — | acrylic emulsion | — | EG, GI | ○–◎ | △–○ | ○ | |
| 725 | P-La | phosphoric acid | acrylic emulsion | — | EG, GI | ◎ | ○ | ◎ | |
| 726 | P-La | phosphoric acid, silica | acrylic emulsion | — | EG, GI | ◎ | ○ | ◎ | |
| 727 | P-La | — | SBR latex | — | EG, GI | ○–◎ | ○ | ○ | |
| 728 | P-La | — | SBR latex | silica | EG, GI | ◎ | ○ | ○ | |

TABLE 34

Treatment solution composition and metal sheet performance

| | First layer | | Second layer | | | Corrosion resistance | | Coating | |
|---|---|---|---|---|---|---|---|---|---|
| No. | Rare earth metal compound | Additive | Resin matrix component | Additive | Metal sheet | Flat | Worked part | adhesion | Desc. |
| 729 | PP-La | — | block copolymer | — | EG, GI | ○–◎ | △–○ | ○ | Exam. |
| 730 | PP-La | — | acrylic emulsion | — | EG, GI | ◎ | ○ | ○ | |
| 731 | PP-La | — | SBR latex | — | EG, GI | ◎ | ○ | ○ | |
| | | | | | SZ | ◎ | ○ | ○ | |
| | | | | | AL | ◎ | ○ | ○ | |
| | | | | | CR | ○–◎ | △–○ | ○ | |
| 732 | PP-Ce | — | block copolymer | — | EG, GI | ○–◎ | △–○ | ○ | |
| 733 | PP-Ce | — | acrylic emulsion | — | EG, GI | ◎ | ○ | ○ | |
| 734 | PP-Ce | — | SBR latex | — | EG, GI | ◎ | ○ | ○ | |
| 735 | PP-CeIV | — | block copolymer | — | EG, GI | ◎ | ○–◎ | ○ | |
| 736 | PP-CeIV | — | acrlyic emulsion | — | EG, GI | ◎ | ○ | ○ | |
| | | | | | SZ | ◎ | ○ | ○ | |
| | | | | | AL | ◎ | ○ | ○ | |
| | | | | | CR | ◎ | ○–◎ | ○ | |
| 737 | PP-CeIV | phosphoric acid | acrylic emulsion | — | EG, GI | ◎ | ○ | ○ | |
| 738 | PP-CeIV | phosphoric acid, silica | acrylic emulsion | — | EG, GI | ◎ | ○ | ○ | |
| 739 | PP-CeIV | — | SBR latex | — | EG, GI | ○ | ○ | ○ | |

TABLE 34-continued

Treatment solution composition and metal sheet performance

| | First layer | | Second layer | | | Corrosion resistance | | Coating | |
|---|---|---|---|---|---|---|---|---|---|
| No. | Rare earth metal compound | Additive | Resin matrix component | Additive | Metal sheet | Flat | Worked part | adhesion | Desc. |
| 740 | PP-CeIV | phosphoric acid, silica | SBR latex | — | EG, GI | ○ | ○ | ○ | |
| | | | | | SZ | ○ | ○ | ○ | |
| | | | | | AL | ○ | ○ | ○ | |
| | | | | | CR | ○ | ○ | ○ | |
| 741 | PP-Ti | — | block copolymer | — | EG, GI | ○-○ | Δ | ○ | |
| 742 | PP-Ti | — | acrylic emulsion | — | EG, GI | ○-○ | Δ-○ | ○ | |
| 743 | PP-Ti | — | SBR latex | — | EG, GI | ○-○ | Δ-○ | ○ | |
| 744 | PP-Zr | — | block copolymer | — | EG, GI | ○-○ | Δ | ○ | |
| 745 | PP-Zr | — | acrylic emulsion | — | EG, GI | ○-○ | Δ-○ | ○ | |
| 746 | PP-Zr | — | SBR latex | — | EG, GI | ○-○ | ○ | ○ | |
| 747 | — | — | block copolymer | — | EG, GI | X | X | ○ | Comp. Ex. |
| 748 | — | — | block copolymer | silica | EG, GI | X | X | ○ | |
| 749 | — | — | acrylic emulsion | — | EG, GI | X | X | ○ | |
| 750 | — | — | acrylic emulsion | silica | EG, GI | X | X | ○ | |
| 751 | — | — | SBR latex | — | EG, GI | X | X | ○ | |
| 752 | — | — | SBR latex | silica | EG, GI | X | X | ○ | |
| 753 | | chromate film | | | EG, GI | ○ | Δ | ○ | |
| | | | | | SZ | ○ | Δ | ○ | |
| | | | | | AL | ○ | Δ | ○ | |
| | | | | | CR | ○ | Δ | ○ | |

What is claimed is:

1. A surface treated metal material having a corrosion resistant coating layer consisting essentially of an oxyacid compound or hydrogen oxyacid compound of a rare earth element or group IVA element, or a mixture thereof, on the surface of a metal material.

2. A surface treated metal material according to claim 1, wherein said rare earth element is yttrium, lanthanum or cerium.

3. A surface treated metal material according to claim 1, wherein said group IVA element is zirconium.

4. A surface treated metal material according to claim 1, wherein the anion species of said oxyacid compound or said hydrogen oxyacid compound is a polyvalent oxyacid anion.

5. A surface treated metal material according to claim 1, wherein an anion species of said oxyacid compound or hydrogen oxyacid compound is phosphate ion, tungstate ion, molybdate ion or vanadate ion.

6. A surface treated metal material according to claim 1, wherein said corrosion resistant coating layer consists essentially of a phosphate compound or hydrogen phosphate compound of yttrium, lanthanum or cerium, or a mixture thereof.

7. A surface treated metal material according to claim 6, wherein said phosphate compound or said hydrogen phosphate compound is an ortho-(hydrogen)phosphate compound, meta-phosphate compound or poly-(hydrogen) phosphate compound, or a mixture thereof.

8. A surface treated metal material according to claim 1, wherein said corrosion resistant coating layer further contains as an added component one or more compounds selected from the group consisting of oxides, hydroxides, halides and organic acid compounds of rare earth elements.

9. A surface treated metal material according to claim 8, wherein said rare earth element of said added component is cerium.

10. A surface treated metal material according to claim 9, wherein said rare earth element of said added component is tetravalent cerium.

11. A surface treated metal material according to claim 1, wherein said corrosion resistant coating further contains as an added component an organic-based corrosion inhibitor.

12. A surface treated metal material according to claim 11, wherein said organic-based corrosion inhibitor is one or more compounds selected from the group consisting of formylated derivatives of N-phenyl-dimethylpyrrole, thioglycolic acid esters represented by HS—$CH_2COOC_nCH_{2n+1}$ (n is an integer of 1–25) and their derivatives, α-mercaptocarboxylic acids represented by $C_nH_{2n}$(SH)COOH (n is an integer of 1–25) and their derivatives, quinoline and its derivatives, triazinedithiol and its derivatives, gallic acid esters and their derivatives, nicotinic acid and its derivatives, catechol and its derivatives and conductive polymers.

13. A surface treated metal material according to claim 1, wherein said corrosion resistant coating layer further contains one or more compounds selected from the group consisting of $SiO_2$, $Cr_2O_3$, $Cr(OH)_3$, $Al_2O_3$, calcium hydroxide, calcium carbonate, calcium oxide, zinc phosphate, zinc hydrogen phosphate, potassium phosphate, potassium hydrogen phosphate, calcium phosphate, calcium hydrogen phosphate, calcium silicate, zirconium silicate, aluminum phosphate, aluminum hydrogen phosphate, titanium oxide, zirconium phosphate, zirconium hydrogen phosphate, sulfuric acid, sodium sulfate, sodium hydrogen sulfate, phosphoric acid, sodium phosphate and sodium hydrogen phosphate.

14. A surface treated metal material having a corrosion resistant coating layer consisting essentially of an oxyacid compound or hydrogen oxyacid compound of a rare earth element or group IVA element, or a mixture thereof, and a resin, on the surface of a metal material.

15. A surface treated metal material according to claim 14, wherein said rare earth element or group IV element is yttrium, lanthanum, cerium or zirconium.

16. A surface treated metal material according to claim 14, wherein the anion species of said oxyacid compound or said hydrogen oxyacid compound is a polyvalent oxyacid anion.

17. A surface treated metal material according to claim 14, wherein the anion species of said oxyacid compound is phosphate ion, tungstate ion, molybdate ion or vanadate ion.

18. A surface treated metal material according to claim 17, wherein said oxyacid compound or said hydrogen oxyacid compound is an ortho-(hydrogen)phosphate compound, meta-phosphate compound or poly-(hydrogen)phosphate compound, or a mixture thereof.

19. A surface treated metal material according to claim 14, wherein said corrosion resistant coating layer contains as an added component one or more compounds selected from the group consisting of oxides, hydroxides, halides and organic acid compounds of rare earth elements.

20. A surface treated metal material according to claim 19, wherein said rare earth element of the added component is cerium.

21. A surface treated metal material according to claim 14, wherein said corrosion resistant coating layer contains an organic-based inhibitor as an added component.

22. A surface treated metal material according to claim 14, wherein said organic-based inhibitor is one or more compounds selected from the group consisting of formylated derivatives of N-phenyl-dimethylpyrrole, thioglycolic acid esters represented by $HS-CH_2COOC_nCH_{2n+1}$ (n is an integer of 1–25) and their derivatives, α-mercaptocarboxylic acids represented by $C_nH_{2n}(SH)COOH$ (n is an integer of 1–25) and their derivatives, quinoline and its derivatives, triazinedithiol and its derivatives, gallic acid esters and their derivatives, nicotinic acid and its derivatives, catechol and its derivatives and conductive polymers.

23. A surface treated metal material having a film comprising a compound of a rare earth metal element or a group IVA element, or a mixture thereof dispersed in a resin matrix, on the surface of a metal material.

24. A surface treated metal material according to claim 23, wherein said compound is an oxyacid compound or hydrogen oxyacid compound, or a mixture thereof.

25. A surface treated metal material according to claim 23, wherein said rare earth element or group IV element is yttrium, lanthanum, cerium or zirconium.

26. A surface treated metal material according to claim 24, wherein the anion species of said oxyacid compound or said hydrogen oxyacid compound is a polyvalent oxyacid anion.

27. A surface treated metal material according to claim 24, wherein the anion species of said oxyacid compound is phosphate ion, tungstate ion, molybdate ion or vanadate ion.

28. A surface treated metal material according to claim 24, wherein said oxyacid compound or said hydrogen oxyacid compound is an ortho-(hydrogen)phosphate compound, meta-phosphate compound or poly-(hydrogen)phosphate compound, or a mixture thereof.

29. A surface treated metal material according to claim 23, wherein said film contains as an added component one or more compounds selected from among oxides, hydroxides, halides and organic acid compounds of rare earth elements.

30. A surface treated metal material having a film consisting essentially of a rare earth metal element or group IVA element compound, or a mixture thereof coating the surface of a metal sheet as a first layer, the surface of which is in turn coated with a film consisting essentially of a resin as a second layer.

31. A surface treated metal material according to claim 30, wherein said rare earth metal element or group IVA element compound or mixture thereof is an oxyacid compound, or hydrogen oxyacid compound.

32. A surface treated metal material according to claim 30, wherein said rare earth metal element and/or group IV element is lanthanum, cerium, yttrium and/or zirconium.

33. A surface treated metal material according to claim 30, wherein said film as said first layer further contains a resin.

34. A surface treated metal material having a film containing a rare earth metal element or group IVA element compound, or a mixture thereof dispersed in a resin matrix coating the surface of a metal material as a first layer, and having a film consisting essentially of a resin coating the first layer as a second layer.

35. A surface treatment agent for forming a corrosion resistant coating layer on the surface of a metal material consisting essentially of an oxyacid compound or hydrogen oxyacid compound of a rare earth element or group IVA element, or a mixture thereof.

36. A surface treatment agent according to claim 35, wherein said rare earth element or group IVA element is yttrium, lanthanum, cerium or zirconium.

37. A surface treatment agent according to claim 35, wherein the anion species of said oxyacid compound or said hydrogen oxyacid compound is a polyvalent oxyacid anion.

38. A surface treatment agent according to claim 37, wherein said anion species is phosphate ion, tungstate ion, molybdate ion or vanadate ion.

39. A surface treatment agent according to claim 35, wherein said corrosion resistant coating layer consists essentially of a phosphate compound or hydrogen phosphate compound of yttrium, lanthanum or cerium, or a mixture thereof.

40. A surface treatment agent according to claim 39, wherein said phosphate compound or said hydrogen phosphate compound is an ortho-(hydrogen)phosphate compound, meta-phosphate compound or poly-(hydrogen) phosphate compound, or a mixture thereof.

41. A surface treatment agent according to claim 35, wherein said surface treatment agent further contains as an added component one or more compounds selected from the group consisting of oxides, hydroxides, halides and organic acid compounds of rare earth elements.

42. A surface treatment agent according to claim 41, wherein said rare earth element of said added component is cerium.

43. A surface treatment agent according to claim 42, wherein said rare earth element of said added component is tetravalent cerium.

44. A surface treatment agent according to claim 35, wherein said surface treatment agent further contains as an added component an organic-based corrosion inhibitor.

45. A surface treatment agent according to claim 44, wherein said organic-based corrosion inhibitor is one or more compounds selected from the group consisting of formylated derivatives of N-phenyl-dimethylpyrrole, thioglycolic acid esters represented by $HS-CH_2COOC_nCH_{2n+1}$ (n is an integer of 1–25) and their derivatives, α-mercaptocarboxylic acids represented by $C_nH_{2n}(SH)COOH$ (n is an integer of 1–25) and their derivatives, quinoline and its derivatives, triazinedithiol and its derivatives, gallic acid esters and their derivatives, nicotinic acid and its derivatives, catechol and its derivatives or conductive polymers.

46. A surface treatment agent according to claim 35, wherein said corrosion resistant coating layer further contains one or more compounds selected from the group consisting of $SiO_2$, $Cr_2O_3$, $Cr(OH)_3$, $Al_2O_3$, calcium hydroxide, calcium carbonate, calcium oxide, zinc phosphate, zinc hydrogen phosphate, potassium phosphate, potassium hydrogen phosphate, calcium phosphate, calcium hydrogen phosphate, calcium silicate, zirconium silicate, aluminum phosphate, aluminum hydrogen phosphate, titanium oxide, zirconium phosphate, zirconium hydrogen phosphate, sulfuric acid, sodium sulfate, sodium hydrogen sulfate, phosphoric acid, sodium phosphate and sodium hydrogen phosphate.

47. A surface treatment agent which contains 0.05–4 mol/kg of a rare earth compound in terms of the rare earth element, and 0.5–100 moles of a phosphate compound and/or hydrogen phosphate compound in terms of $H_3PO_4$ to one mole of the rare earth element.

48. A surface treatment agent according to claim 47, wherein said rare earth element compound is a phosphate compound, hydrogen phosphate compound, oxide or hydroxide of lanthanum or cerium, or a mixture thereof.

49. A surface treatment agent according to claim 48, wherein the phosphate is an ortho-phosphate, meta-phosphate or poly-phosphate, or a mixture thereof.

50. A surface treatment agent according to claim 47, which contains water or a mixture of water and a water-soluble organic solvent as a diluting agent.

51. A surface treatment agent according to claim 47, wherein said rare earth element compound is a lanthanum compound, and which further contains a cerium compound in a molar ratio of 1.0–0.001 in terms of cerium to lanthanum and/or an organic-based corrosion inhibitor in a molar ratio of 2–0.001 to lanthanum.

52. A surface treatment agent according to claim 47, wherein said rare earth element compound is a cerium compound, and which further contains a lanthanum compound in a molar ratio of 1.0–0.001 in terms of lanthanum to cerium and/or an organic-based corrosion inhibitor in a molar ratio of 2–0.001 to lanthanum.

53. A surface treatment agent according to claim 35, wherein said surface treatment agent further contains a resin component.

54. A surface treatment agent according to claim 47, wherein said surface treatment agent further contains a resin component.

* * * * *

UNITED STATES PATENT AND TRADEMARK OFFICE
CERTIFICATE OF CORRECTION

PATENT NO.     : 6,190,780 B1
DATED          : February 20, 2001
INVENTOR(S)    : Hiromasa Shoji et al.

It is certified that error appears in the above-identified patent and that said Letters Patent is hereby corrected as shown below:

Column 35,
Line 49, change "quinolie" to -- quinoline --.
Line 63, change "solutoin" to -- solution --.

Column 51,
Line 15, change "ceriwn" to -- cerium --.

Signed and Sealed this

Eleventh Day of December, 2001

Attest:

NICHOLAS P. GODICI
Attesting Officer    Acting Director of the United States Patent and Trademark Office